(12) United States Patent
Colrain et al.

(10) Patent No.: US 10,909,088 B2
(45) Date of Patent: Feb. 2, 2021

(54) SYSTEM AND METHOD FOR HIGH AVAILABILITY AND LOAD BALANCING IN A DATABASE ENVIRONMENT

(71) Applicant: Oracle International Corporation, Redwood Shores, CA (US)

(72) Inventors: Carol Colrain, Redwood Shores, CA (US); Kevin Neel, San Mateo, CA (US); Pablo Silberkasten, San Carlos, CA (US); Michael McMahon, San Francisco, CA (US); Saurabh Verma, Bangalore (IN); Douglas Surber, Orinda, CA (US); Jean De Lavarene, Versailles (FR)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 15/912,861

(22) Filed: Mar. 6, 2018

(65) Prior Publication Data

US 2019/0075170 A1 Mar. 7, 2019

Related U.S. Application Data

(60) Provisional application No. 62/554,942, filed on Sep. 6, 2017, provisional application No. 62/557,041, filed
(Continued)

(51) Int. Cl.
*G06F 16/21* (2019.01)
*G06F 16/2455* (2019.01)
(Continued)

(52) U.S. Cl.
CPC ............... *G06F 16/21* (2019.01); *G06F 1/30* (2013.01); *G06F 16/2455* (2019.01);
(Continued)

(58) Field of Classification Search
None
See application file for complete search history.

(56) References Cited

U.S. PATENT DOCUMENTS

| 5,857,197 A | 1/1999 | Mullins |
| 6,308,238 B1 | 10/2001 | Smith et al. |

(Continued)

FOREIGN PATENT DOCUMENTS

| CN | 1317653 | 5/2007 |
| CN | 103577469 | 2/2014 |

(Continued)

OTHER PUBLICATIONS

"Database Live Migration with Oracle Multitenant and the Oracle Universal Connection Pool (UCP) on Oracle Real Application Clusters (RAC)", An Oracle White Paper, Oct. 2014, 12 pages.
(Continued)

*Primary Examiner* — Philip J Chea
*Assistant Examiner* — Hassan A Khan
(74) *Attorney, Agent, or Firm* — Tucker Ellis LLP

(57) ABSTRACT

In accordance with an embodiment, described herein is a system and method for high availability and load balancing in a database environment. A transparency engine can be provided between client applications and a database, and can operate as a proxy engine for the database and as a session abstraction layer for the client applications, to enable the client applications to utilize database features provided by the connection pool without code changes to the client applications. The transparency can keep track of session states, request boundaries and cursors to efficiently reuse the database connections across the client applications. The transparency engine can use the request boundaries and indicators from the database to detect safe places to drain database connections in the event of database outages.

20 Claims, 35 Drawing Sheets

Related U.S. Application Data on Sep. 11, 2017, provisional application No. 62/557,042, filed on Sep. 11, 2017.

(51) Int. Cl.
    *G06F 16/958*     (2019.01)
    *G06F 1/30*     (2006.01)
    *H04L 29/08*     (2006.01)
    *G06F 16/25*     (2019.01)

(52) U.S. Cl.
    CPC .......... *G06F 16/252* (2019.01); *G06F 16/972* (2019.01); *H04L 67/1004* (2013.01); *H04L 67/14* (2013.01); *H04L 67/141* (2013.01); *H04L 67/142* (2013.01); *H04L 67/145* (2013.01); *H04L 67/2847* (2013.01)

(56) References Cited

U.S. PATENT DOCUMENTS

| | | |
|---|---|---|
| 6,434,543 B1 | 8/2002 | Goldberg et al. |
| 7,664,833 B2 | 2/2010 | Shoolman et al. |
| 7,788,497 B2 | 8/2010 | Luo et al. |
| 8,018,929 B2 | 9/2011 | Soles et al. |
| 8,041,821 B2 | 10/2011 | Burckart et al. |
| 8,204,856 B2 | 6/2012 | Meyer et al. |
| 8,238,913 B1 | 8/2012 | Bhattacharyya et al. |
| 8,260,934 B2 | 9/2012 | Sigal |
| 8,326,996 B2 | 12/2012 | Wong |
| 8,589,029 B2 | 11/2013 | Choudhary et al. |
| 8,626,890 B2 * | 1/2014 | Colrain .................. G06F 9/505 709/223 |
| 8,763,091 B1 | 6/2014 | Singh et al. |
| 8,819,050 B2 | 8/2014 | Babka et al. |
| 8,874,609 B1 | 10/2014 | Singh et al. |
| 8,903,951 B2 | 12/2014 | Peek |
| 8,943,181 B2 | 1/2015 | Kasten et al. |
| 9,154,584 B1 | 10/2015 | Han |
| 9,232,002 B1 | 1/2016 | Sorenson, III |
| 9,338,165 B2 | 5/2016 | Simpkins et al. |
| 9,600,371 B2 | 3/2017 | Colrain et al. |
| 9,600,546 B2 | 3/2017 | Shivarudraiah et al. |
| 9,635,005 B2 | 4/2017 | Katieb |
| 9,678,995 B2 | 6/2017 | Michael et al. |
| 2002/0091702 A1 | 7/2002 | Mullins |
| 2003/0023577 A1 | 1/2003 | Sundius et al. |
| 2003/0120636 A1 | 6/2003 | Bird et al. |
| 2003/0208505 A1 | 11/2003 | Mullins et al. |
| 2004/0088413 A1 * | 5/2004 | Bhogi ................... G06F 9/5061 709/226 |
| 2004/0123048 A1 | 6/2004 | Mullins et al. |
| 2005/0038801 A1 * | 2/2005 | Colrain .................. G06F 16/21 |
| 2006/0031520 A1 | 2/2006 | Bedekar et al. |
| 2006/0146877 A1 | 7/2006 | Srivastava |
| 2007/0118534 A1 | 5/2007 | Hayes et al. |
| 2007/0180275 A1 | 8/2007 | Metzger et al. |
| 2007/0198684 A1 | 8/2007 | Mizushima |
| 2008/0155221 A1 | 6/2008 | Bireley et al. |
| 2012/0066363 A1 * | 3/2012 | Somogyi ............. G06F 16/2358 709/223 |
| 2013/0018919 A1 * | 1/2013 | Peek ................. G06F 16/24549 707/780 |
| 2013/0066952 A1 * | 3/2013 | Colrain ............... G06F 11/1438 709/203 |
| 2015/0095343 A1 | 4/2015 | Divilly et al. |
| 2016/0026683 A1 | 1/2016 | Sah et al. |
| 2016/0321304 A9 | 11/2016 | Colrain et al. |
| 2017/0026242 A1 | 1/2017 | Dolgov et al. |
| 2017/0103106 A1 | 4/2017 | Kass |
| 2018/0301897 A1 | 10/2018 | DeLay et al. |
| 2019/0073387 A1 | 3/2019 | Silberkasten et al. |
| 2019/0075170 A1 | 3/2019 | Colrain et al. |

FOREIGN PATENT DOCUMENTS

| | | |
|---|---|---|
| EP | 1703693 | 9/2006 |
| WO | 2005067395 | 7/2005 |

OTHER PUBLICATIONS

OneXSoft, "OneProxy for PostgreSQL=Load Balance+Table Sharding+SQL Firewall+More", retrieved on Aug. 1, 2017 from http://www.onexsoft.com/en/oneproxy.html, 3 pages.

SQL Relay, "Announcing: SQL Relay 1.1.0", retrieved on Aug. 1, 2017 from http://sqlrelay.sourceforge.net/index.html, 3 pages.

SQL Relay, "High Availability", retrieved on Aug. 1, 2017 from http://sqlrelay.sourceforge.net/documentation.html, 1 page.

SQL Relay, "SQL Server Connection Pooling (ADO.NET)", Mar. 30, 2017, retrieved on Aug. 1, 2017 from https://docs.microsoft.com/en-us/dotnet/framework/data/adonet/sql-server-connection-pooling, 10 pages.

Sun Directiory Server Enterprise Edition 7.0 Reference, "Forwarding Request From Directory Proxy Server to Backend LDAP Servers", retrieved on Aug. 1, 2017 from https://docs.oracle.com/cd/E19424-01/820-4811/gcnve/index.html, 5 pages.

United States Patent and Trademark Office, Office Action dated Jul. 3, 2019 for U.S. Appl. No. 15/912,861, 12 pages.

United States Patent and Trademark Office, Office Action dated Jul. 9, 2019 for U.S. Appl. No. 15/912,866, 10 pages.

Array Networks, "Connection Multiplexing: Understanding Array TCP Offload Technology; APV Series Application Delivery Controllers", White Paper, Feb. 2017, 7 pages.

IBM Knowledgecenter, "Supporting multiplexed connections", IBM Informix 12.10, retrieved on Jul. 28, 2017 from https://www.ibm.com/support/knowledgecenter/en/SSGU8G_12.1.01com.ibm.admin.doc/ids_admin_0130.htm, 2 pages.

IBM Websphere, "Java Database Connectivity (JDBC)", IBM WebSphere Application Server Performance Cookbook—Java Database Connectivity (JDBC), retrieved on Aug. 1, 2017 from https://publib.boulder.ibm.com/httpserv/cookbook/WebSphere_Application_Server-WAS_Classic-Java_Database_Connectivity_JDBC.html, 4 pages.

JDBC Performance Tips, "Java Performance Tuning", retrieved on Jul. 28, 2017 from http://www.javaperformancetuning.com/tips/jdbc.shtml, 15 pages.

Oracle, "Cache Connect to Oracle", Oracle Data Sheet, 2007, retrieved on Aug. 1, 2017 from http://www.oracle.com/technetwork/products/timesten/ds-timesten-cache-128569.pdf, 4 pages.

ScaleArc, "SQL Connection Pooling and Multiplexing", retrieved on Jul. 28, 2017 from http://www.scalearc.com/how-it-works/performance-features/connection-pooling-and-multiplexing, 4 pages.

ScaleArc, "Traffic Aggregation and Control—Security Feature", retrieved on Jul. 28, 2017 from http://www.scalearc.com/how-it-works/security-features/traffic-aggregation-and-control, 3 pages.

United States Patent and Trademark Office, Notice of Allowance dated Feb. 6, 2020 for U.S. Appl. No. 15/912,866, 13 pages.

OneXSoft, "PHP: The Database Connection Pool Solution for PHP/Web Application", Jan. 13, 2016, retrieved on Jul. 28, 2017 from http://www.onexsoft.com/en/php-database-connection-pool.html, 3 pages.

Sangameswaran, Arun; ScaleArc Customer Support, "Functional Spec: Authentication Offload", Apr. 19, 2016, retrieved on Jul. 28, 2017 from https://support.scalearc.com/kb/articles/functional-spec-authentication-offload, 2 pages.

Oracle, "Oracle TimesTen Application-Tier Database Cache", User's Guide, 11g Release 2 (11.2.2), Oct. 2014, 264 pages.

Sun Microsystems, Inc., "Sun Directory Server Enterprise Edition 7.0 Refrence", Nov. 2009, 362 pages.

Oracle, "Database JDBC Developer's Guide: Application Continuity for Java", Oracle Database Online Documentation 12c Release 1 (12.1), retrieved from https://docs.oracle.com/database/121/JJDBC/appcontnew.htm#JJDBC29063, 2014, 14 pages.

Rabinovich, et al., "Computing on the Edge: A Platform for Replicating Internet Applications", retrieved from https://pdfs.semanticscholar.org/8449/7f905bd01dva7eec8294312755635917er23.pdf, 2004, 22 pages.

(56) References Cited

OTHER PUBLICATIONS

United States Patent and Trademark Office, Office Action dated Jul. 2, 2020 for U.S. Appl. No. 15/912,856, 16 pages.

* cited by examiner

SYSTEM AND METHOD FOR HIGH AVAILABILITY AND LOAD BALANCING IN A DATABASE ENVIRONMENT

CLAIM OF PRIORITY

This application claims the benefit of priority to U.S. Provisional application titled "SYSTEM AND METHOD FOR CONNECTION CONCENTRATION IN A DATABASE ENVIRONMENT", Application No. 62/554,942, filed Sep. 6, 2017; U.S. Provisional application titled "SYSTEM AND METHOD FOR HIGH AVAILABILITY AND LOAD BALANCING IN A DATABASE ENVIRONMENT", Application No. 62/557,041, Sep. 11, 2017; and U.S. Provisional application titled "SYSTEM AND METHOD FOR ROW BUFFERING IN A DATABASE ENVIRONMENT", Application No. 62/557,042, Sep. 11, 2017; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to databases and application servers, and are particularly related to a system and method for high availability and load balancing in a database environment.

BACKGROUND

Some database features (e.g., Fast Connection Failover and Application Continuity) rely on particular technologies such as Fast Application Notification (FAN), and require support for certain types of connection pools and database drivers in database client stacks.

As such, while these features are available to many applications, they may not be available to other applications due to restrictions within the environments of the applications.

For example, an organization may have a particular application that is certified for use with an older client driver, which restricts the organization's ability to upgrading to a newer version of the driver.

As another example, an organization may not be able to switch to a particular type of connection pool, for example, Universal Connection Pool (UCP), since the organization has already invested into a third-party connection pool, or custom solution, or the organization has no control over which connection pool to use in applications within the organization.

Even for those applications that use UCP or similar type of connection pools, the database features may not be available if those applications access a database over cloud, since FAN events cannot be sent over the internet.

Moreover, heterogeneous client applications written in different languages (e.g., JAVA, C, Python, C++) can overload a database by opening too many connections. Each application has its own connection pool and the connections are not shared among these pools, causing inefficient usage of resources and scalability issues in a cloud environment where a connection/session explosion can be expected with large-scale web and cloud deployments.

Further, a client application often needs to execute a query and make multiple roundtrips to fetch rows from a database, and the resulting rows generally cannot be reused by another client application. As a result, each client application has to execute the same query on the database to get the desired rows, which is an expensive task and increases the system response time.

SUMMARY

In accordance with an embodiment, described herein is a system and method for high availability and load balancing in a database environment. A transparency engine can be provided between client applications and a database, and can operate as a proxy engine for the database and as a session abstraction layer for the client applications, to enable the client applications to utilize database features provided by the connection pool without code changes to the client applications.

In accordance with an embodiment, the transparency engine can keep track of session states, request boundaries and cursors to efficiently reuse the database connections across the client applications. The transparency engine can use the request boundaries and indicators from the database to detect safe places to drain database connections in the event of database outages. The transparency engine can use a non-blocking architecture to provide high scalability, and can use a replay driver at a presentation layer to support high availability features for the client applications.

In accordance with an embodiment, the transparency engine can receive application connections from the client applications, and concentrate the application connections on a smaller number of database connections maintained in the connection pool.

In accordance with an embodiment, a plurality of local buffers (i.e. row buffers) can be maintained in the transparency engine to store rows fetched from the database. The local buffers can be filled by rows pre-fetched from the database. When an application requests rows from the database, the transparency engine first can check whether the rows exist in a local buffer. If the rows are present in the local buffer, the transparency engine can send the rows to the requesting client application, without querying the database; otherwise the request is sent to the database. The row buffering feature can improve response times to client applications.

DETAILED DESCRIPTION

Figure 1:
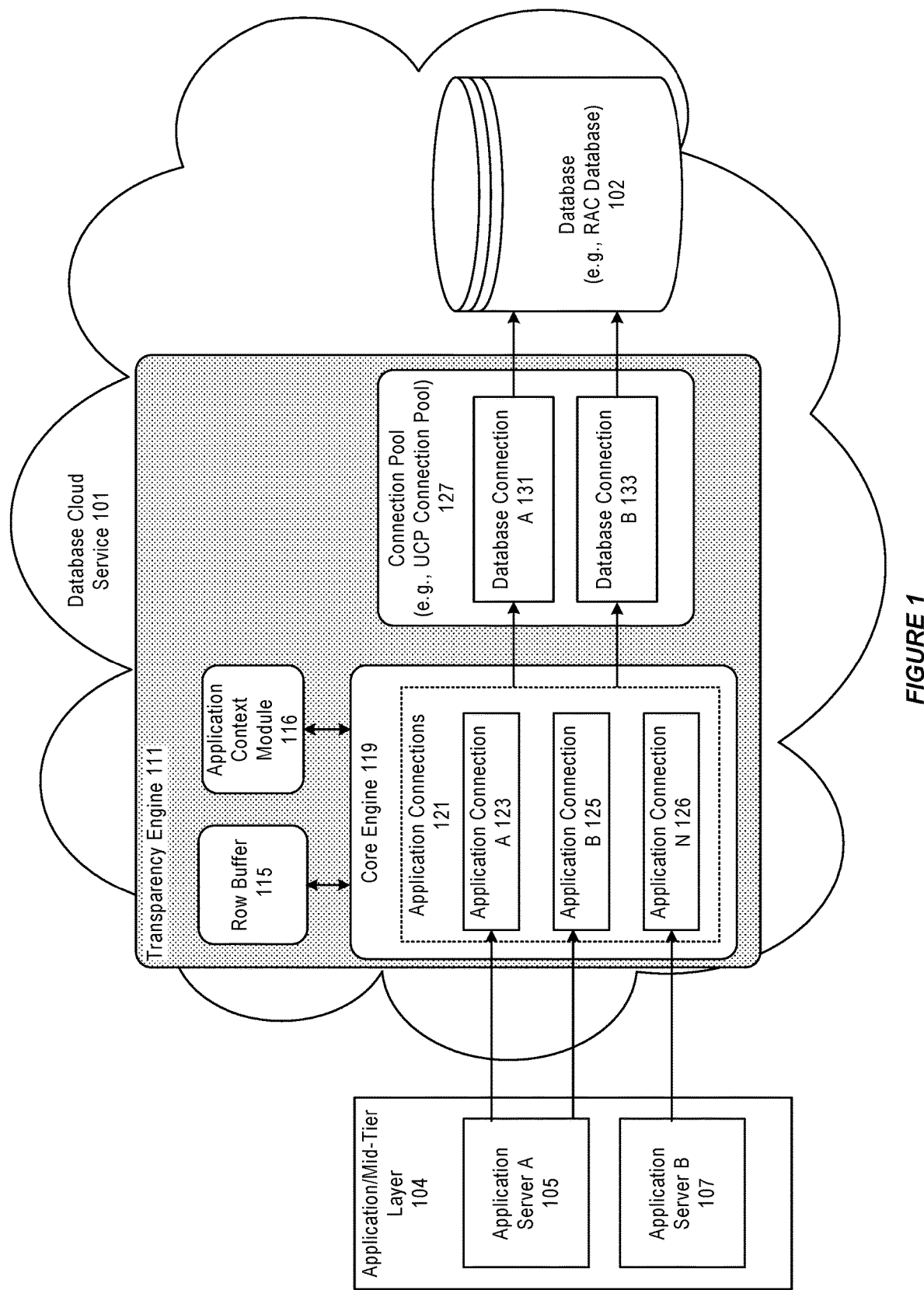
FIG. 1 illustrates an example transparency engine, in accordance with an embodiment.

Some connection pools, for example, Oracle Universal Connection Pool (UCP) and Active GridLink(AGL)/UCP for WebLogic, can be used to store database connections to a clustered database, such as an Oracle Real Application Clusters (RAC) database. These RAC-aware connection pools can be used by client applications to access database features available through the clustered database.

In accordance with an embodiment, the database features can be high availability features, which can include Fast Connection Failover (FCF), concealed run-time connection load balancing, connection affinity, data routing, complete database transparency, removed risk of login and demand surges.

As described above, the database features may not available to some client applications due to restrictions within the environments of the applications.

To address this, a transparency engine can be provided between client applications and a database, and can include a connection pool (e.g., UCP connection pool). The transparency engine can operate as a proxy engine for the database and as a session abstraction layer for the client applications, to enable the client applications to utilize features provided by the connection pool without code changes.

In accordance with an embodiment, during a planned maintenance of the database, the transparency engine can drain existing database connections and can create new connections to other RAC instances without affecting connections between the client applications and the database.

In accordance with an embodiment, the transparency engine can keep track of session states, request boundaries and cursors to efficiently reuse the database connections across the client applications. The transparency engine can use the request boundaries and indicators from the database to detect safe places to drain database connections in the event of database outages. The transparency engine can use a non-blocking architecture to provide high scalability, and a replay driver at a presentation layer to support high availability features for the client applications.

In accordance with an embodiment, a plurality of local buffers (i.e. row buffers) can be maintained in the transparency engine to store rows fetched from the database. The local buffers can be filled by rows pre-fetched from the database. When an application requests rows from the database, the transparency engine can first check whether the rows exist in a local buffer. If the rows are present in the local buffer, the transparency engine can send the rows to the requesting client application, without querying the database; otherwise the request is sent to the database. The row buffering feature can improve response times to client applications.

In accordance with an embodiment, the transparency engine can maintain a small number of database connections (outbound connections) to the database in the connection pool, and can concentrate a large number of application connections (inbound connections) on the small number of inbound connections.

In accordance with an embodiment, without the transparency engine, a client application can send connection authentication requests to a database directly. When there is a logon storm, i.e. a huge number of connections to the database created within a short span of time during a planned maintenance, the database may not be able to accept all connection requests.

Since the transparency engine can have the connection concentration feature enabled, the transparency engine can eliminate the occurrence of a logon storm by maintaining a small number of database connections, for example, during a planned maintenance.

In accordance with an embodiment, the transparency engine can process requests in a non-blocking manner. The unmarshalling of requests (e.g., TTC structures) can be performed using a state machine, where intermediate TTC structure states can be saved and resumed from its last saved state.

As such, the transparency engine can un-marshal multiple TTC packets without blocking any thread. In accordance with an embodiment, when one thread is reading incoming packets from a client application, there can be other threads that can continue unmarshalling packets. This approach can use a smaller number of threads, so the overhead on an operating system for scheduling the threads can be much lower, which can improve the scalability of the transparency engine.

In accordance with an embodiment, the transparent engine can keep a mapping of SQL texts and bind definitions with cursor IDs, and can route queries based on bind data to specific sharded instances. The transparency engine can also discover that the database is a sharded database, in which case it can load the shard topology for use in routing the user queries to the appropriate shard based on the shard key in the bind data. Thus, the transparency engine can make sharing transparent to client applications.

For data affinity, the transparency engine can route SQL queries to an appropriate affinitized RAC instance. The RAC affinity can lead to higher RAC performance and scalability due to improved cache locality and reduced inter-node synchronization and block pings.

Definitions of Terms

In accordance with an embodiment, the following terms are used herein. It will be evident that, in accordance with other embodiments, additional and/or different terms can be used.

Two-Task Common (TTC): In accordance with an embodiment, the TTC can be a proprietary protocol that is implemented by a plurality of database client libraries (e.g., JDBC-thin, Oracle Call Interface or OCI, Managed .NET). The transparency engine sits at the TTC level so that it can transparently support each of the plurality of database client libraries.

Transparency Engine: In accordance with an embodiment, the transparency engine is a stateful TTC proxy engine that monitors TTC traffic, and multiplexes sessions to a database.

State Signature: In accordance with an embodiment, a state signature is a cyclic redundancy check (CRC), Hash or similar code that provides fast matching of an otherwise "stateless" database session to one that is configured with the same required non-transactional session state (NTSS) states. This can be used for applications that do not use many session states, for example, database-agnostic applications. These applications can set some national language support (NLS), optimizer values, and may set sys_context. The applications typically do not change states other than cursors. If states are changed, the session reverts to a different state.

Request Boundaries: In accordance with an embodiment, a request is a unit of work on a connection to a database. Request demarcation varies with specific use-case scenarios. A request can begin when a connection is borrowed from a UCP connection pool, and can end when this connection is returned to the connection pool. With requests identified by request boundaries, the transparency engine can determine when to attach or release connections for concentration, draining, failover and application continuity. Request boundaries can be detected at an entry point to the transparency engine.

Socket Router: In accordance with an embodiment, a socket router is a set of network agents that can re-establish connections between an application and a surviving instance of the transparency engine in case of a crash.

State Advisory: In accordance with an embodiment, a state advisory is a feature on a database server that can be used to track session states, and to advise when it is safe to migrate to another database instance, and the the associated migration cost. Because the transparency engine alone cannot restore non-basic session states, the database server needs to be involved in tracking session state changes, so that these session states can be restored in a different database/instance for some applications during a planned maintenance.

Non-Transactional Session State (NTSS): In accordance with an embodiment, a NTSS refers to a session state that affects execution of commands in a session but is not persisted to a database. A NTSS can include PL/SQL, JAVA and environment variables, objects, sequences references, and declarative settings that include national language support (NLS), optimizer and events. When assigning, relocating, or recovering a session, the states that were created for a first session, can be preserved in a second session.

Inbound and outbound connections: In accordance with an embodiment, applications connect to the transparency engine through inbound connections. The transparency engine connects to a database through outbound connections. The transparency engine can maintain pairing between inbound and outbound connections. For concentration purposes, the number of inbound connections can be greater than the number of outbound connections.

Connection pairing: In accordance with an embodiment, an inbound connection is paired with an outbound connection when the transparency engine associates the two and forwards data received on the inbound connection to the outbound connection. Connection pairing uses labels and can use state equivalence to ensure that the sessions have matching non-transactional session states. The transparency engine can modify non transactional session states if needed.

Transaction bit: In accordance with an embodiment, a transaction bit is used by a database server to determine whether a transaction is open.

Transaction initiated bit: In accordance with an embodiment, a server can send a transaction initiated bit within the EOC (End of Call) TTC packet. The transparency engine can use this transaction bit to determine whether a round-trip has started or ended a transaction. This bit can be used in conjunction with the transaction bit.

Transparency Engine

In accordance with an embodiment, a transparency engine can be provided between an application layer and a database layer to act as a proxy for a database in the database layer.

The database can be a Real Application Clusters (RAC) database, a RAC database cloud service, or another type of database either in an on-premises environment or in a cloud environment. Similarly, the transparency engine can be deployed in a cloud environment or in an on-premise environment.

In accordance with an embodiment, the transparency engine can operate as a session abstraction layer at OSI layer 7, as a stateful SQL/TTC proxy; and can be tightly integrated with a database such as Oracle RAC database, to transparently handle transactional and non-transactional states for applications.

In accordance with an embodiment, the transparency engine enables client applications to utilize database features such as high availability, performance and scalability features, without the need to change the client applications, mid-tier containers, or client-side configurations of an organization.

FIG. 1 illustrates an example transparency engine, in accordance with an embodiment.

More particularly, FIG. 1 illustrates an example transparent engine 111 installed in a database cloud service environment 101.

As shown in FIG. 1, the transparency engine can be provided between an application layer (mid-tier layer) 104 and a database 102, and can receive requests from application server A 105 and application server B 107 in the application layer.

In accordance with an embodiment, the application layer can include a plurality of application server instances with different types of applications deployed thereon.

As further shown in FIG. 1, the transparency engine can use a connection pool 127, for example, a UCP connection pool, to maintain a smaller of database connections, for example, database connection A 131 and database connection B 133.

In accordance with an embodiment, the transparency engine can include a core engine 119, which can receive requests from the applications. The core engine can communicate with a plurality of other modules in the transparency engines, for example, a row buffer 115 and an application context module 116, to manage application connections 121 and the database connections.

In accordance with an embodiment, when the transparency engine is started, the connection pools configured by an administrator can be started. The core engine can receive requests from applications in the application layer, and can use different mechanisms to manage usage of the database connections. Caching extra rows in the row buffer to serve future fetch requests from an application is one of such mechanisms. Responses can be sent back by the core engine to the application.

In accordance with an embodiment, the transparency engine can borrow a database connection from the connection pool if a request is to be executed in the database, for example, when requested rows cannot be found in the row buffer.

In accordance with an embodiment, the core engine can manage application contexts, transaction/session states and cursors of the database using the application context module; and can use the application/session states to match an application connection to a database connection in the connection pool. If the database connection is not an exact match, the transparency engine can use connection labeling callbacks in the transparency engine or in the application layer to configure the database connection for the application, so that the transparency engine can use an appropriate database connection for the application that has already been authenticated by the transparency engine.

In accordance with an embodiment, application connections 123, 125 and 126 can be established connections between applications and the transparency engine. The core engine can receive multiple requests from, and send responses, to an application in one or more sessions using an application connection.

In accordance with an embodiment, the transparency engine can concentrate a large number of application connections on a smaller number of database connections, and handle a large number of concurrent application sessions from the application layer with a small number of database connections. As such, the connection concentration feature enables the transparency engine to improve the scalability of the transparency engine.

Figure 2:
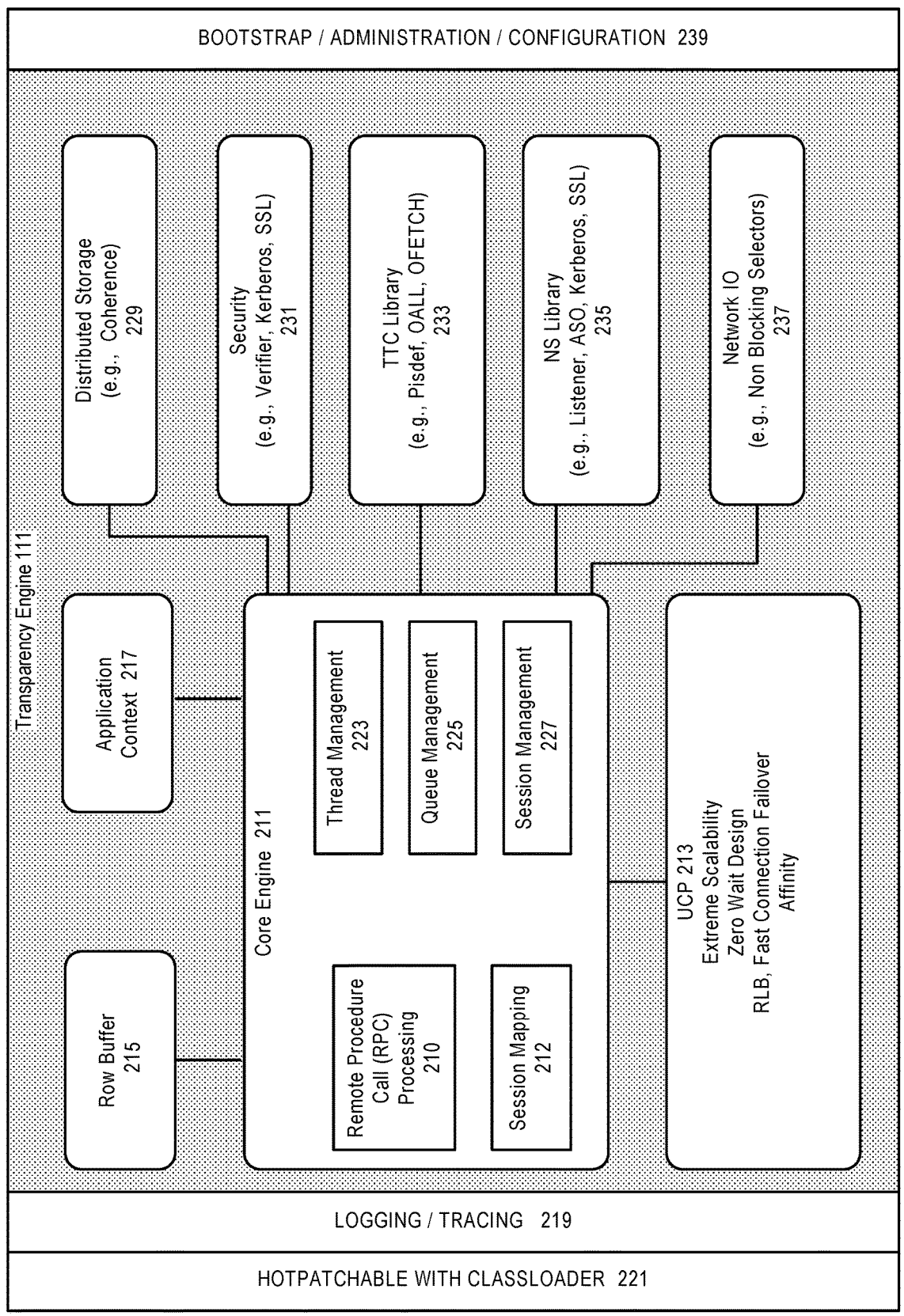
FIG. 2 further illustrates an example transparency engine, in accordance with an embodiment.

FIG. 2 further illustrates an example transparency engine, in accordance with an embodiment.

As shown in FIG. 2, in accordance with an embodiment, the transparency engine 111 can include a plurality of modules, which are described below.

Core Engine

In accordance with an embodiment, the core engine module 211 can communicate with and orchestrate other modules of the transparency engine, to manage application connections and database connections. Each of the other modules of the transparency engine can be provided as a library, for example, a JAR file.

In accordance with an embodiment, the other modules of the transparency engine include a distributed storage 229, a security module 231, a TTC library module 233, a NS library module 235, a network IO module 237, a UCP 213, an administration/configuration module 239, a logging/tracing module 219, and a hot patching module 221.

In accordance with an embodiment, the core engine can include a remote procedure call (RPC) processing component 210, a session mapping component 212, a thread management component 223, a queue management component 225, and a session management component 227.

Row Buffer

In accordance with an embodiment, the core engine can maintain one or more row buffers 215 to store the rows fetched from a database in advance. When an application executes a SELECT query on the transparency engine, and the total number of rows in a result-set are more than a fetch size of the application, the transparency engine can fetch rows from the database in advance, and store them in the row buffer.

In accordance with an embodiment, rows can be stored in a row buffer against an application's unique application connection ID, and a unique transparency engine cursor ID that is generated for a current query execution. The row buffer also maintains the order of the rows returned from the database. When the same application sends a FETCH request to the transparency engine, the transparency engine can retrieve the rows from the row buffer and send them to the application, instead of querying the database.

In accordance with an embodiment, the core engine can retrieve the rows from the row buffer using the application's unique connection ID and the unique transparency cursor ID for that connection, which enables the transparency engine to send the correct set of rows to the appropriate recipient.

Application Context Module

In accordance with an embodiment, the transparency engine can include an application context module 217, for storing information related to an application's database session. Physically represented, the application context module can be an application programming interface (API) that provides the capacity to store/retrieve objects with a key/value pair.

In accordance with an embodiment, an application context stores an application connection's specific information. The context information for each application is stored against the unique application connection ID.

In accordance with an embodiment, the transparency engine can store session information outside of the database for the following features:

1). Connection Concentration: Since one database connection can be used by different applications (e.g., database clients), session related information (e.g., session states) are stored for multiple applications that can share a database connection.

2). Planned Outages: The transparency engine can recreate session related information for a database connection when the database connection is being drained from one node into a new one.

3). High Availability: The session-related information of a node needs to be persisted after an unplanned termination.

4). Caching: The transparency engine provides the ability to read information ahead when a cursor is open. This information can be stored in memory to be sent to an application in an application layer when the information is requested.

Two-Task Common (TTC) Library Module

In accordance with an embodiment, a database server is a software application that manages a database; and a client is an application that requests information from a database server. The client and the server can communicate with each other through a client/server communication stack. Information passed from a client application sent by a client communication stack across a network protocol is received by a similar communications stack on the side of the database server. The process flow on the side of the database server is the reverse of the process flow on the client side, with information ascending through the communication layers.

In accordance with an embodiment, each of the client communication stack and the server communication stack can be based on the Open Systems Interconnection (OSI) model, which includes a physical layer, a transport layer, a session layer, a presentation layer, and an application layer. Character set differences can occur if the client and database server run on different operating systems. The presentation layer can resolve differences, and can be configured for each connection to perform conversion when required.

In accordance with an embodiment, the presentation layer used by client/server applications can be based on a Two-Task Common (TTC) protocol. The TTC provides character set and data type conversion between different character sets or formats on the client and database server. At the time of initial connection, the TTC can be responsible for evaluating differences in internal data and character set representations and determining whether conversions are required for two computers to communicate.

In accordance with an embodiment, the TTC library module can be used to unmarshal a network byte form of a TTC packet into a Java object which encapsulates records and scalars of the packet. The transparency engine can recognize details about remote procedure call (RPC) requests received from applications (e.g., client applications) by unmarshalling TTC packets. The transparency engine can examine the RPC details and determine what actions it can execute before providing a response to the application.

In accordance with an embodiment, the TTC library module can also marshal the Java object representation of a TTC packet into its corresponding network byte form. The transparency engine can execute a RPC against a database by marshalling a TTC packet. The transparency engine marshals a TTC packet when sending a response to a client application. This module can be configured to facilitate any transparency engine process which relies on marshalling or unmarshalling packets of the TTC protocol.

Non-Transaction (NS) Library

In accordance with an embodiment, a NS Protocol is a packet-based protocol. NS protocol packets can be divided into two sections: a header and a payload. The size of the NS header size can be 8 bytes and can be followed by a payload of variable sizes.

In accordance with an embodiment, the NS library module provides the transparency engine over underlying transport protocols like TCP, TCPS, etc. A database (e.g., Oracle Database) can use the NS library module to communicate with applications/database client applications (JDBC, Oracle Call Interface or OCI, etc.). The NS library module can implement the NS protocol specification and provide the following functionalities: providing an interface for reading/writing TTC packet bytes (NSChannel); processing NS packets sent by a database and an application; providing NS protocol negotiation; providing an interface for sending marker packets (Break/Reset) (NSChannel); storing NS session related information (NSSession); Handle NS errors; handling compression, encryption and data integrity tasks; and supporting SSL connections.

Network IO

In accordance with an embodiment, the network IO module can handle IO communication from applications in the application layer (which interacts with the transparency engine as a regular database) to a database (which interacts with the transparency engine as a regular application). The module can be based on an event-driven architecture, where objects configured to receive a particular event of a socket can register themselves in the module, so that the object can respond to events. An object (e.g., a listener) can implement a particular interface in order to be registered with the module. At the time of registration, a handler can be assigned between a socket channel and the object, and can be configured to generate an event on the object when the event occurs.

Security Module

In accordance with an embodiment, the transparency engine can use the security module to support the same network security mechanisms as a database server.

For example, the supported network security mechanisms can include advanced security options (ASO), and transport layer security (TLS).

The security module can also support the same user authentication mechanisms as the database server.

For example, the supported user authentication mechanisms can include O5Lgon with password verifiers, Kerberos authentication, and user authentication through SSL certificates.

In accordance with an embodiment, the transparency engine can support the following features natively: TTC opcode filtering; IP and MAC address filtering; database users filtering based on service names (a database server also supports this with PDBs); and DoS attack detection.

In accordance with an embodiment, the above-described features can be implemented using rules specified in a configuration file. The transparency engine can apply the rules during runtime. When connection concentration is enabled, the transparency engine can offload the database server from performing user authentication. Thus, only a smaller number of connections needs to be authenticated on the database side.

In accordance with an embodiment, the identity of a user is tied to a socket. When an IO event is detected on the socket, a lookup in a session map in the application context can be used to find an application connection. Once the socket is established and after the user has been authenticated, no additional checks on the socket for activity is needed. SSL or ASO network checksumming can be enabled to ensure data integrity.

UCP

In accordance with an embodiment, the transparency engine can use the UCP module to maintain database connections, to provide high availability and planned outage features to applications connecting to the transparency engine. The UCP can support username/password, Kerberos and SSL based authentication, and an asynchronous API used to borrow database connections. A transparency engine administrator can configure a connection pool for a unique combination of a username and a service name. When a request from an application requires database access, the core engine can use an authenticated username and an authenticated service name from an application to determine an appropriate connection pool for borrowing connections. The core engine can then use the application's context information to get session properties of an application connection.

In accordance with an embodiment, the session properties can be used for selecting database connections from a connection. The properties can be used as labels in a connection selection algorithm. The transparency engine can provide a labeling callback implementation to configure required session states on a borrowed connection wherever necessary.

Coherence

In accordance with an embodiment, the distributed storage (e.g., Coherence) module can be used to store application contexts. The distributed storage can be an in-memory data grid that is used as a shared storage for various transparency engine instances. When a transparency engine instance is removed, any of the other transparency engine instances can be used to resume the application context from the distributed storage.

Hot Patching Module

The hot patching module can be used to make the transparency engine hot patchable. For the transparency engine to be highly available, it can be hot patchable, i.e. patchable while running. A user is not required to bring a transparency engine instance down to patch it. Instead, the transparency engine instance can be patched without stopping or interrupting application connections.

Bootstrap/Administration/Configuration

In accordance with an embodiment, the bootstrap/administration/configuration module facilitates the administration and monitoring of the transparency engine. The module can include a plurality of components, including a command line tool, an MBean client, a JMX interface, and a configuration component.

Logging/Tracing

In accordance with an embodiment, the logging/tracing module can be used to collect specifically annotated class fields and getters call results, one or more in-memory ring buffers, and one or more tracing files.

In addition, a management console based on a secure dynamic MBean can be provided to manage debugging and the tracing process. The logging and tracing module saves the annotated fields and getter calls results to a circular buffer. The circular buffer cannot be overloaded once the newest records overwrite the oldest ones.

If a failure is detected, the tracing module writes the current state of the circular buffer to an event file. For better CPU performance, objects can be dumped into the circular buffer without any conversion. While saving the circular buffer into an event file, the tracing module can perform conversions, so that the event file is in a text format. The event file can be encrypted and compressed. The tracing module also enables public and static methods to be annotated as "invokable". All "invokable" methods can show up in the tracing console and can be invoked.

Figure 3:
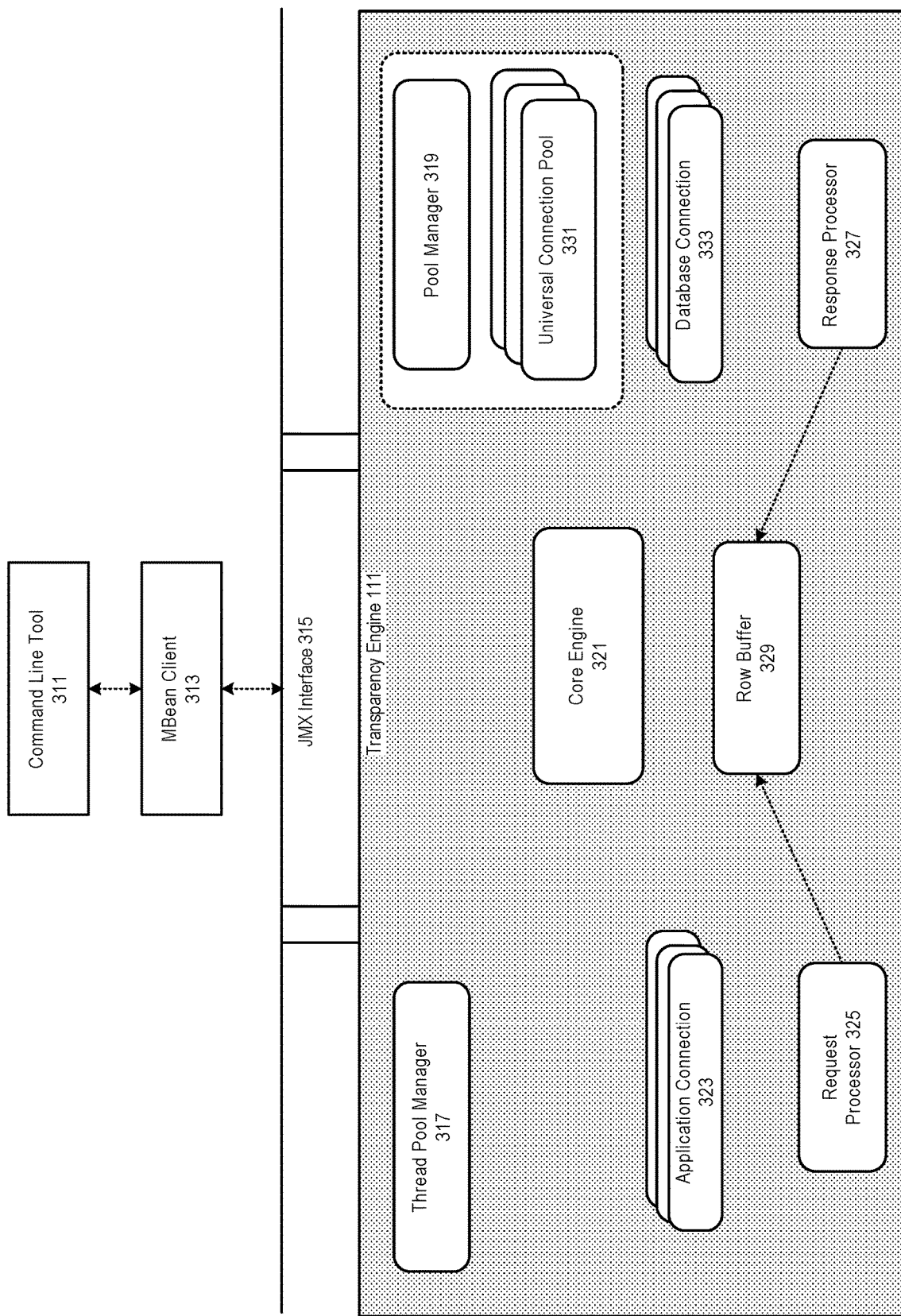
FIG. 3 further illustrates an example transparency engine, in accordance with an embodiment.

FIG. 3 further illustrates an example transparency engine, in accordance with an embodiment.

More particularly, FIG. 3 illustrates an embodiment of the core engine in accordance with an embodiment.

As shown in FIG. 3, in accordance with an embodiment, the transparency engine 111 can be administered with a command line tool (e.g., tectl) 311. The command line tool can provide commands to start, stop, and monitor the status of the transparency engine, and to modify the configuration parameters of the transparency engine on a running transparency engine instance.

In accordance with an embodiment, a MBean client 313 can be a component that includes a MBean client class and its associated classes, to enable an authenticated/valid external entity (for example, an organization manager or a command line tool) to administer or monitor the transparency engine through a published MBean for the transparency engine.

In accordance with an embodiment, the MBean client class can establish a connection to a Java Management Extensions (JMX) server through a JMX interface 315 using a port specified in a management properties file of the JMX server; and can look up the published MBean using the MBean name which is also provided in the management properties file.

In accordance with an embodiment, an application connection (i.e. inbound connection) 323 can be an authenticated and established connection between an application and the transparency engine. An application connection can be used by the core engine to accept requests from and submits responses to applications. The core engine can use a TTC channel to read requests from and write responses to the applications.

In accordance with an embodiment, the core engine uses a request processor 325 to process an incoming request from an application. Based on the request type, the request processor can generate a response for the application without accessing the database. The transparency engine can generate a response and send the response to the application using an application connection. If the request processor requires a database connection to process the request, it can borrow a database connection from the UCP connection pool 331. The transparency engine uses the borrowed database connection to send the request to the database.

In accordance with an embodiment, a pool manager 319 can be used to read configuration specific to a connection pool, add a new connection pool, and remove or modify an existing connection pool.

In accordance with an embodiment, a database connection (i.e. outbound connection) 333 can be an authenticated and established connection between the transparency engine and the database. The core engine can borrow a database connection from the UCP, submit requests to and accepts responses from the database through the borrowed database connection instance, and return the database connection once the response is received from the database and processed.

In accordance with an embodiment, a response from a database can be processed by a response processor 327, which can send the database response to an application using an application connection paired with the database connection used to obtain the database response.

In accordance with an embodiment, a core engine 321 can be used to process transaction requests (for example, SQL statements and/or data manipulation language (DML) requests) from applications. When an application connection is in an auto-commit mode, each individual SQL statement can be treated as a transaction and is automatically committed after it is executed.

For example, for each DML request received from an application, a corresponding transparency engine request can be prepared by the core engine, and sent to a database using a database connection. The database connection can be returned to the UCP connection pool after receiving a response from the database.

When the application connection is not in an auto-commit mode, the core engine, when receiving a DML request from an application on an application connection, can prepare an equivalent transparency engine request; and can send the request to a database using a database connection. The request can open a transaction on the database connection.

Similarly, the transparency engine can also open a transaction on the application connection. The core engine can pair the database connection with the application connection, and keep tracks of the database connection by mapping an application connection ID with a database connection ID. The core engine can use the same database connection for executing future requests from the application connection, until the two connections are un-paired after the core engine executes a commit or rollback request issued by the application.

In accordance with an embodiment, a thread pool manager 317 can internally resize an internal thread pool using APIs on an engine thread pool class without restarting the transparency engine, in response to a change to a worker thread pool parameter in a configuration file.

Similarly, when an IO framework thread pool size is changed in the configuration or another configuration, the change can be propagated by the thread pool manager to a selection service framework.

Figure 4:
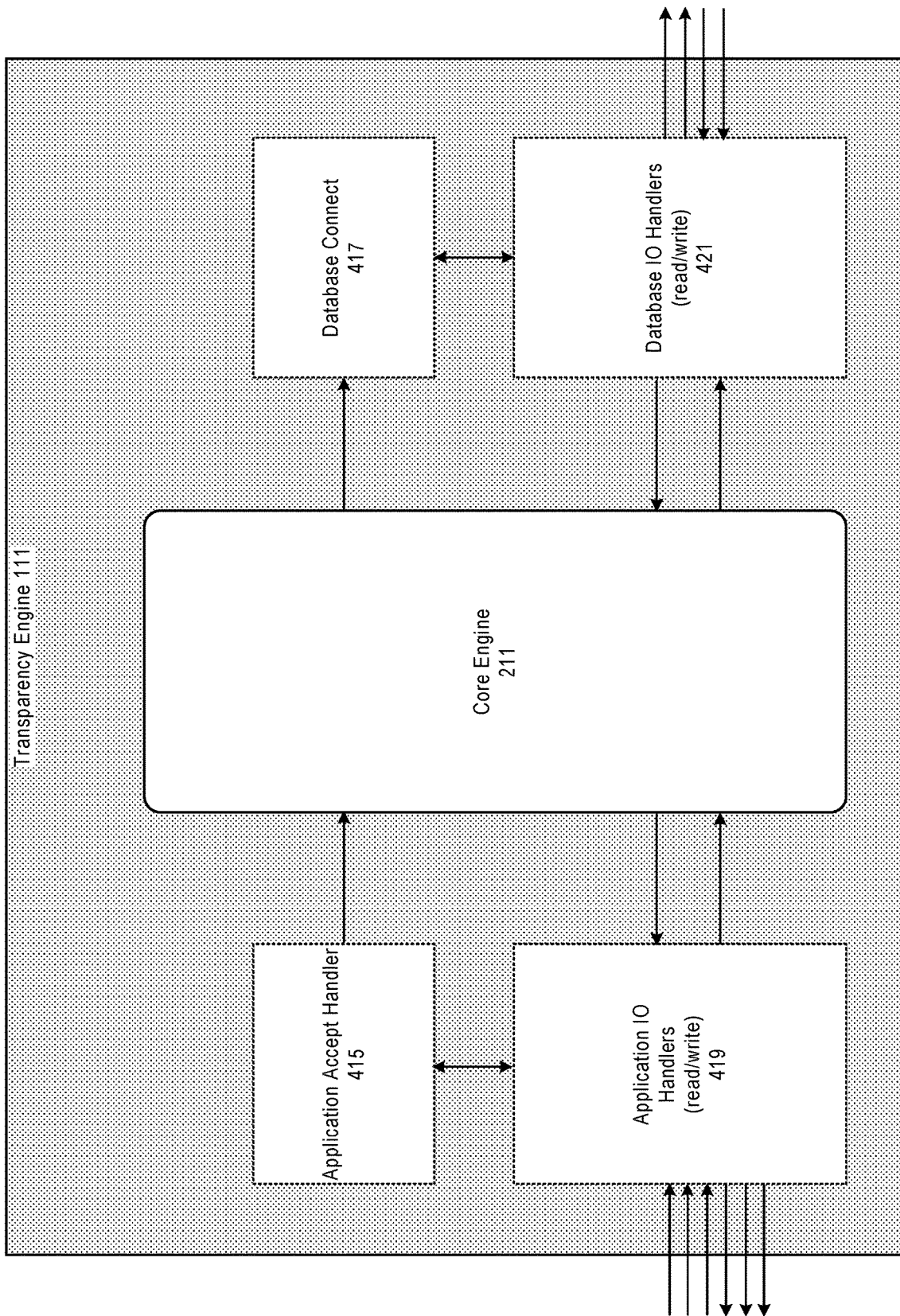
FIG. 4 illustrates a network IO module in accordance with an embodiment.

FIG. 4 further illustrates a network IO module in accordance with an embodiment.

As described above, in accordance with an embodiment, the network IO module can be based on an event-driven architecture, where a listener or another object configured to receive a particular event of a socket can register itself in the module, so that the listener can act when an event occurs.

In accordance with an embodiment, there can be two types of listeners: an accept event listener, and an IO event listener. An accept event listener can be registered with a server socket channel, and can implement a method that can be invoked each time the server socket receives a new incoming connection. An IO event listener can be generated or registered by an accept event listener when a new connection is accepted. An IO event listener can implement two methods: a read method for reading data on a server socket, and write method for writing data to a server socket.

When receiving a new incoming channel, the accept event listener can generate or register a plurality of IO event listeners, and can associate the incoming channel, request or connection with each of the IO event listeners, which can respond to IO events generated by the incoming channel.

In accordance with an embodiment, as used herein, a channel is an interface used by the TTC library module to read/write data. A channel (e.g., a non-transaction channel or NSChannel) can have a specific implementation for an application connection and a database connection. A NSChannel that represents an application connection is a DatabaseNSChannel, and a NSChannelthat represents a database connection is an ApplicationNSChannel.

In accordance with an embodiment, an application connection can operate as an IO event listener for the socket it is registered with, so that the application connection can read data sent by the socket. An application connection can implement a "public boolean onWriteQ" API, and a "public void read( )" API defined in an IO event listener. The API can be used to notify an associated TTC channel for a read/write event.

In accordance with an embodiment, in addition to providing the listener functionality, the network IO module can create socket channels using a set of APIs to communicate with both applications and databases.

For example, the set of APIs can include a "start server channel" API, and a "create socket channel" API. The "start server channel" API can be used to create a server socket that operates as an entry point for the application layer to connect to the transparency engine. The API can take as a parameter an accept event listener, which can be used to execute logic related to acceptance of a new incoming connection. The "create socket channel" API can be used to create a client socket to a database. The transparency engine can register an IO event listener with the client socket to execute related logic.

As shown in FIG. 4, the network IO module can include an application accept handler 415, a plurality of application IO event handlers 419, a database connect handler 417, and a plurality of database IO handlers 421.

In accordance with an embodiment, the application accept handler can correspond to an application IO event listener, and each of the application IO handlers can correspond to an application IO event listeners.

Similarly, the database connect handler can correspond to a database connect event listener, which can generate or register a plurality of database IO event listeners. Each of the plurality of database IO handlers can correspond to one of the database IO event listeners.

In accordance with an embodiment, the network IO module can use a selection service to leverage the workload of the handlers for each IO operation. The handlers can be registered with selectors in the selection service, which can adjust the number of threads and the number of selectors depending on the underlying hardware and the amount of memory set for the heap of JVMs.

In accordance with an embodiment, with the network IO module, the transparency engine can provide a non-blocking architecture that allows the transparency engine to scale up to a large number of connections. The network IO module can use a small number of selector threads (e.g., between 1 and 3), which monitor activities of sockets and generate events when a socket is ready for read. Worker threads then process application requests, send database requests, process database responses and can send application responses. The worker threads can be available in a thread pool or busy executing a task. They do not block on IO, which allows improved utilization of resources and minimizes the risk of thread context switching.

Figure 5:
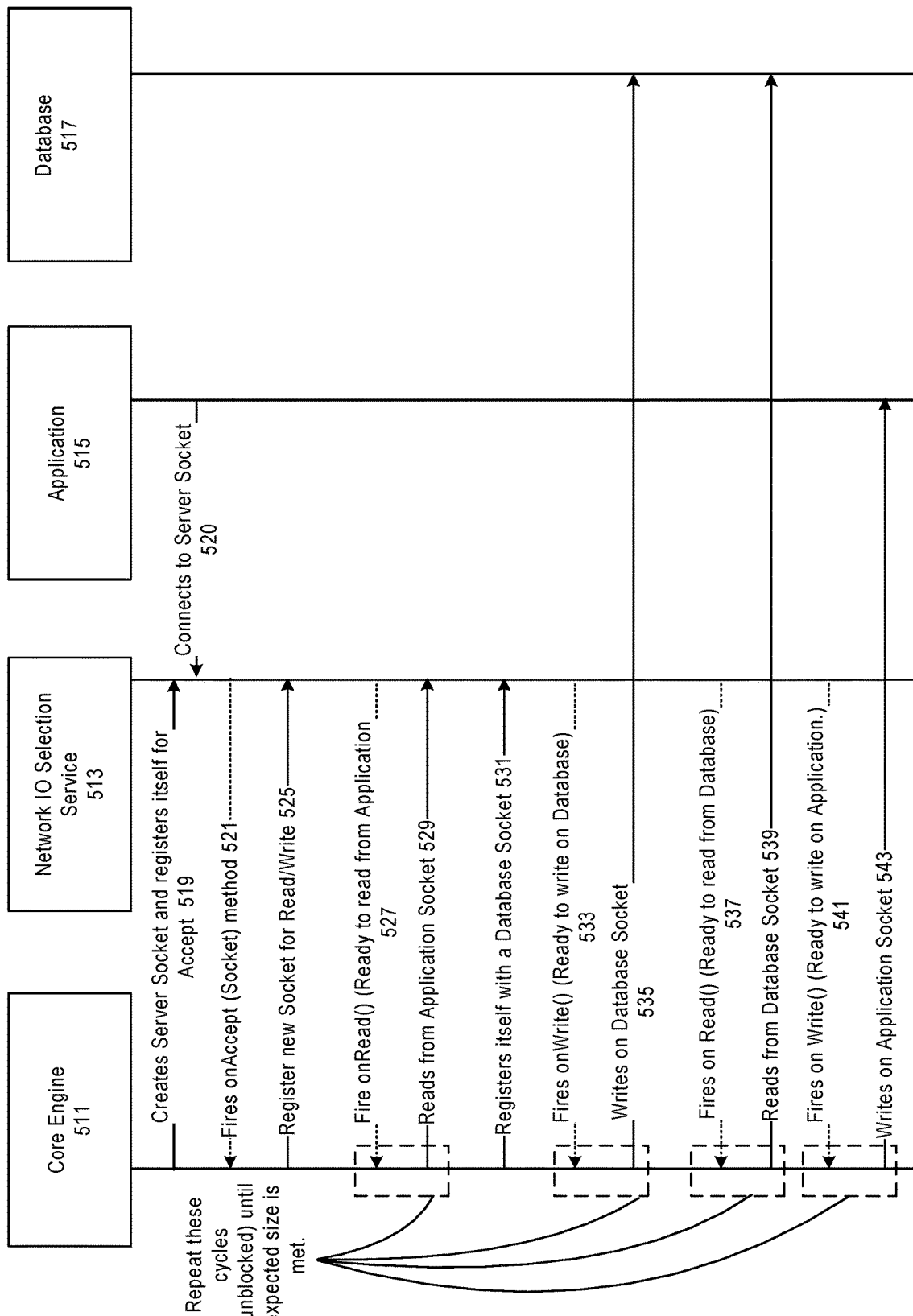
FIG. 5 illustrates an example execution flow of an application request from the perspective of the network IO module, in accordance with an embodiment.

FIG. 5 illustrates an example execution flow of an application request from the perspective of the network IO module, in accordance with an embodiment.

As shown in FIG. 5, in the example execution flow, an application request can pass through a core engine 511, a selection service 513 in a network IO module, an application 515, and a database 517.

In accordance with an embodiment, at step 519, the core engine can call an API exposed by the network IO module to create a server socket as an entry point for the application to the transparency engine. When creating the server socket, the API can take an accept event listener as a parameter. The accept event listener can be used to execute a method associated with acceptance of a new incoming connection.

In accordance with an embodiment, the core engine creates threads for IO operations; the IO operations can execute threads in the selection service, which can listen for events on the registered server socket.

At step 520, the application can connect to the transparency engine at the server socket.

At step 521, the selection service can generate an event upon accepting the incoming connection.

At step 525, the core engine registers a new socket for Read/Write in response to the event.

At step 527, the selection service can generate an event using a handler registered with the selection service if there is data ready to be read from the application.

At step 529, the core engine can use the new socket to read data from an application socket (client socket). The unblocked cycle described at step 527 and step 529 can be repeated until an expected size of data read from the application socket is met.

At step 531, the core engine can create a socket for communicating with the database using an API exposed by the network IO module and can register itself with the selection service.

At step 533, the selection service can generate an event when there is data ready to be written on the database at a database socket.

At step 535, the core engine can write the data to the database. The unblocked cycle described at step 533 and step 535 can be repeated until an expected size of data written to the database is met.

At step 537, the selection service can generate an event where data is ready to be read from the database.

At step 539, the core engine reads the data from the data socket. The unblocked cycle described at step 537 and step 539 can be repeated until an expected size of data read from the database is met.

At step 541, the selection service can generate an event when data is ready to be written to the application is ready.

At step 543, the core engine writes the data to the application at the application socket. The unblocked cycle described at step 541 and step 543 can be repeated until an expected size of data written to the application is met.

Activity Flow in a Transparency Engine

Figure 6:
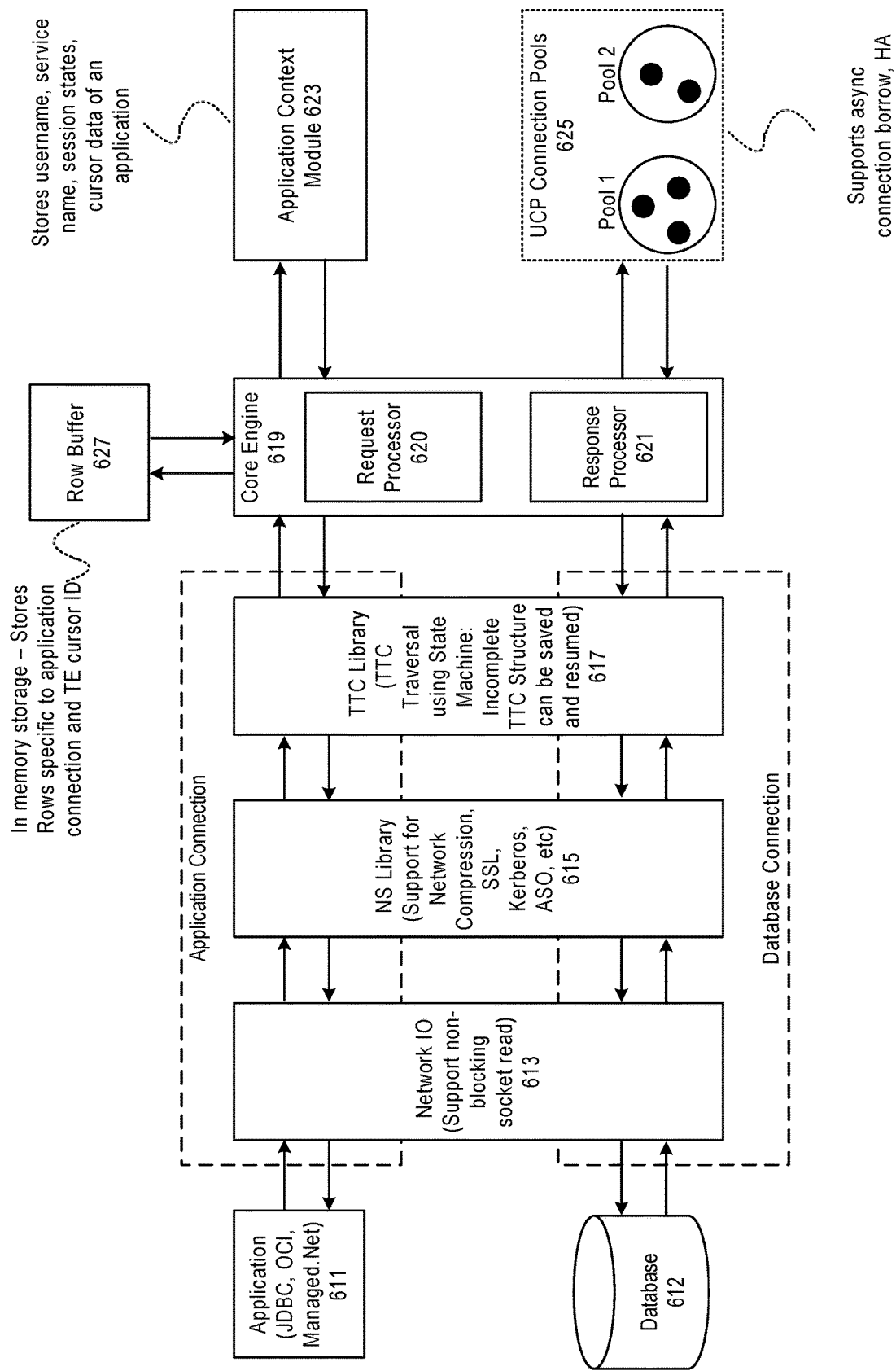
FIG. 6 illustrates an activity flow diagram in a transparency engine, in accordance with an embodiment.

FIG. 6 illustrates an activity flow diagram in a transparency engine, in accordance with an embodiment.

In accordance with an embodiment, activity from an application 611 can be detected on an application-side socket. A Network IO module 613 can use a Java selector to avoid burning a thread for each application-side socket. A single selector can be used to monitor a large number of sockets. A core engine 619 can use a NS library 615 to unmarshal the NS packets received on the application-side socket.

As further shown in FIG. 6, the core engine can use a TTC library 617 to unmarshal TTC structures sent by the application.

In accordance with an embodiment, the TTC structures can be interpreted on the core engine, where multiple TTC function codes can be received, and cursors can be closed, in which case the session states can be updated.

In accordance with an embodiment, the core engine can look up the application session states from an application context module 823. The key for the lookup can be the ID of the application socket. The application session states can include a username, a NLS session states, a module/action, a client ID and a list of opened cursors.

In accordance with an embodiment, for a FETCH operation, rows can be fetched from a local row buffer 627.

In accordance with an embodiment, if a database request is made (for example to fetch more rows or to execute a query on the database), UCP 625 can be used to return a database connection based on labels (e.g., NLS session states) and runtime load balancing. One or more labeling callbacks can be used to reconfigure the database connection by resetting session states thereon. The database connection can be subsequently used to execute an RPC on the database.

In accordance with an embodiment, the core engine can store rows in a row buffer, and prepare the response to be sent back to the application. Preparing the response can include marshalling a TTC structure and one or more NS packets, and writing bytes on an application socket.

High Availability and Load Balancing

In accordance with an embodiment, a system and method can provide database features to a plurality of heterogeneous applications using a transparency engine. The transparency engine can be used within an application server and/or database environment, for example, a database cloud service.

In accordance with an embodiment, the transparency engine can enable organizations to utilize a plurality of database features, including large-scale connectivity, high availability, and load balancing, without requiring code changes to client applications, and without requiring upgrading database client libraries, mid-tier containers, or driver versions.

In accordance with an embodiment, the transparency engine can keep track of session states, request boundaries and cursors to efficiently reuse database connections maintained by a connection pool across different applications. On failover, the transparency engine can drain existing database connections and creates new connections to the database without affecting application connections.

In accordance with an embodiment, without the transparency engine, the database features cannot be used by client applications that connect to a database over cloud, since the database features rely on FAN events, which cannot be sent over the internet from the database to the client applications. The transparency engine, when installed in a cloud environment, can receive FAN events on behalf of the client applications, and can use the FAN events to drain database connections on failovers.

Some client applications do not support request boundaries, and cannot be transparently migrated to mid-tier containers that support request boundaries due to various restrictions within an organization.

In accordance with an embodiment, the transparency engine can detect request boundaries for such client applications, without requiring code changes to the client applications.

In an example implementation, the transparency engine can mark request boundaries by detecting the start of a local transaction; begin/end request or a ping request to validate a database connection. The transparency engine makes use of request boundaries as safe places for draining, rebalancing, recovery, and concentration.

For example, the default behavior for some application server is to use "SELECT USER FROM DUAL" to validate a connection. The transparency engine can detect this as a request boundary and use this information for application continuity and/or planned down.

For local transactions, the transparency engine can detect the start of a transaction by reading the transaction start bit and can mark this as start of the request boundary.

In accordance with an embodiment, for those applications that execute on a container that do not support request boundaries, the transparency engine can use state-safe advice from a database to determine a safe place for migrate session states to a different database instance and for requesting a checkpoint.

In accordance with an embodiment, the application engine can drain database connections and acquire database sessions at a safe place when database-related outages occur, to make the outages transparent to the client applications.

In accordance with an embodiment, by draining database connections gradually, the transparency engine can eliminates logon storms and avoid disturbing work at systems that the connections are drained to.

In accordance with an embodiment, the transparency engine can receive FAN notifications, and send the FAN notifications to subscribing drivers, connection pools and application containers. The transparency engine can also direct new requests to a disabled service of a service, to a functioning instance of that service, mark existing sessions for release after their work completes, and return database connections to a connection pool.

Through the transparency engine, the above features and functionalities can be provided to client applications that cannot subscribe to FAN events.

In accordance with an embodiment, the transparency engine can provide scalability with a non-blocking architecture to maintain high availability.

For example, the non-blocking architecture allows the transparency engine to scale up to a large number of application connections (e.g., 50,000 application connections) by using a small number of non-blocking threads to monitor activity of sockets, and by using a large number of worker threads to process application requests.

FAN Notifications and In-Flight Work Recovery

In accordance with an embodiment, the transparency engine can make unplanned outages of underlying technology stacks transparent to client applications, for example, by providing immediate notification that an outage has occurred.

In accordance with an embodiment, for immediate notification, the transparency engine can use FAN, a fast application notification component for RAC that interrupts sessions immediately as an outage is confirmed. On the client side, however, FAN requires the use of a connection pool (e.g., UCP, OCI, ODP.NET) or the use of a container (e.g., WebLogic and Tuxedo). For standalone applications, custom applications and third party applications, FAN can be used for JDBC drivers. For OCI drivers, FAN requires re-linking with interruptible 10, threads and events, to interrupt sessions.

In accordance with an embodiment, the transparency engine can receive and process FAN events, so that applications and application servers do not have to relink with interruptible IO, threads and events when using OCI. If the transparency engine itself goes down, a socket router and a state recovery services can restore the service with no timeouts.

Setting HA capabilities in a tool (e.g., Oracle Net Configuration Assistant) requires substantial work, for example, setting SERVICE_NAME, timeouts, retries and delays. In accordance with an embodiment, the transparency engine enables the HA capabilities setting to be concentrated in one place, thus freeing application administrators from substantial work.

To use the in-flight work recovery feature provided by UCP or WebLogic Active GridLink, organizations that use third party Java containers or custom-built Java applications can code request boundaries in their applications, or switch to a particular connection pool or interface (e.g., OCI session pool, Oracle Tuxedo, SQL*Plus, or ODP.NET unmanaged provider). For other organizations that use their own precompiler and OCI solutions and ODP.NET unmanaged, it can be difficult for them to add their own request boundaries.

In accordance with an embodiment, the transparency engine can address the problem by providing a replay driver at the TTC level, to support features that Application Continuity for Java supports. There is no need for applications to change their code to use the replay driver.

Figure 7:
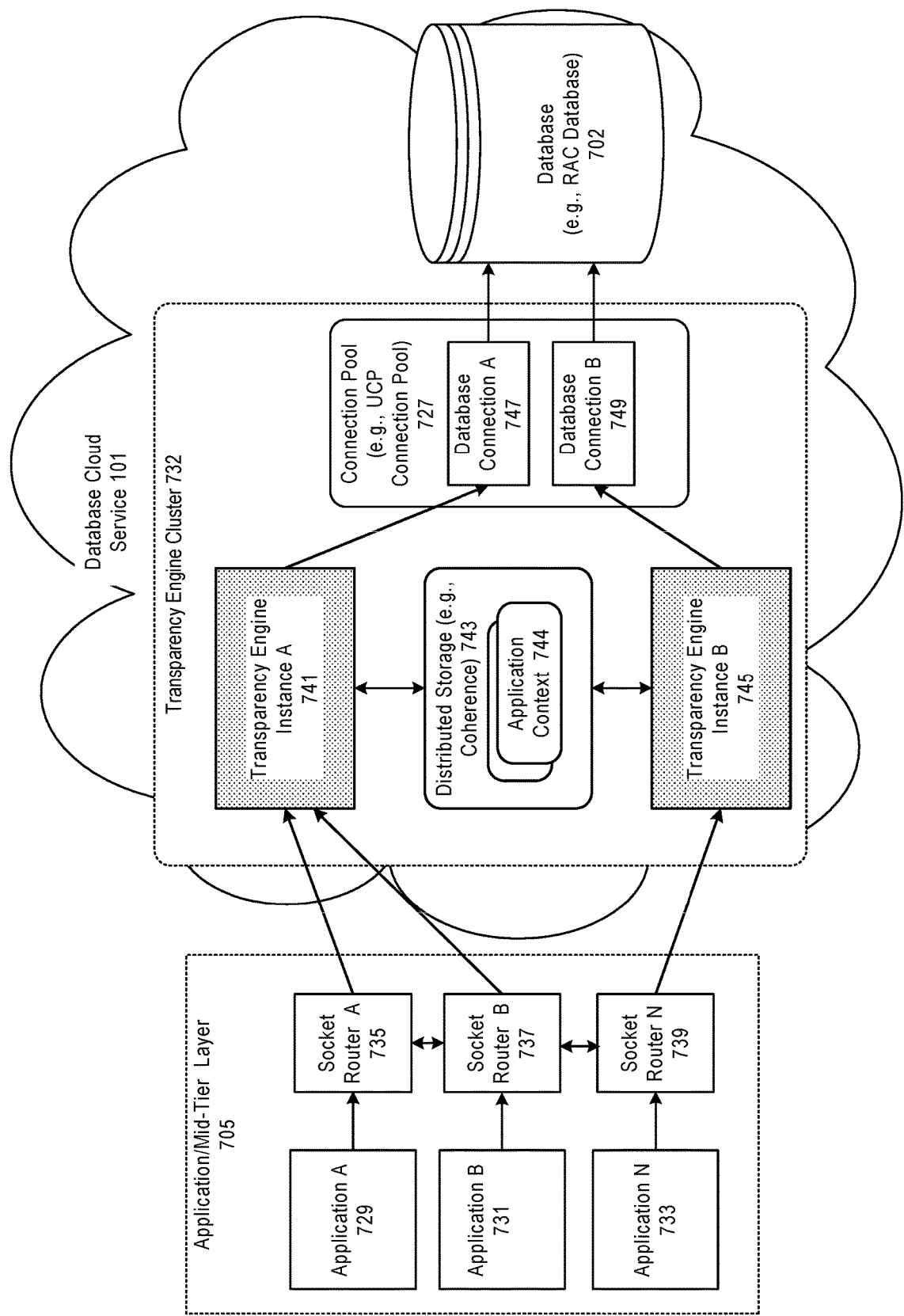
FIG. 7 illustrates a system for high availability and load balancing in a database environment, in accordance with an embodiment.

FIG. 7 illustrates a system for high availability and load balancing in a database environment, in accordance with an embodiment.

As shown in FIG. 7, a plurality of transparency instances 741, 745 can be installed in the database cloud service environment 101. The plurality of instances can be in a cluster 732, and share a distributed storage 743 for storing application contexts, for example application context 744 for application connections from an application layer 705.

In accordance with an embodiment, a plurality of UCP connection pools 727 can be used to store database connections 747, 749 connecting to one or more PDBs in a RAC database 702.

In accordance with an embodiment, a plurality of socket routers 735, 737, and 739 can be provided on the application layer. Each socket router can be associated with one of the plurality of client applications, for example, application A 729, application B 731, and application N 733, to receive socket connections from its associated application. When a transparency engine instance fails, a socket router can transparently reroute socket connections (i.e. application connections) from the failed transparency engine instance to a running instance.

In accordance with an embodiment, a socket router can perform one or more of the following: accepting incoming database connection requests, creating outgoing database connection requests, forwarding incoming SQL operations to outgoing connections, dynamically reconfiguring connections, configuring itself, monitoring the health of other socket routers, managing other socket routers, and updating itself.

Further, in accordance with an embodiment, a socket router can subscribe to a notification service, e.g., Oracle Notification System (ONS) service, and can provide fast failure notification by closing incoming connections when appropriate.

In accordance with an embodiment, a socket router can operate as Level 7 (Application layer), and forward entire SQL operations from a client application to the transparency engine.

In accordance with an embodiment, a client application can connect to the transparency engine through a socket router configured to dynamically reconnect to a transparency engine replica if needed. The socket routers on the application layer can provide fault isolation: if a socket router associated with a client application stops working, other client applications are not affected.

In accordance with an embodiment, a plurality of transparency engine instances can be placed behind a SCAN IP/Big IP or another cluster alias. A transparency engine instance can be added within a new virtual machine or on a transparency machine, and a virtual IP address of the newly added transparency engine instance can be included in the SCAN/Big IP. A new socket router can also be added in the cluster. New application sessions can be started at a new router based on demand. The distribution of load depends on a load-balancing algorithm at the SCAN/Big IP. Once connected, a client application can stay attached to a transparency engine instance.

Safe Places

Figure 8:
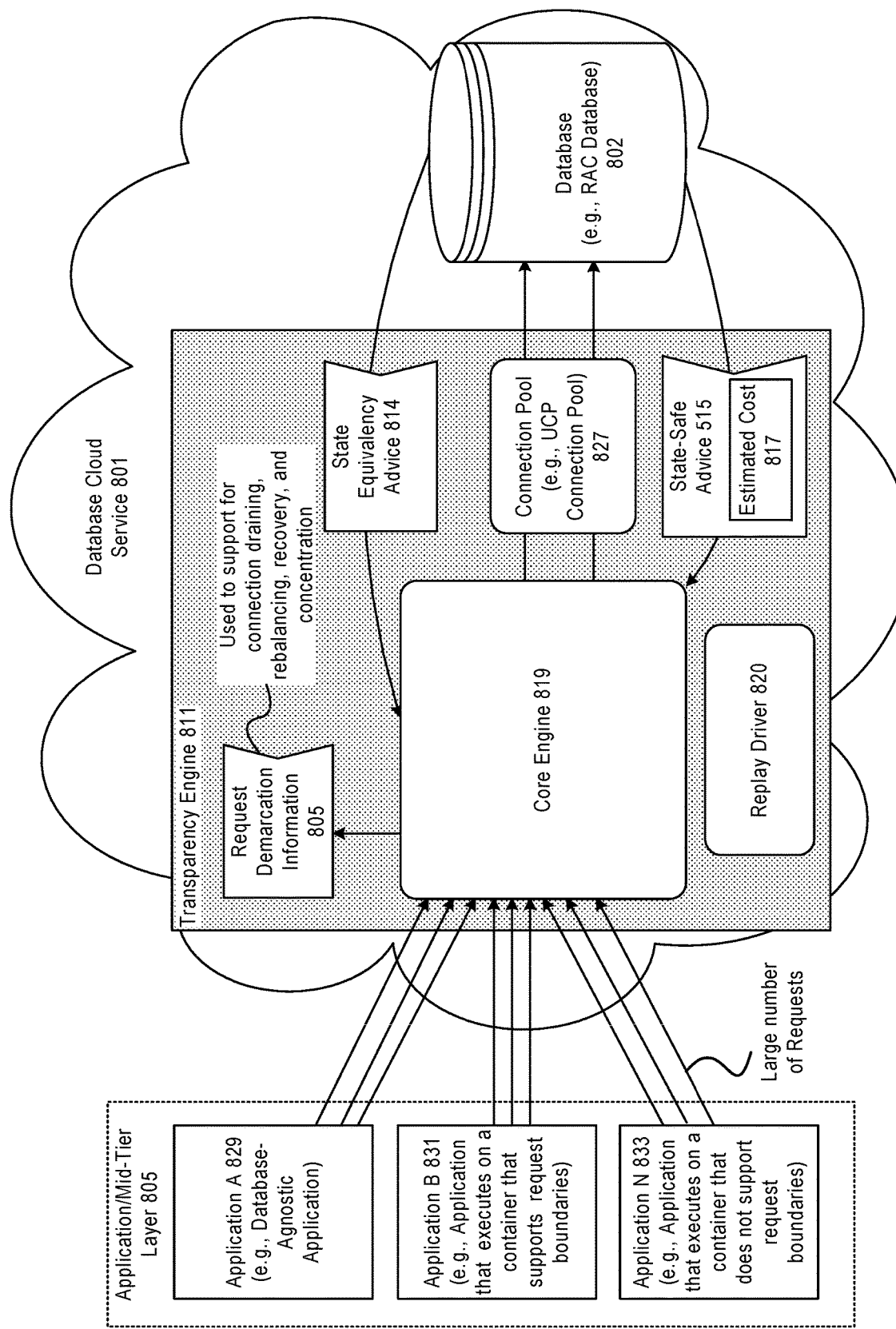
FIG. 8 further illustrates a system for high availability and load balancing in a database environment, in accordance with an embodiment.

FIG. 8 further illustrates a system for high availability and load balancing in a database environment, in accordance with an embodiment.

As shown in FIG. 8, a transparency engine 811 can be deployed, for example, as a Java application, in a database cloud service environment 801 between an application layer 805 and a database 802. The application layer can include a plurality of client applications 829, 831, and 833 that connect to the database through the transparency engine that includes one or more connection pools 827.

In accordance with an embodiment, some of the client applications do not subscribe to or process FAN events. For these client applications, the transparency engine can provide a draining functionality transparently to the client applications.

In accordance with an embodiment, for different types of client applications, the transparency engine can determine safe places using different approaches, including using stateless transaction boundaries, request boundaries, connection tests, and state safety information. A safe place can be where a client application makes a request to checkpoint states for migrating them to a different instance, and where recovery starts for application continuity capture if needed.

In accordance with an embodiment, a database-agnostic application (e.g., Application A 829) can be an application that does not create server-side states, or an application that does not change an application state once the application state is set. The transparency engine can provide built-in detection and controls for this type of client applications. The transparency engine can receive state equivalence advice from the database 814, for use in matching incoming requests to sessions with appropriate states. Such a matching can prevent an application from declaring they are stateless, when they are not stateless; and can allow concentration of "stateless" database sessions. The transparency engine can drain sessions/connections from a database instance using transaction boundaries, and replace the database instance with another database instance with the same simple states. The same simple states can include information indicating when objects are closed, or when the objects and states can be reconstructed appropriately.

For applications that use containers that support request boundaries, for example, application B 831, the transparency engine can detect request demarcation information 805, for example, when request boundaries are set; and use the request demarcation information to demark safe places for use in draining, rebalancing, recovery, and concentrating the connections. The request demarcation information can also be used to enable an application to use complex non-transactional session states within a request. Applications deployed to a container that supports request boundaries can have access to the full set of transparency features provided by the transparency engine.

In accordance with an embodiment, some applications (e.g., application N 833) do not support request boundaries, and do not provide indications as to how the applications use non-transactional session states. These applications can include those applications using diverse non-transactional session states, for example, C or OCI based applications, and applications that borrow connections from a connection pool and do not return the connection to the pool.

In accordance with an embodiment, for these applications, the transparency engine can rely on state-safe advice 815 to determine a safe place that occurs within a database session. The state-safe advice can include an estimated cost 817 to checkpoint states. States can be moved using checkpoints across database instance for planned maintenance and for application continuity.

In accordance with an embodiment, a database driver can also provide a state advisory, indicating to the transparency engine when states are known, and when a session can be moved. The same state advisory can be used for hiding unplanned outages by indicating to a replay driver 820 at a TTC level where to perform checkpoints and start capturing.

In detecting a safe place to drain a connection, the transparency engine can use request boundaries if request boundaries are received from a client application. If the client application uses a client-side DROP APIs, the transparency engine can use a DROP detach as an indication that it is safe to drain. If the client application validates the connection on borrow using pingDatabase( ), the transparency engine can identify the calls as a safe place to drain.

For containers whose default behavior for validating connections is to execute a query, for example, SELECT USER FROM DUAL, the transparency engine can use this query as a request boundary and use this information for application continuity and/or planned down.

For local transactions, the transparency engine can detect the start of a transaction by reading the transaction start bit and mark this as start of the request boundary.

In accordance with an embodiment, the transparency engine can maintain session states and a cursor map for each application connection and each database connection in an application context; and can detect when the session state changes, when transactions are started and ended, when cursor are created and for which SQL string by monitoring TTC traffic.

In accordance with an embodiment, the transparency engine can detect when a transaction is started via a bit (e.g., a transaction initiated bit) on a wire sent by a server. Once a transaction is started, the pairing between an application connection and a database connection becomes sticky, the transparency engine does not drain the database connection, since it would be too expensive to re-create the transaction somewhere else. Out of a transaction, the transparency engine can drain a connection at any of the plurality of safe places described above.

During a planned maintenance, if an in-fetch cursor cannot be entirely drained into a row buffer, an application can drain rows within a timeout. If all the rows have not been drained within the timeout, the database connection can be closed regardless. The next time the application requires rows from the cursor, the transparency engine can return an ORA-01555 error (i.e. snapshot too old error).

Figure 9:
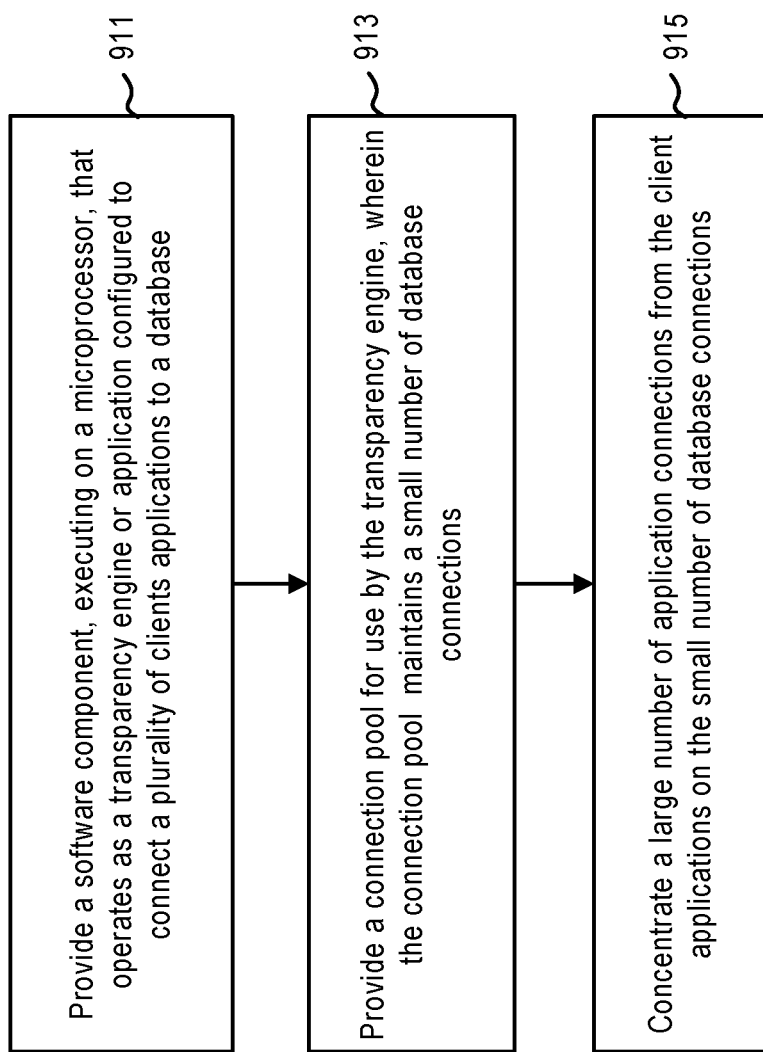
FIG. 9 illustrates a method for high availability and load balancing in a database environment, in accordance with an embodiment.

FIG. 9 illustrates a method for high availability and load balancing in a database environment, in accordance with an embodiment.

At step 911, a software component is provided on a microprocessor, wherein the software component operates as a transparency engine or application configured to connect a plurality of client applications to a database.

At step 913, the transparency engine detects request boundaries for the plurality of client applications.

At step 915, a connection pool is maintained in the transparency engine.

At step 917, the plurality of client applications utilize a plurality of high availability features of the database made available by the connection pool and the request boundaries to the client applications.

Connection Concentration

In accordance with an embodiment, the transparency engine can internally use a connection pool that includes a small number of database connections, and can receive a large number of application connections.

By keeping track of session states, request boundaries and cursors for these application connections and the small number of database connections, the transparency engine can concentrate the large number of application connections on the small number of database connections, so that the database connections can be efficiently reused across different applications.

As such, the transparency engine can reduce the total number of database connections when a large number of client applications connect to the database through the transparency engine, thereby improving scalability and performance of the database.

Figure 10:
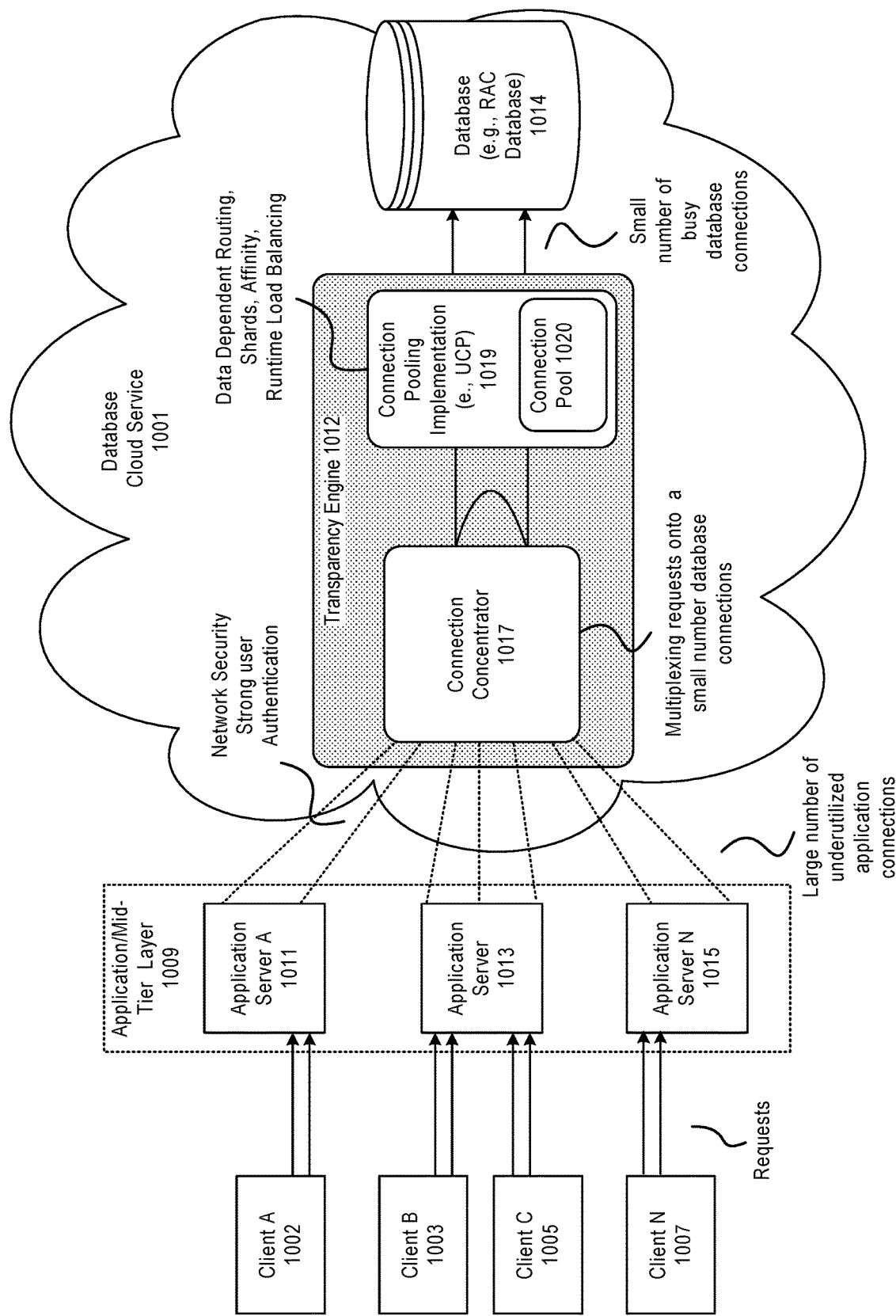
FIG. 10 illustrates a system for connection concentration in a transparency engine, in accordance with an embodiment.

FIG. 10 illustrates a system for connection concentration in a transparency engine, in accordance with an embodiment.

As shown in FIG. 10, a transparency engine 1012 that operates as a proxy database engine can be deployed, for example, as a Java application, in a database cloud service 1001.

The transparency engine can be provided between an application layer 1009 and a database 1004 (e.g., a RAC database), and can use a connection concentrator component 1017 to reduce a large number of application connections on a small number of database connections in a connection pool 1020 in a connection pooling implementation 1019.

As shown in FIG. 10, a plurality of clients 1002, 1003, 1005, and 1007 can send a large number of requests to a plurality of application servers 1011, 1014, and 1015, which can create a large number of application connections to the transparency engine in a large number of sessions. The application connections can be authenticated and condensed on the small number of busy database connections.

Figure 11:
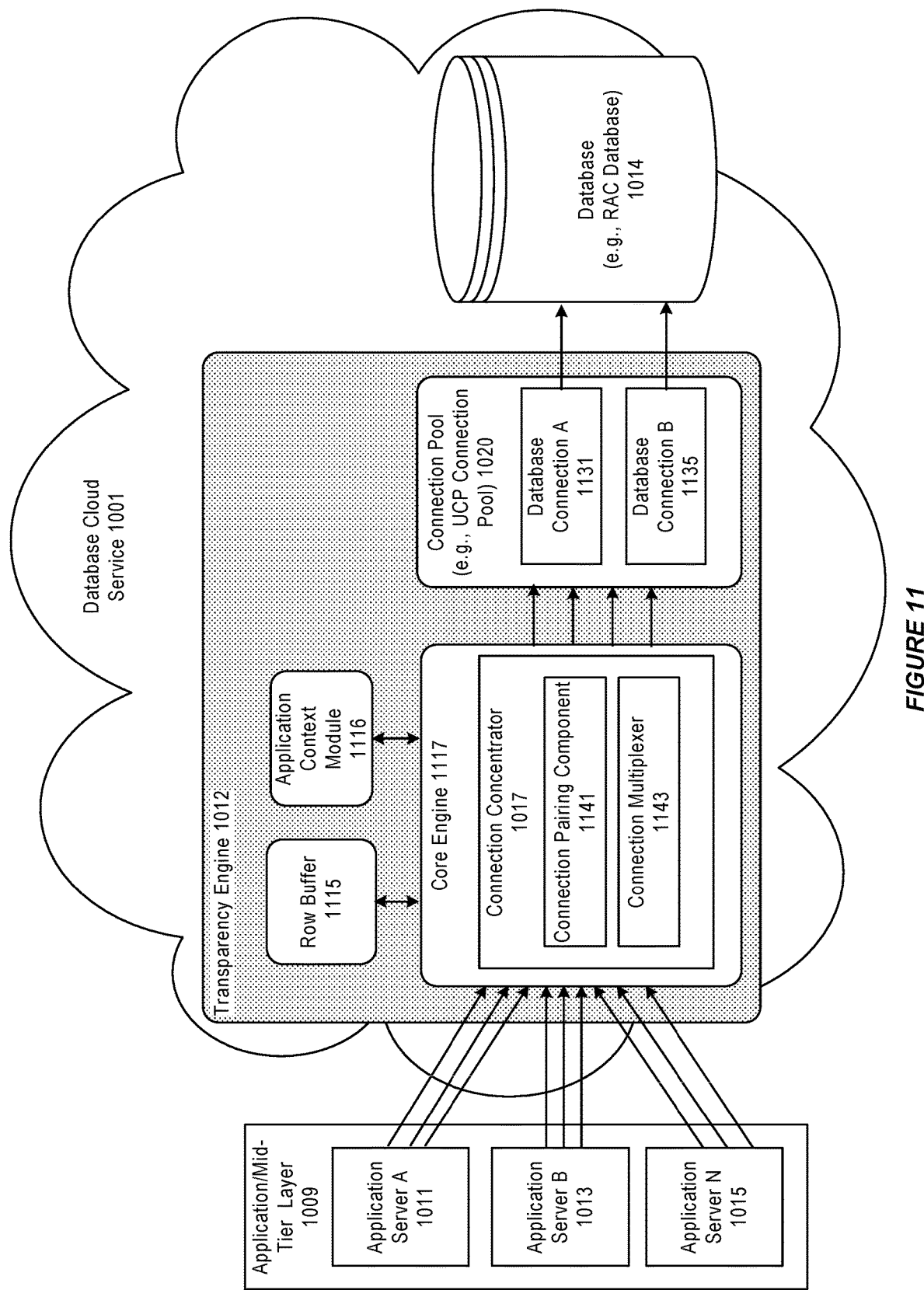
FIG. 11 further illustrates a system for connection concentration in a transparency engine, in accordance with an embodiment.

FIG. 11 further illustrates a system for connection concentration in a transparency engine, in accordance with an embodiment.

In accordance with an embodiment, a list of open cursors can be maintained in a cursor map with mappings between cursor numbers and SQL texts, so that queries on multiple application connections can be mapped to an existing open cursor on the database. Mapping multiple application connections to an existing cursor can keep the pairing of an application connection with a database connection as short as possible. If no existing cursor exists, a new cursor can be opened and stored in the cursor map.

Both the session states and the cursor map can be stored in an application context module 1116. The transparency engine can also fetch and store rows of a SELECT statement in a row buffer 1115 for later retrieval, to keep the pairing between an application and a database connection short-lived.

As can be shown in FIG. 11, the connection concentrator can be part of a core engine 1117, and can include a connection pairing component 1141 and a connection multiplexer 1143.

In accordance with an embodiment, the connection pairing component can pair M application connections and N database connections 1131, 1135 (where M>N), based on the matching of session states, availability of database instances, affinity and other rules configured by a user.

In accordance with an embodiment, with connection concentration, the pairing of inbound and outbound connections is not permanent or persistent, which requires that the transparency engine to maintain a list of opened cursors for each application connection and database connection. The transparency engine can maintain a cursor map for each application connection and each database connection.

For example, if the transparency engine receives a statement execution (OALL8) on an application connection for cursor #34, the transparency engine can determine, from the cursor map of the application application, that cursor #34 corresponds to SQL string "SELECT ename FROM emp WHERE empno=?". If the transparency engine pairs this application connection with a database connection, and determines, based on the cursor map of the paired database connection, that the SQL string already corresponds to an opened cursor (e.g., either cursor #34 or #12), the transparency engine can send an OALL8 request with the opened cursor.

If, on the other hand, there is no opened cursor for this SQL string on the paired database connection, the transparency engine can send an OALL8 request with the SQL string and cursor #0. The database can open a new cursor on the database connection, and the transparency engine can create a new entry in a cursor map for the database connection.

In accordance with an embodiment, the connection multiplexer can multiplex SELECT requests coming from multiple application connections to one database connection. For read-only requests, multiple application connections can be paired with one database connection. The transparency engine does not need to wait for the database to respond to a SELECT query execution before sending another request. Multiple such requests can be sent asynchronously. With multiplexing the response time can be better than if transparency engine has to wait for each RPC to complete.

Figure 12:
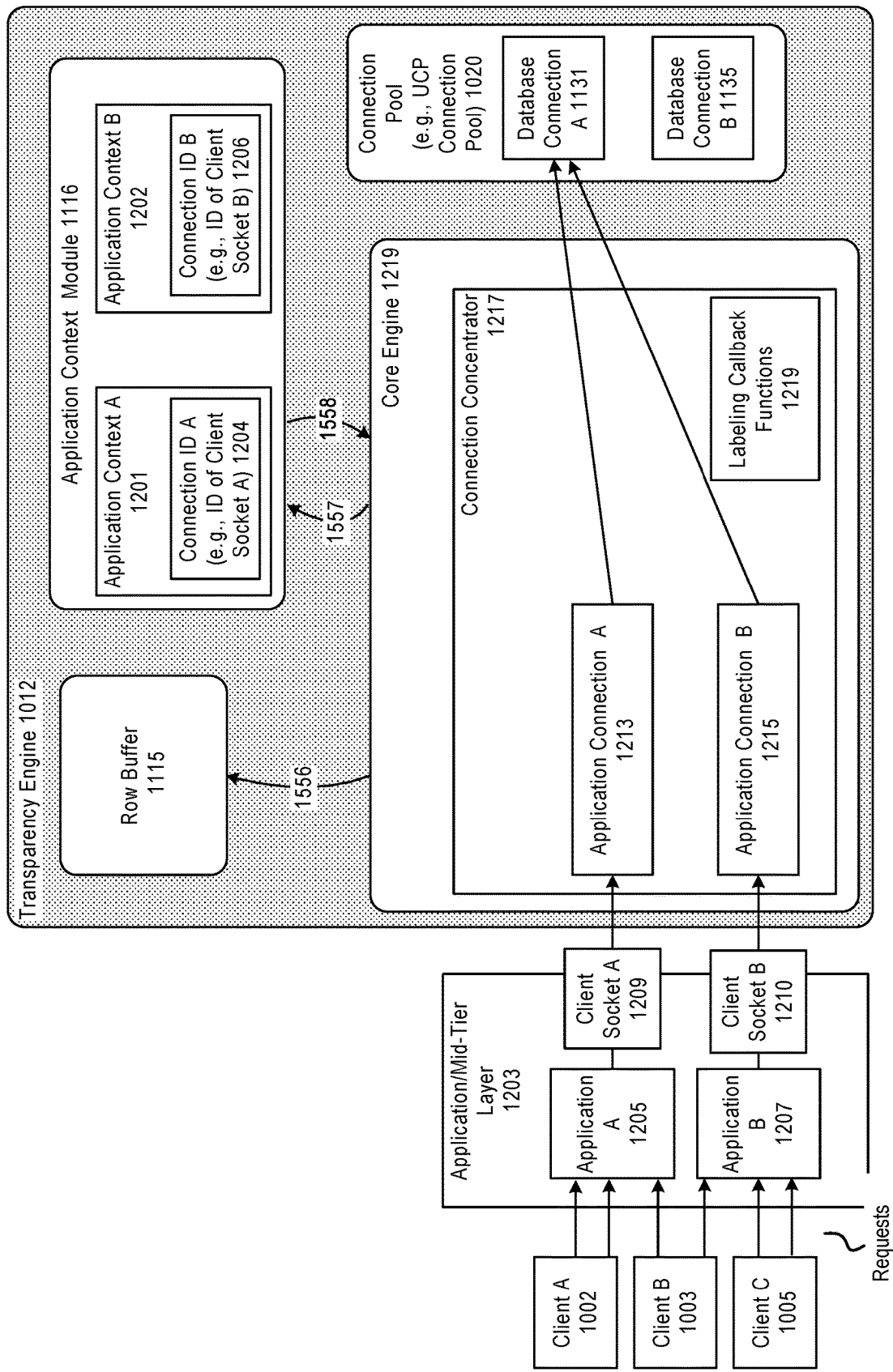
FIG. 12 further illustrates a system for connection concentration in a transparency engine, in accordance with an embodiment.

FIG. 12 further illustrates a system for connection concentration in a transparency engine, in accordance with an embodiment.

In accordance with an embodiment, a connection concentrator 1217 can be part of a core engine 1219, which can include a plurality of application connections 1213, 1215. Each application connection can be established for an application 1205, 1207 through a client socket (application socket) 1209, 1210 on the application layer, and can be identified by a unique connection ID.

In accordance with an embodiment, each application connection can be identified by the socket ID through it is created. As such, the connection ID for application connection A can be the ID of client socket A, and the connection ID for application connection B can be the ID of client socket B.

In accordance with an embodiment, an application context module 1216 can store an application context 1201, 1202 for each application. Each context of an application can include specific information of an application connection from that application, and can be stored against the unique ID of the application connection.

As shown in FIG. 12, application context A is stored against the ID of application connection A 1204, and application context B is stored against the ID of application connection B 1206.

In accordance with an embodiment, there can be one application connection for an application (e.g., a JavaServlet application in the application layer). The application context for the application can be cleaned up when the core engine receives a LOGOFF request from the application.

In accordance with an embodiment, the application context module provides an API to access to the contexts of all applications. An application specific context can be acquired 1558 from a map using an application connection ID. The core engine can get, update, and delete 1557 the context of an application using map APIs.

In accordance with an embodiment, the core engine can select a database connection from the connection pool for an application connection based on session states, and runtime load balancing, and pair the application connection with the database connection.

In accordance with an embodiment, the concentration concentrator can include a database connection configuration component 1219, which can use labeling callback functions to reconfigure the database connection by resetting its session states to better match the application connection.

For example, if the application connection has a particular set of session states, the core engine can determine whether a database connection with that set of session states exist in the connection pool. If such a database connection exists, the core engine can pair the application and the database connection. Otherwise, the core engine can call a cost method in labeling callback functions to calculate an estimated cost for reconfiguring each database connection in the connection pool to the particular set of session states. The core engine can select the least costly database connection, use a configuration method from the labeling callback functions to reconfigure that database connection, and pair the application connection with the reconfigured database connection.

In accordance with an embodiment, the transparency engine enables stateless applications, or applications that uses request boundaries, to share both database connections and database sessions, so that a large number of requests, session, and/or connections received from the applications can be multiplexed on one or a small number of database connections.

As such, the pairing between the application connection and the database connection can be short-lived, or released as early as possible, so that the database connection can be paired with another application connection.

In accordance with an embodiment, the core engine can immediately fetch all rows resulting from a SELECT query and store these rows in a local buffer. When all the rows cannot be fetched and stored 1115 into the row buffer, the core engine can make the pairing between the application connection and the database connection persistent, and disable concentration for this application connection until the cursor reaches end-of-fetch.

Further, in accordance with an embodiment, the transparency engine can also maintain state equivalence for database sessions, or maintain a large number of database session states, so that a paired database connection can be released as early as possible. The database session states maintained by the transparency engine can be reset when an application connection is attached to a different database connection.

Referring back to FIG. 12, using the various techniques above, the transparency engine can concentrate application connection A and application connection B on database connection A. The transparency engine can also multiplex multiple requests sent by a plurality of clients 1002, 1003, and 1005.

In accordance with an embodiment, concentrating connections through the transparency engine has the advantage of being transparent to applications and to a database server.

Figure 13:
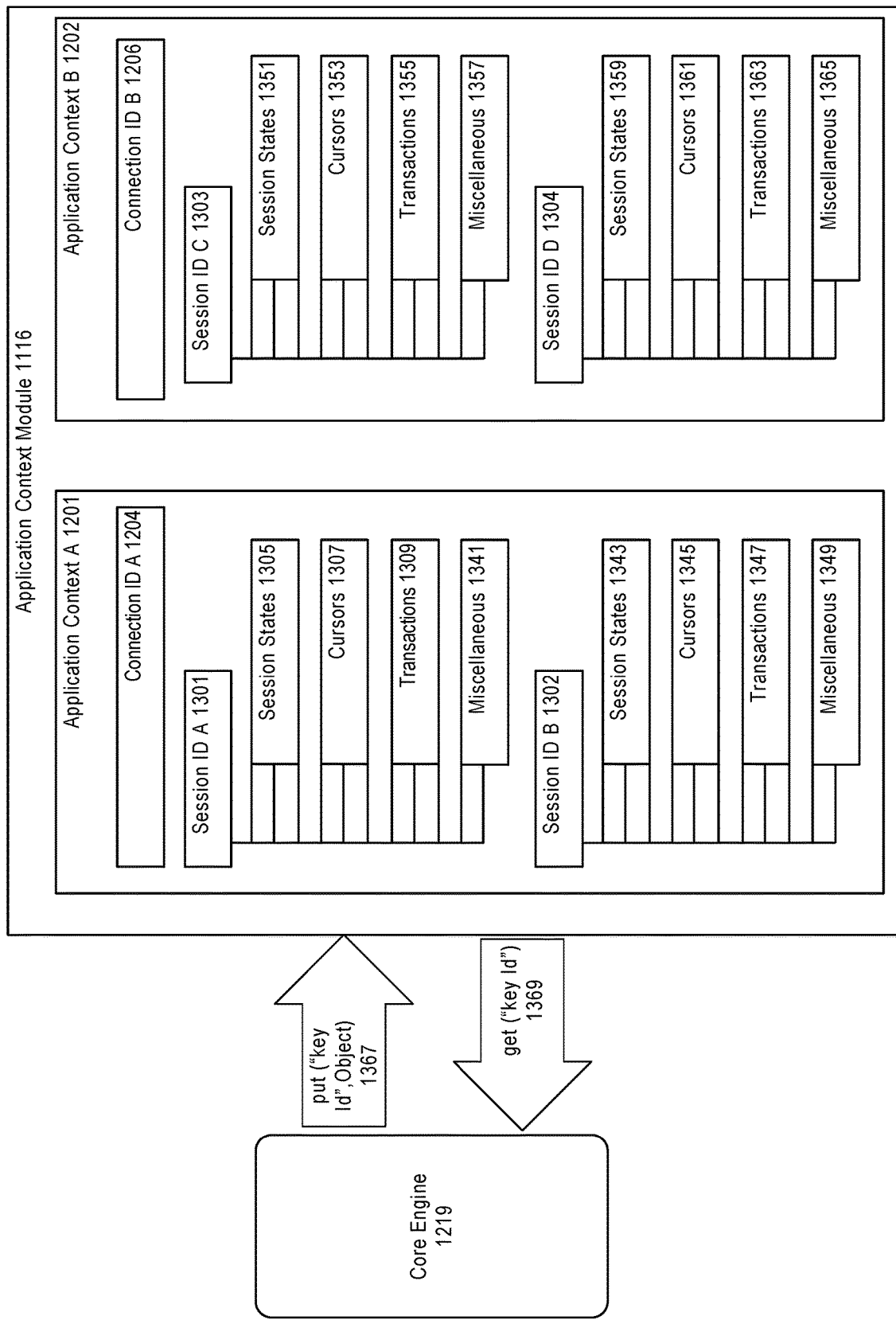
FIG. 13 further illustrates a system for connection concentration in a transparency engine, in accordance with an embodiment.

FIG. 13 further illustrates a system for connection concentration in a transparency engine, in accordance with an embodiment.

FIG. 13 further describes the application context module as described in FIG. 12.

As shown in FIG. 13, each of the plurality of application contexts 1201, 1202 in the application context module can include a connection ID 1204, 1206, and a plurality of session IDs, for example, session ID A 1301 and session ID B 1302 in application context A, and session ID C 1303 and session ID D 1304 in application context B.

In accordance with an embodiment, each application context corresponds to an application in the application layer and can store information specific to an application connection created by the application through a client socket.

In accordance with an embodiment, each session ID can be a client ID that sends requests through an application in the application/mid-tier layer to the transparency engine.

In accordance with an embodiment, associated with each session ID are session states 1305, 1343, 1351, and 1359, cursor data 1307, 1345, 1553, and 1361, transactions 1309, 1347, 1355, and 1363, and miscellaneous information 1341, 1349, 1357 and 1365.

In accordance with an embodiment, the miscellaneous information can include an application's user name, service, time zone, and current schema.

As further shown in FIG. 13, the core engine can retrieve 1367, 1369 an application context using a key ID, which can be a connection ID in that application context.

Figure 14:
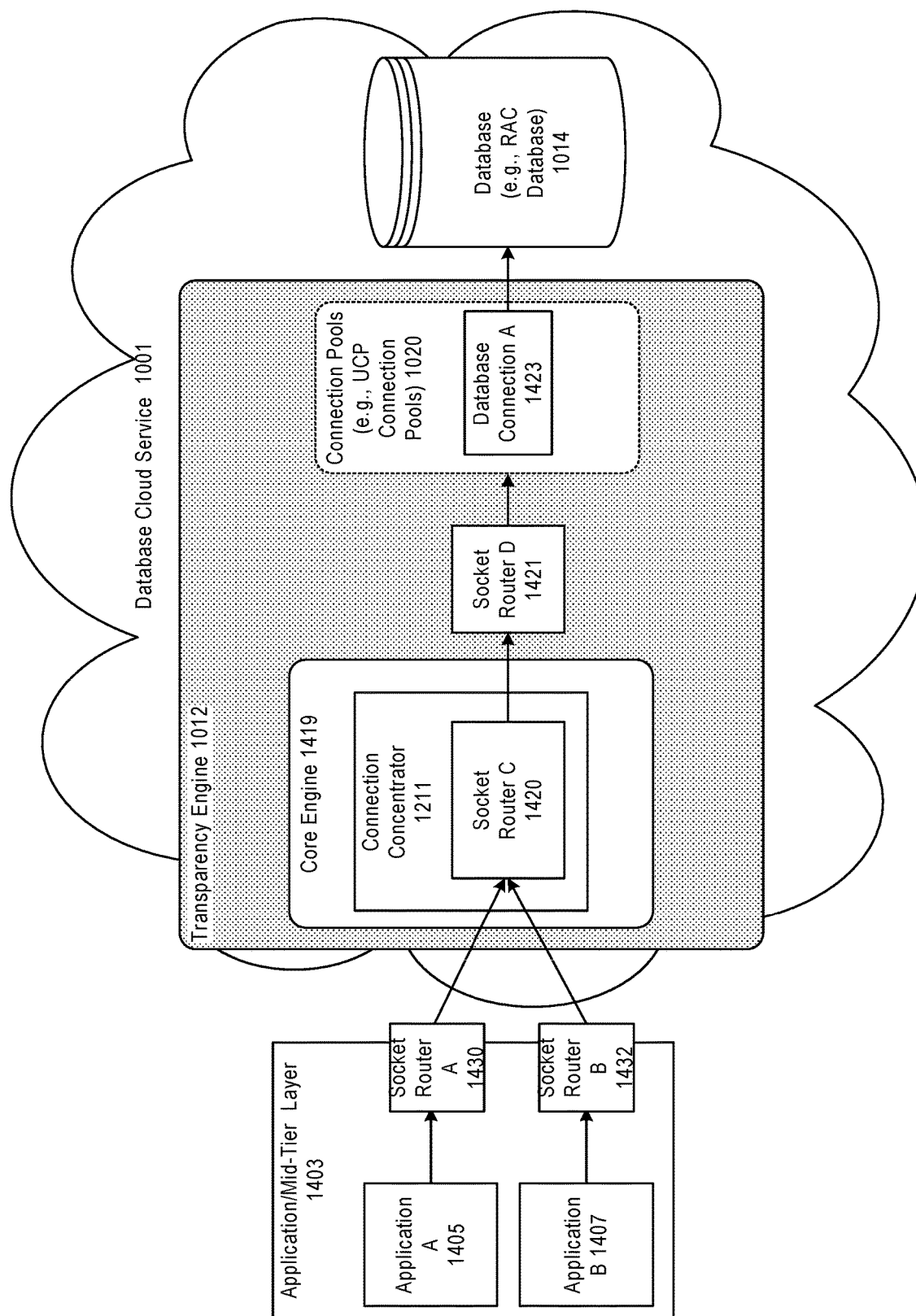
FIG. 14 further illustrates a system for connection concentration in a transparency engine, in accordance with an embodiment.

FIG. 14 further illustrates a system for connection concentration in a transparency engine, in accordance with an embodiment.

In accordance with an embodiment, the connection concentrator 1211 can be implemented as a socket router 1420 in a core engine 1419. By using a plurality of socket routers 1430, 1432, 1420, and 1421, the system can enable Application A 1405 and application B 1407 to share a single database connection 1423.

In some system, there would be no way for the applications to share the database connection, if the system includes a first application, and a second application, and a database, with the first application, the second application, and the database on different machines. Each application in the system would have to log into the database, create a new database session, use the database connection, and log out, so that the other application would have a chance to log into the database.

FIG. 14 illustrates an embodiment that two applications on different machines can share one database connections on a third machine.

For example, after application A finishes using the database connection, application B can send a query using the database connection. Socket router B can request the database connection from socket router A. When socket router A releases the connection, socket router B can use the connection to forward the query from application B.

In the above example, socket router C demuxes the queries from socket router A and socket router B onto the single database connection.

In accordance with an embodiment, socket router C in the connection concentrator is connected only to other socket routers, which enables socket router C to hand off live connections.

For example, if one connection concentrator is overloaded, it can hand off live database connections to another concentrator to reduce its own workload. If a connection concentrator goes down or needs to be patched, the capability to dynamically move connections would allow a socket router to move a hot database connection from the hung connection concentrator to a new, live connection concentrator.

Figure 15:
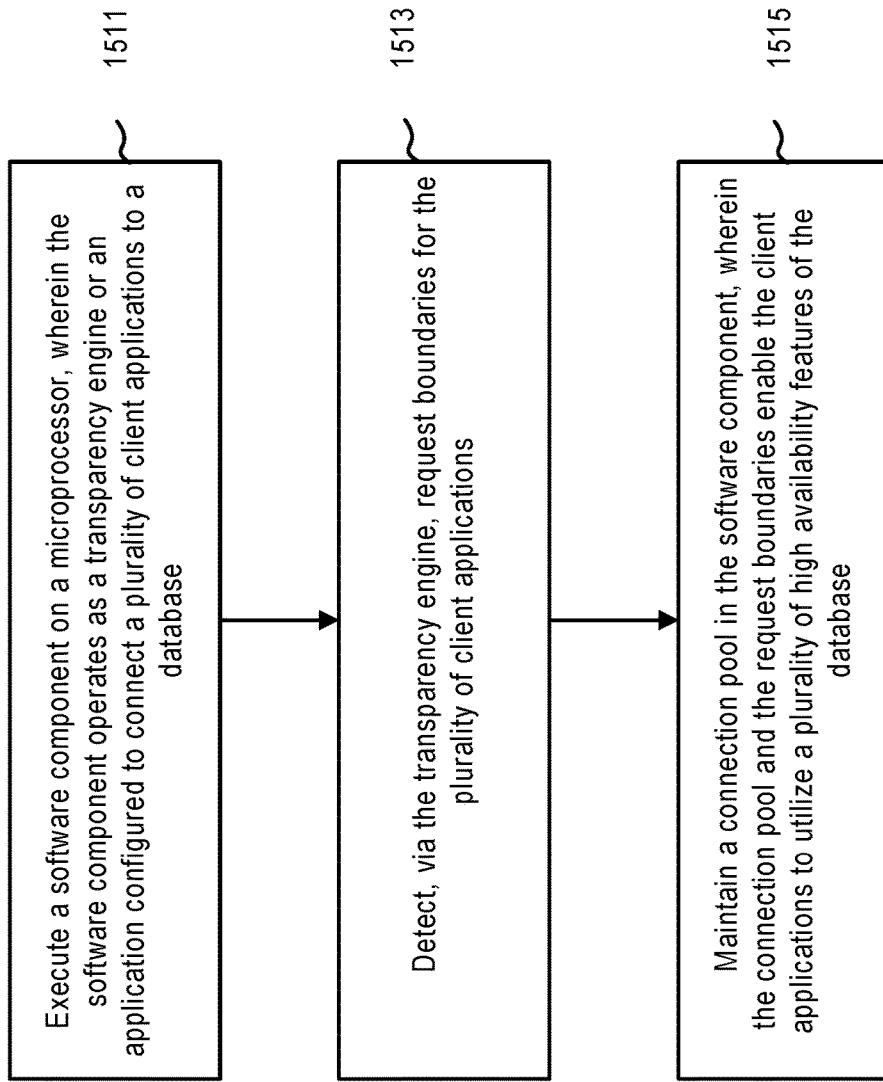
FIG. 15 illustrates a method for connection concentration in a transparency engine, in accordance with an embodiment.

FIG. 15 illustrates a method for connection concentration in a transparency engine, in accordance with an embodiment.

As shown in FIG. 15, at step 1511, a software component executing on a microprocessor is provided, wherein the software component operates as a transparency engine or application configured to connect a plurality of client applications to a database.

At step 1513, a connection pool for use by the transparency engine is provided, wherein the connection pool maintains a small number of database connections.

At step 1515, a large number of application connections from the client applications are concentrated on the small number of database connections.

Row Buffering

In accordance with an embodiment, the transparency engine can maintain one or more local row buffers to store the rows fetched from a database. The local buffers can be filled by pre-fetched rows from the database.

When a client application requests rows from the database through the transparency engine, the transparency engine first checks the local buffers for required rows. If the required rows are present, the transparency engine can send the rows to the client applications without querying the database. Otherwise, the transparency engine can send a request to the database.

In accordance with an embodiment, the local buffers can improve the response time to the client application, and offload the database from executing less queries.

In accordance with an embodiment, rows in the local buffer can be stored against cursor data which has the information such as cursor id, SQL string and bind values. Based on this information, a fetch request from the client application can be served from the local buffer without querying the database.

Figure 16:
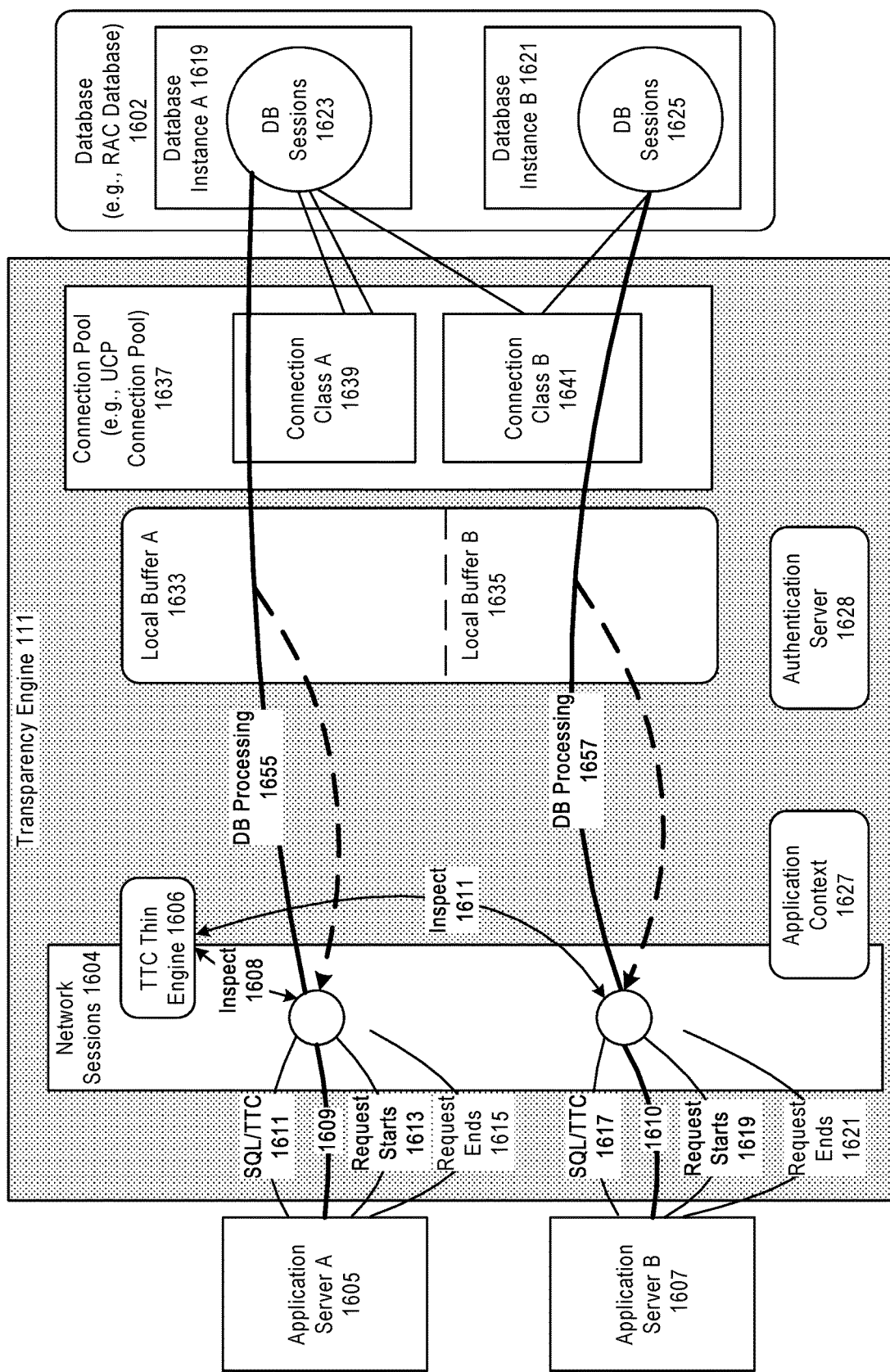
FIG. 16 illustrates a system for row buffering in a transparency engine, in accordance with an embodiment.

FIG. 16 illustrates a system for row buffering in a transparency engine, in accordance with an embodiment.

As shown in FIG. 16, a transparency engine 111 that operates as a proxy database engine can be deployed, for example, as a Java application, between an application layer with application servers 1605, 1607 and a database 1602 (e.g., a RAC database).

In accordance with an embodiment, the transparency engine can include a UCP connection pool 1637 that manages light TTC thin connections with full UCP feature set for transparent high availability, performance and concentration. The connection pool can include a plurality of connection classes 1639, 1641, and each connection class can represent a security domain that permits database connections and database sessions to be reused by other users, and to be shared by named users. Separating database connections into different connection classes enable the creation of a pooling of database sessions in the database.

For example, in each of the plurality of database instances 1619, 1621 of the database, there can be one or more database session pools 1623, 1625. A state signature needs to be matched when a database session is assigned to an application connection.

As further shown in FIG. 16, the transparency engine includes a plurality of local buffers 1633, 1635, an application context module 1627, and an authentication server 1628. The authentication server can be configured to secure application connections, and authenticate them to connect to the database. The application context can store session states for application connections/sessions connected to the transparency engine.

In accordance with an embodiment, a TTC (two-task common protocol) thin engine 1606 can be provided at a network session layer 1604, to inspect 1608, 1611 each application connection 1609, 1610 from the application servers.

The TTC thin engine can receive SQL requests/TTC 1611, 1617 structures from the application servers, and can detect when a request starts 1613, 1619 and when a request ends 1618, 1620.

In accordance with an embodiment, if after inspection, the TTC thin engine determines that row data requested by a request over an application connection are not in a local buffer, the request can be passed through to a database connection. Multiplexing occurs at call boundaries and transaction boundary for stateless applications and at request boundaries.

In accordance with an embodiment, the database connection can be allocated in the matching connection class, with a matching state signature. A virtual circuit 1655, 1657 can be established and data can be returned in-band through the transparency engine and an original net session. The database connection can be released as soon as there is no transaction and fetch in effect.

In accordance with an embodiment, the TTC thin engine can compare a fetch size from a client application and the number of rows in a result set returned from the database.

If the number of rows in the result set is bigger that the fetch size, the TTC thin engine can store all the rows in the result set to a local buffer. There can be a threshold on the number of rows that can be stored in the row buffer. The rows can be stored in the row buffer against the application's unique application connection ID and a unique cursor ID generated for the current query execution.

Figure 17:
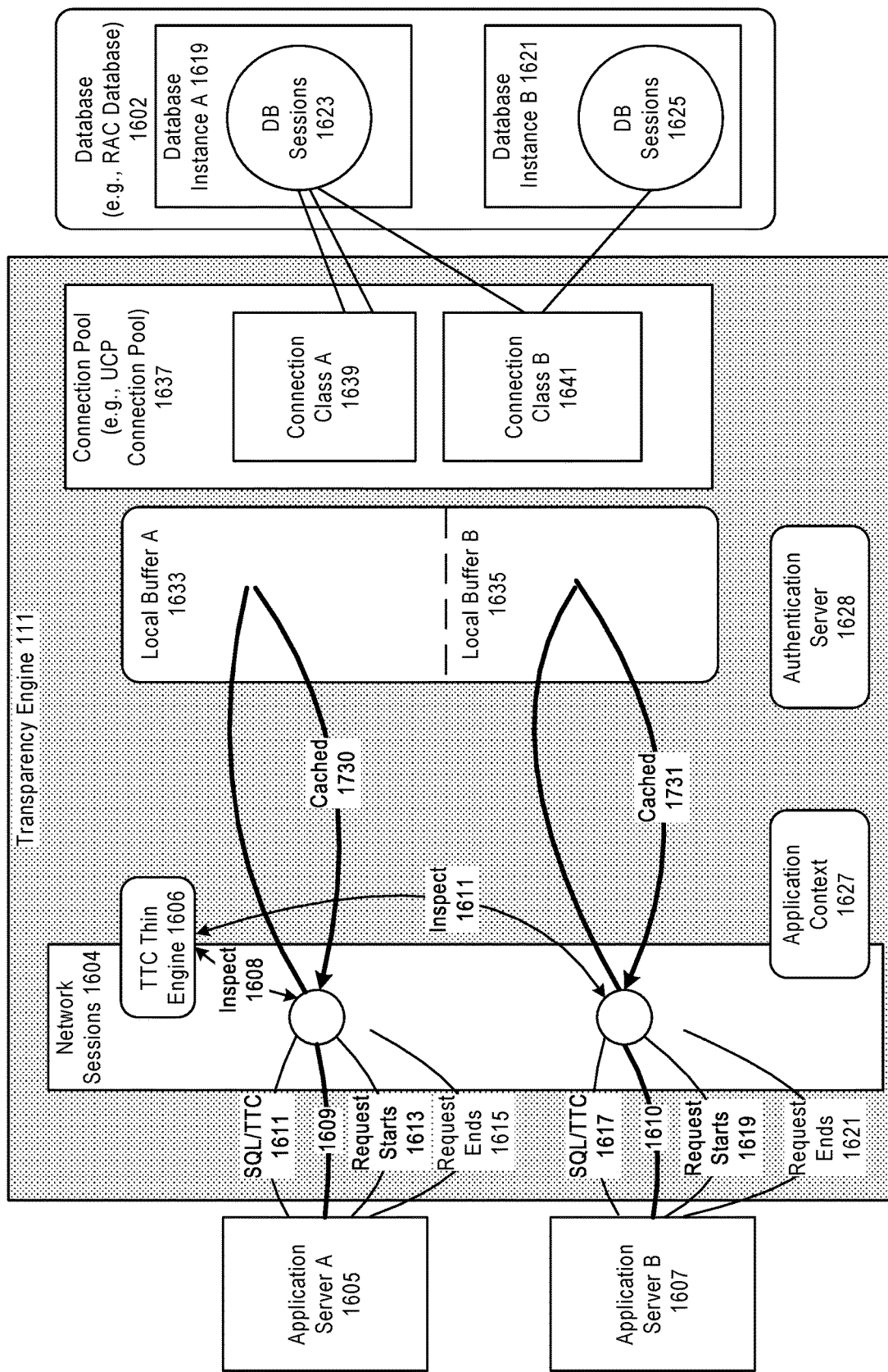
FIG. 17 further illustrates a system for row buffering in a transparency engine, in accordance with an embodiment.

FIG. 17 further illustrates a system for row buffering in a transparency engine, in accordance with an embodiment.

In FIG. 17, after inspection, the TTC thin engine determines that the local buffers contains the row data, the row data can be retrieved 1730, 1731 from the local buffers, and returned to the application servers.

Figure 18:
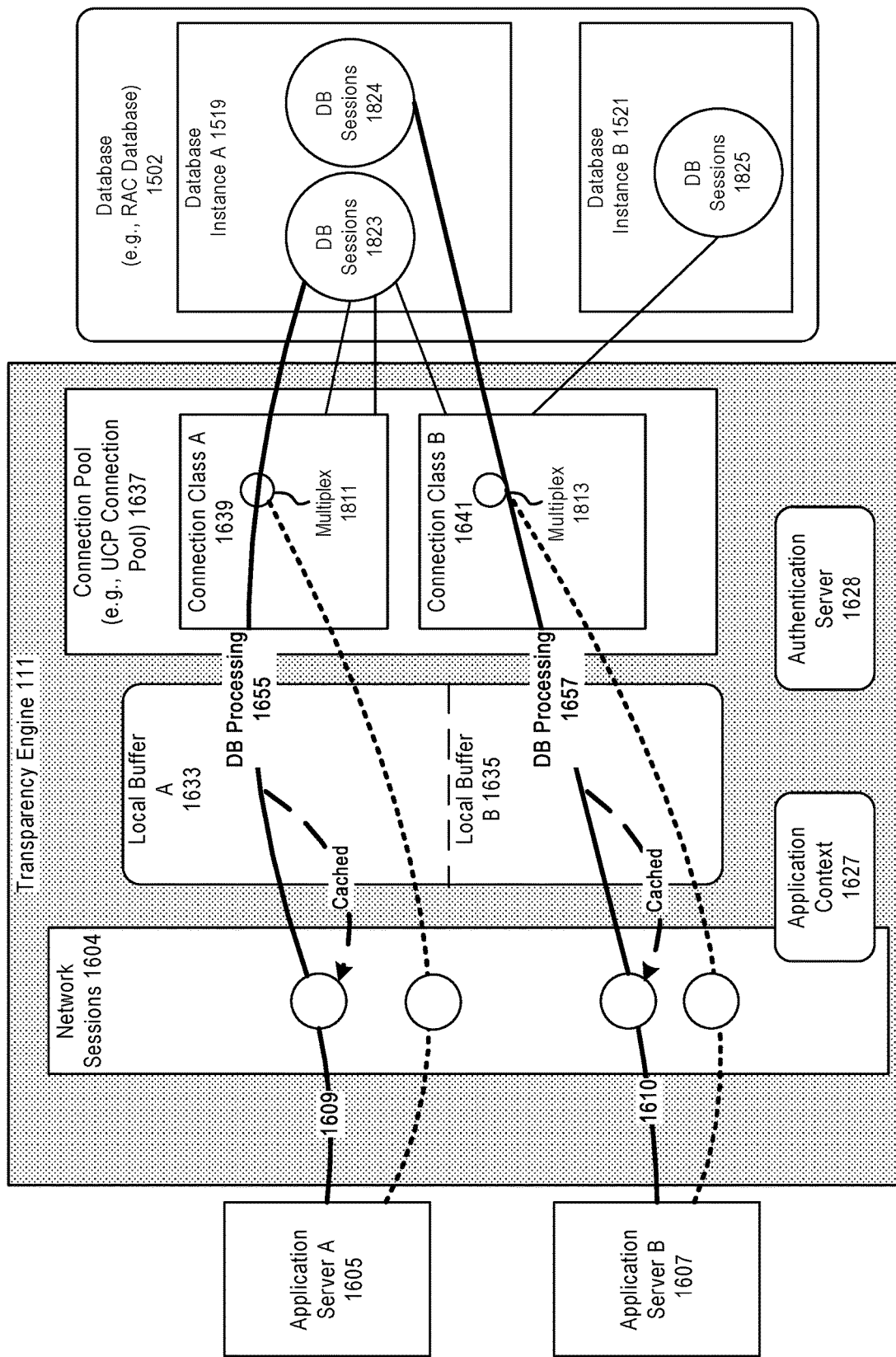
FIG. 18 further illustrates a system for row buffering in a transparency engine, in accordance with an embodiment.

FIG. 18 further illustrates a system for row buffering in a transparency engine, in accordance with an embodiment.

In FIG. 18, the sessions can be assigned by matching the session signature. Session state can be set as an exception since matching or setting a session state can introduce latency. When sessions have non-matching states, connection multiplexing 1814, 1815 can be used.

In accordance with an embodiment, the transparency engine can observe secure connection classes, state signatures and state alignments. Multiplexing occurs within a connection class using dedicated connections. In FIG. 18, the separation into connection classes creates a pooling of database sessions 1823, 1824, and 1825 in the database.

With the addition of routing, these can be directed to different PDBs or different partitions in the database. The state signature can be matched when the session is assigned.

Figure 19:
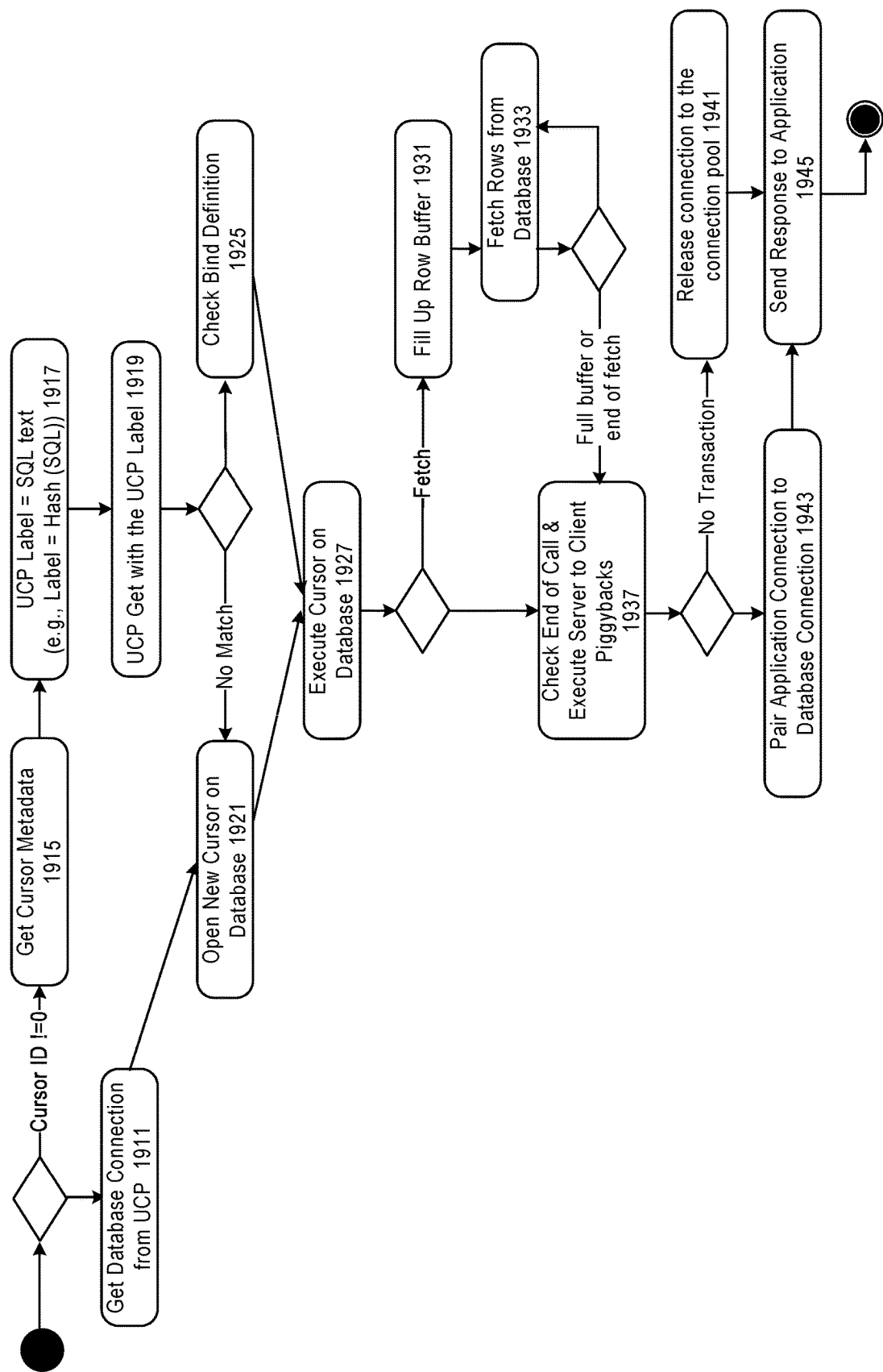
FIG. 19 illustrates an execution activity diagram for a request in a transparency engine, in accordance with an embodiment.

FIG. 19 illustrates an execution activity diagram for a request in a transparency engine, in accordance with an embodiment.

In accordance with an embodiment, when an application executes a query (e.g., a SQL query), the application can send a request (e.g., an OALL8 request) on an application connection to the transparency engine. A request can have various parameters, for example, pisdef (i.e. OALL8 parameters definition), cursor ID, and options. The parameters can be used to decide which action to perform for the OALL8 request.

For example, each bit of the options parameter can correspond to an operation on a database. These bits can represent PARSE, EXECUTE, DESCRIBE, and FETCH. If the OALL8 request has only PARSE, EXECUTE, DESCRIBE options set, the SQL query can be parsed and executed on the database, with the DESCRIBE option describing the columns of the SQL query. If the FETCH option is also set in the request, the application is also configured to fetch rows from the transparency engine or the database.

In accordance with an embodiment, in FIG. 19, the connection concentration feature is enabled.

As shown in FIG. 19, at step 1911, the request is new and has a zero cursor ID associated with it. The transparency engine can process the request, and build a new request to a database, and use the unique ID of an application connection to get an application context. The application context can include a set of session properties of the application connection, such as a user name, a service name, a time zone, and session states. The transparency engine can use the session properties to locate a matching database connection for an authenticated service of the application connection, to process the newly-built request. If an exact match is not found, the transparency engine can use connection labeling callbacks to configure a selected database connection for the application.

At step 1921, a new cursor is opened on the database. In accordance with an embodiment, a cursor can be a pointer to a memory region inside a process global area, and can be associated with cursor metadata including SQL text, bind definition, bind data, and states of execution.

At step 1915, the request has a non-zero cursor ID. The transparency engine uses the unique ID of the application connection to get an application context, and get cursor metadata of the non-zero cursor from the application context.

At step 1917, the transparency engine converts the SQL text of the request to a UCP label, for example, using a hash function.

At step 1919, the transparency engine uses the UCP label to identify a database connection to be paired with the application connection.

At step 1925, the transparency engine determines, based on the cursor metadata, that the SQL string/text already corresponds to an opened cursor on the paired database connection, and sends the request with the opened cursor on the database connection. The bind definition of the open cursor can be checked, or changed. However, if the paired database application is not associated with an opened cursor that corresponds to the SQL string, the transparency engine can send the request with the SQL string and cursor #0, to enable a database server to open a new cursor on the database connection, as shown at step 1921. The transparency engine can create a new entry in a cursor map for the database connection. For each application and database connection, the transparency engine maintains a map of a cursor and a SQL text with a bind definition.

At step 1927, the transparency engine executes the zero cursor or the non-zero cursor on the database.

At step 1931, the query is a SELECT request with a zero cursor, there is no open transaction (e.g., the application connection state is IN TRANSACTION), and the database has more rows than the application's fetch size. The transparency engine fetches extra rows from the database in advance, and stores them into the row buffer. The transparency engine can store the rows in the background, so as not to affect the response time of the request. The rows in the row buffer can maintain their order received from the database, and can be sent to the application in the same order.

At step 1933, the transparent engine keeps fetching the extra rows, until the row buffer is full or the end of the fetch is reached.

At step 1937, the end of call is reached, and the transparency engine sends a piggyback message to the application.

At step 1941, there is no open transaction and the transparency engine releases the database connection to the connection pool, computes states of the cursor, and uses the computed cursor states to determine whether to close the cursor. If the cursor is frequently executed or in a hot list, the cursor can be left open. However, if the end of the fetch has not been reached, the cursor can be left in the middle of the fetch.

At step 1943, there is an open transaction, and the transparency engine keeps the pairing between the application connection and the database connection.

At step 1945, the transparency engine processes a response (e.g., an OALL8 response) from the database, updates the application's context information if required, builds a response to the application, and sends the response to the application.

Figure 20:
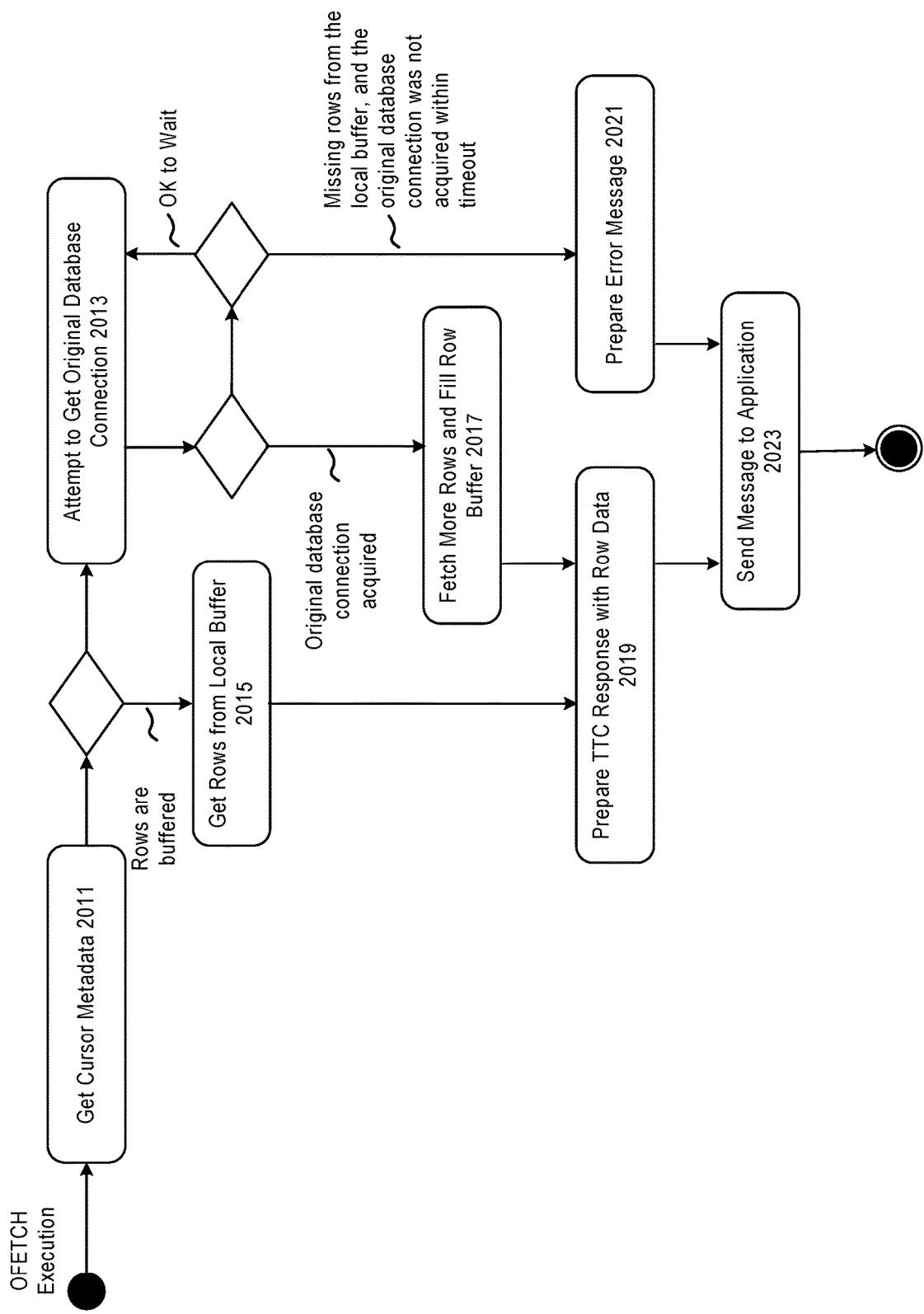
FIG. 20 further illustrates an execution activity diagram for a request in a transparency engine, in accordance with an embodiment.

FIG. 20 further illustrates an execution activity diagram for a request in a transparency engine, in accordance with an embodiment.

In accordance with an embodiment, FIG. 20 describes an example execution activity flow for an OALL8 request received from an application on an application connection, where the request has a non-zero cursor ID, a fetch size, and an OFETCH bit set on the options parameter, and the application connection state is NOT IN TRANSACTION.

As shown in FIG. 20, in accordance with an embodiment, at step 2011, after receiving the request (e.g., in thin driver), a core engine in the transparency engine forwards the request to an OFETCH request processor, which retrieves cursor metadata of the application connection.

At step 2013, rows that the request is configured to retrieve are not found in a row buffer or the total rows available in the row buffer is below a threshold. The transparency engine uses session properties of the application connection to acquire the original database connection previously used to execute the request on a database.

At step 2017, the transparency engine uses the original database connection to fetch more rows from the database, and fill the row buffer.

At step 2019, the transparency engine prepares a TTC response with row data to be sent to the application.

At step 2021, there are missing rows in the row buffer, and the original database connection was not acquired within a timeout. The transparency engine prepares an error message to be sent to the application.

At step 2015, the rows that the request is configured to retrieve are buffered in the row buffer, and the transparency retrieves the rows from the row buffer.

At step 2023, the transparency engine sends either the error message or the TTC response to the application.

Figure 21:
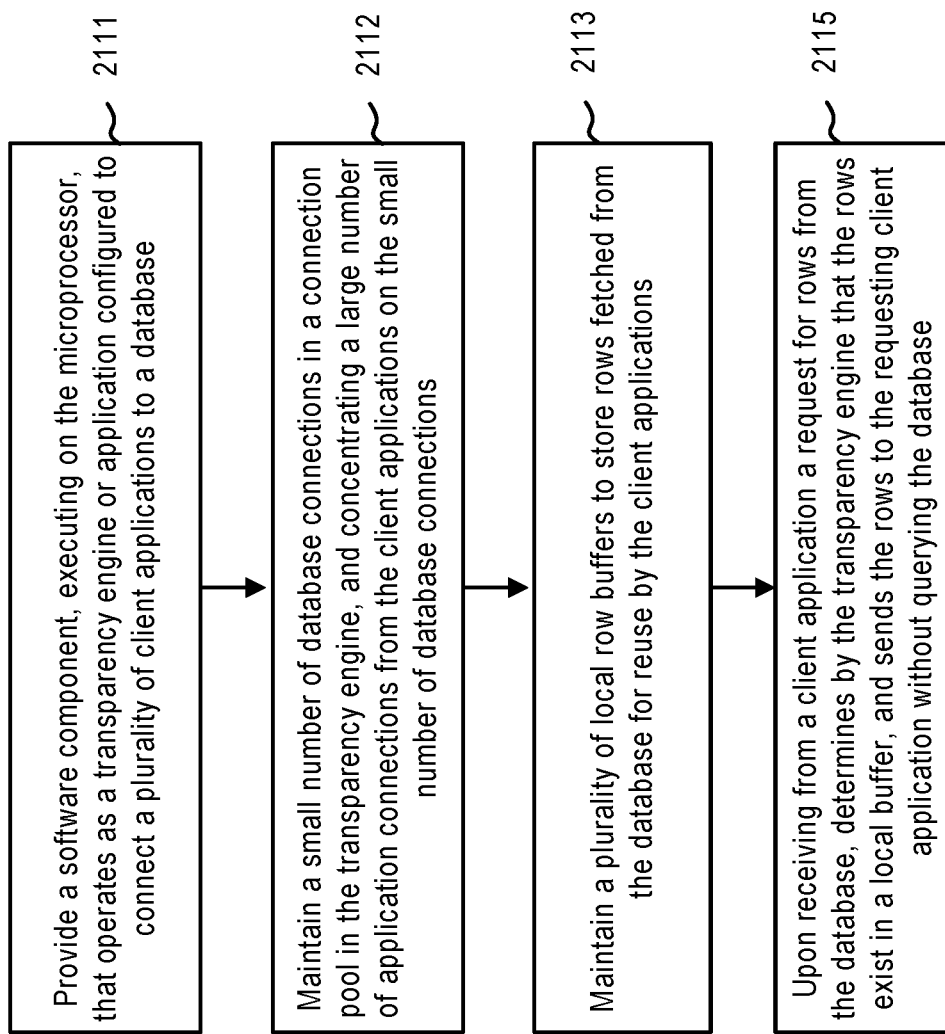
FIG. 21 illustrates a method for row buffering in a transparency engine, in accordance with an embodiment.

FIG. 21 illustrates a method for row buffering in a transparency engine, in accordance with an embodiment.

As shown in FIG. 21, at step 2111, a software component, executing on the microprocessor, is provided, where the software component operates as a transparency engine or application configured to connect a plurality of client applications to a database.

At step 2112, a small number of database connections is maintained in a connection pool in the transparency engine, wherein a large number of application connections from the client applications can be maintained on the small number of database connections.

At step 2113, a plurality of local row buffers are maintained in the transparency engine to store rows fetched from the database for reuse by the client applications.

At step 2115, upon receiving from a client application a request for rows from the database, the transparency engine determines that the rows exist in a local buffer, and sends the rows to the requesting client application without querying the database.

Additional Embodiments and Implementation Details

Additional example embodiments and implementation details of the transparency engine are described below. The example embodiments and implementation details use Oracle databases (e.g., Oracle RAC) as examples. It will be evident, in accordance with other embodiments, that other databases can be used.

The transparency engine can be provided between client applications and a database delivering complete application transparency. The transparency engine operates as a session abstraction layer at OSI layer 7, and as a stateful SQL/TTC proxy. It uses a tight integration with the databases. The collaboration with the database ensures that the transparency solution supports real applications by handling transactional and non-transactional states.

In accordance with an embodiment, the transparency engine can provide the following features in cloud and on premise deployments:

1). Complete database transparency;
2). Isolation of database maintenance for true zero downtime (P0);
3). Concealed load balancing, failover, affinity and data routing;
4). Advanced session concentration;
5). Removed risk of login and demand surges;
6). Multiplexing of sessions; and
7). Logging and profiling of workloads.

The instances of the database transparency engine (TE) can be deployed over several dedicated hosts, which can be engineered systems. The engineered systems can use multiple virtual machines or OEM hardware. The transparency engine and the transparency machines can be plugged into an existing deployment with no changes to applications or client drivers or containers. An organization can redirect the URL to obtain the latest database high availability, load balancing, routing, and concentration features.

Client Applications

The transparency engine can be used with various types of applications, including database-agnostic applications, applications that support request boundaries, and applications that do not support request boundaries and do not provide indication describing how non-transactional session states are used in the applications.

The database-agnostic applications use simple, non-transactional states. These states are created when a connection is created, and do not change again.

This category of applications includes those applications that use anonymous PL/SQL, and that do not create server side states. To determine that such an application is stateless, the transparency engine can use a utility (e.g., orachk), or built-in detection and controls in a database, to check states of the application.

The database can provide state equivalence advice that allows for matching incoming requests to sessions with the correct states, to enable concentration of "stateless" sessions, and to avoid stateful applications from declaring that they are stateless.

The applications that support request boundaries can be applications deployed to mid-tier containers that support request boundaries. This type of applications have access to the full set of transparency features that the transparency engine provides. The transparency engine detects when a client application sets request boundaries and uses the boundaries to demark safe places for draining, rebalancing, recovery, and concentration. Request boundaries enable an application to use complex non-transactional session states within a request. These states do not cross boundaries.

In accordance with an embodiment, mid-tier containers hosting this type of applications can have database drivers that meet a plurality of requirements, so that the mid-tier containers can support request boundaries.

For example, for Java and OCI drivers, "beginRequest" and "endRequest" can be sent when talking to the transparency engine; and the "endRequest" can be sent as a one-way user call.

The applications that do not support request boundaries and do not provide indication describing how non-transactional session states are used in the applications can include applications using diverse non-transactional session states, OCI based applications, applications that borrow connections from connection pools but do not return them to the connection pools, and batch applications.

Table 1 summarizes example applications that can be used with the transparency engine, in accordance with an embodiment.

TABLE 1

| Application Type | Safe Places to Drain Connections |
|---|---|
| Stateless | Orachk |
| | State equivalence (CRC) |
| | Fail when an application that is declared stateless is actually not stateless |
| | State checkpoint |
| Web Requests With Request Boundaries or GTRID | Support request boundaries and GTRID |
| Stateful Short Calls (OLTP and Custom Applications) | Drain at connection tests |
| | Connection multiplex |
| | State checkpoint |
| Stateful Long Calls (Batch, DSS) | Drain at connection tests |
| | State checkpoint |

Figure 22:
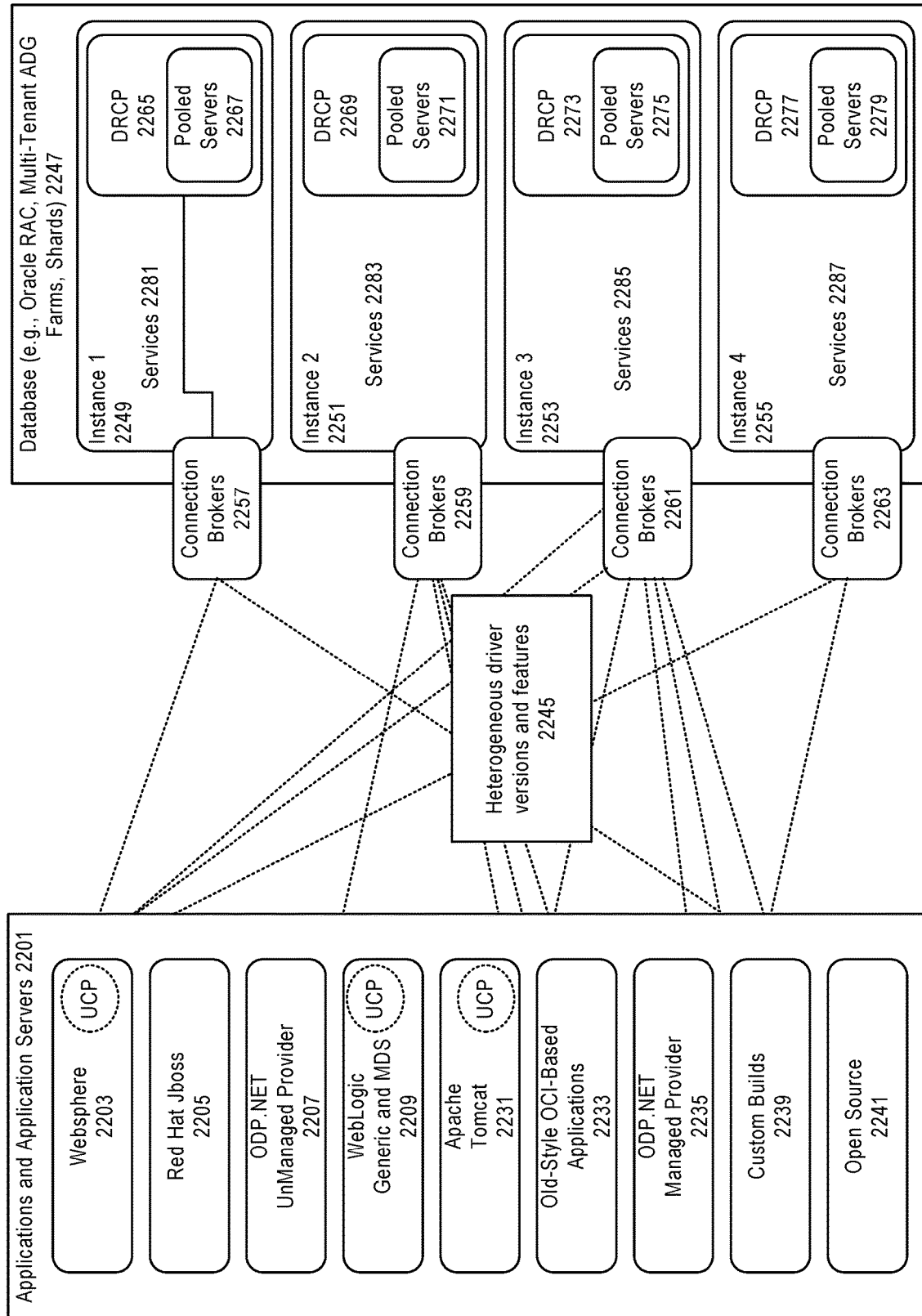
FIG. 22 illustrates challenges of implementing continuous database service, in accordance with an embodiment.

FIG. 22 illustrates challenges of implementing continuous database service, in accordance with an embodiment.

In FIG. 22, a variety of applications and application servers 2201 can connect to a plurality of instances 2249, 2251, 2253, and 2255 in a database 2247. The database can be an Oracle RAC with multi-tenant Active Data Guard (ADG) farms, and shards.

In accordance with an embodiment, the applications and application servers that connect to the database can include WebSphere 2203, Read Hat JBoss 2205, ODP.NET UnManaged Provider 2207, WebLogic 2209, Apache Tomcat 2231, Old-Style OCI-Based Applications 2233, ODP.NET Managed Provider 2235, custom built applications 2239, and open source applications 2241. Each of the database instances in the database can include a plurality of connection brokers 2257, 2259, 2261, and 2263; and a database resident connection pool (DROP) 2269, 2273, and 2277, with a plurality of pooled servers 2267, 2271, 2275, and 2279. In addition, each database instance can include a plurality of services 2281, 2283, 2285, and 2287.

In accordance with an embodiment, the applications and application servers can connect to the database using database drivers with heterogeneous driver versions and features 2245.

Accordingly, organizations need to configure new applications, so that the new applications can be connected to the database. For example, an organization can install appropriate drivers and appropriate connection pools for the new applications to work with the database.

Further, the applications in FIG. 22 can be written in a variety of programming languages. Furthermore, some applications can be migrated to UCP, while some others cannot, making it difficult to implement a uniform and global solution across the entire IT platform.

Another dimension to the problem is scalability. It is difficult to sustain the connection/session explosion in the face of large-scale web & cloud deployments, including Multitenant, Micro-Services (FMVV), Shards, and Oracle REST Data Services (ORDS). The stickiness of various states, including cursor state, PL/SQL state and session state as well as cursor leaks, leads to the escalation of the number of sessions to the hard coded limit of 64K.

In accordance with an embodiment, the transparency engine can enable organizations to transparently achieve continuous database service, including large-scale connectivity, high availability, affinity routing and load balancing with a database.

Connection Draining

In database maintenance, moving or stopping a service causes a FAN notification to be posted and received by subscribing database drivers, connection pools and/or mid-tier containers.

Immediately, new work to that service can be directed to another functioning instance of that service. Existing sessions can be marked for release after their work completes. As a user work completes and connections are returned to a connection pool, a database driver or connection pool can terminate these sessions.

In accordance with an embodiment, the transparency engine can provide transparency to client application that do not subscribe to or process FAN events. The transparency engine provides a draining functionality by acquiring a session at a new safe place transparently to the client applications. The transparency engine also can drain database connections gradually to eliminate logon storms and avoid disturbing work at systems drained to.

In accordance with an embodiment, the safe places include stateless boundaries, request boundaries, connection tests, and when state safety information from the database-side.

For database agnostic applications, the transparency engine drains sessions from instances using transaction boundaries, and replaces the sessions with other sessions that have the same simple states. That is, when all objects are closed, the objects and states can be reconstructed correctly.

For applications using mid-tiers that set request boundaries, the transparency engine detects request boundaries on the wire and drains at end request and between requests. The same applies for XA (eXtended Architecture) using global transaction identifier (GTRIDs).

For applications using a connection pool, a database session can be drained when it is no longer being borrowed.

For example, a database session can be drained at a point where the application server checks the validity of that connection, since an error is not returned to the application when the connection pool manager checks the validity of the connections and finds that these connections are no longer valid.

For applications that do not support request boundaries and do not provide indication describing how non-transactional session states are used in the applications, a database server can provide a state advisory, indicating to the transparency engine when the states are known, and the session can be moved. The same advisory can be be used for hiding unplanned outages by indicating to the replay driver (TTC version) where to perform checkpoint and start capture, thereby enabling a replay, if needed.

In accordance with an embodiment, Table 2 below summarizes connection draining techniques for various applications described above.

TABLE 2

| Application Type | Connection Draining |
| --- | --- |
| Stateless | Failover when no open fetch, no TX, failover, restore current state |
| Web Requests (Request Boundaries or GTRID) | Drain between requests |
| Stateful Short Calls (OLTP and Custom) | Drain at connection tests, heuristics (good for containers, lower cover for Legacy), and state checkpoint |
| Stateful Long Calls (Batch and DSS) | Rely on checkpoints in batch or stop batch. Rely on state checkpoints |

Concentration Techniques

Connection concentration can include connection and session multiplexing, which allows connections to be reused over multiple user calls, resulting in greater efficiency of database servers and faster performing applications.

In accordance with an embodiment, the transparency engine enables applications that are stateless or applications that use request boundaries to share both connections and sessions.

The transparency engine can maintain state equivalence for sessions, and release a database connection as early as possible in order to concentrate connections.

The transparency engine can also fetch and buffer rows in advance. However, beyond a threshold, it either becomes sticky or re-executes the cursor on a different session for further row fetching. The transparency engine can close dangling/unclosed cursors (based on heuristics).

In addition, for database-agnostic applications, multiplexing with shared servers can be used. Multiplexing at a concentrator has a lesser database overhead than multiplexing at the database server where sessions are dedicated.

Table 3 below summarizes connection concentration techniques for different types of applications, in accordance with an embodiment.

TABLE 3

| Application Type | Concentration Techniques |
|---|---|
| Stateless | Attach matching state CRC Release when no open fetch, no TX, failover |
| Web Requests - Request Boundaries or GTRID | Attach at begin Request (matching state CRC for users labeling and deviating for the standard); Release at endRequest - one way call |
| Stateful short calls - OLTP and Custom | Connections multiplexing API, OS scheduler design |
| Stateful Long calls - include Batch, DSS | Dedicated, Quarantine to here |

Administration Console

In accordance with an embodiment, an administration console can be used to configure the transparency engine.

Startup parameters can be configured in a configuration file (e.g., in a YAML, XML, or JSON format). These parameters include at minimum the database connection string and a username and password. For connection concentration, the number of outbound connections can be configured as well. Some parameters are dynamic and can be changed at runtime through the console.

The administration console can be used to stop and start the transparency engine, turn tracing on and off, obtain basic statistics information which includes the current number of inbound and outbound connections with information for traffic activity.

Since the the transparency engine has information of database accesses (e.g., queries, DMLs), it could be instrumented to log database usage patterns in a log table. A logging mode can be an option that organizations can enable/disable for profiling purposes. The log can analyzed off-line to generate profiles of database access patterns. Organizations can use the profiles to re-configure their deployment, for example, adding database instances for reads, and re-partitioning the database.

Figure 23:
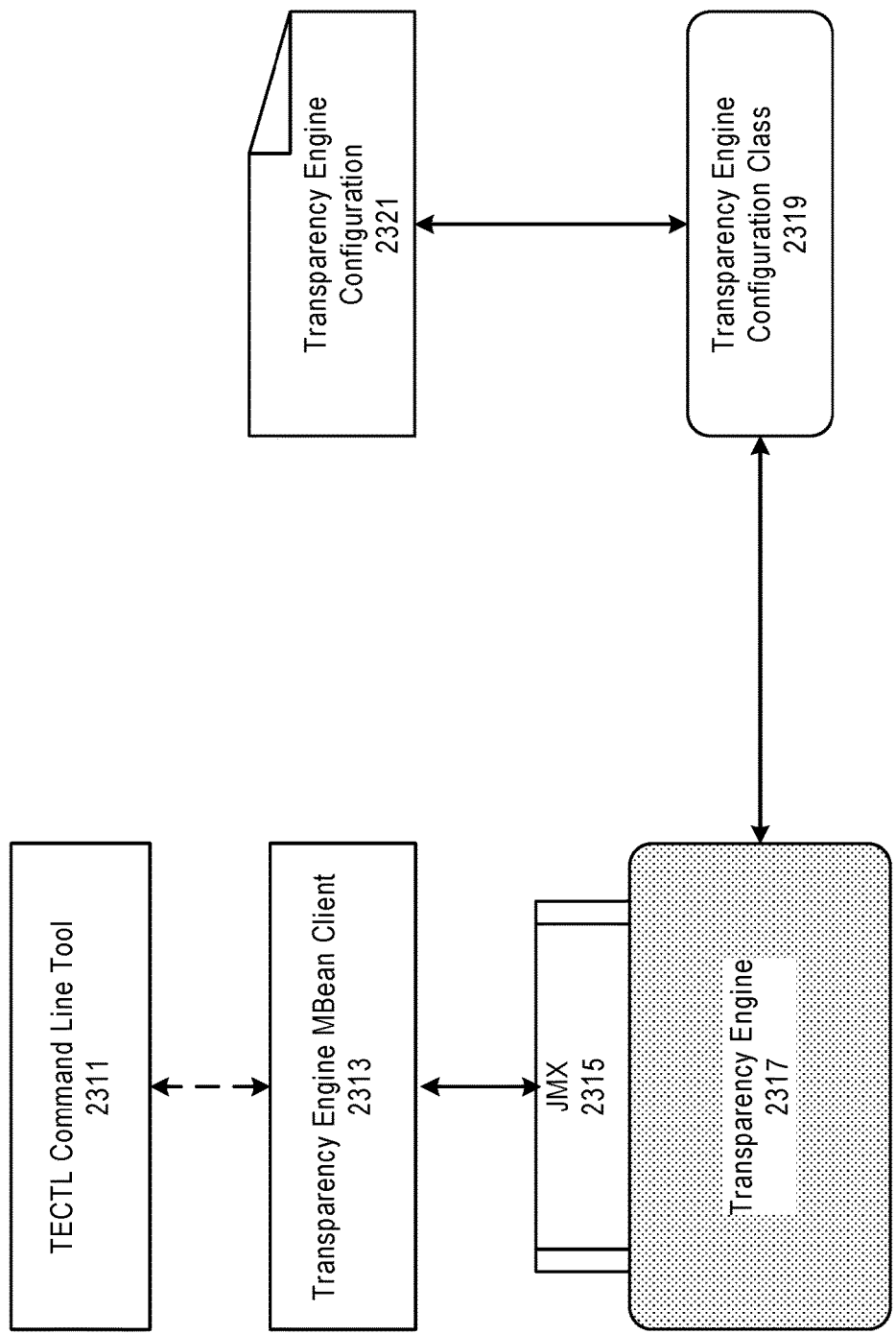
FIG. 23 illustrates an example administration system for a transparency engine, in accordance with an embodiment.

FIG. 23 illustrates an example administration system for the transparency engine, in accordance with an embodiment.

As shown in FIG. 23, a command line interface 2311, for example, TECTL, can be used to provide commands to start, stop, monitor the status of a transparency engine 2317 and modify configuration parameters on a running transparency engine instance.

In accordance with an embodiment, a script file for the command line tool can be located at $ORACLE_HOME/te/scripts/tectl.sh.

The command line tool implements the start command by invoking $ORACLE_HOME/te/scripts launcher.sh script internally, which loads the main class "oracle.te-.launcher.EngineLauncherMain" from the launcher jar. The launcher module then can validate and load the to jar and the dependent jars using the separate class loader. This makes sure that the TE/dependent library classes are not loaded by the system class loader and are therefore hot-patchable.

The command to start the transparency engine is: tectl start [-restorestate]. The The "-restorestate" option is used when the transparency engine needs to be started from its previously saved state.

The command to stop the transparency engine is: tectl stop (-force|{-timeout [-savestate]}). If "-force" is provided during stop, the transparency engine can abort all connections and transactions in progress. Otherwise it can gracefully shut down, which indicates that it stops accepting any new connections and attempts to complete in progress transactions and then shut down. The default stop action is a graceful stop that could be used for planned maintenance.

When the "-force" option is not used, the "-timeout option" is mandatory and can indicate the time duration (e.g., in seconds) for which the transparency engine can wait for any ongoing transaction to complete before the shutdown.

When the "-savestate" option is provided, the transparency engine can save its state to the disk, which can be restored if needed using the 'tectl start-restorestate' command.

In accordance with an embodiment, the stop command can be implemented by launching a transparency engine MBean client 2313 with the command options as arguments. The MBean client opens a connection to a JMX server 2315 and looks up a published transparency engine MBean and invokes the stop method on it.

After making one or more required changes in a transparency engine configuration 2321 (e.g., teconfig.xml file) based on a configuration class 2319, an administrator uses the command "tectl reload" to apply the required changes. The "tectl" script cam launch the transparency engine MBean client that invokes the reload( ) method on the transparency engine MBean, which triggers the reload process on the transparency engine core engine.

The following explains the control flow of the transparency engine for each of the valid configuration changes:

Listener port change: The reload method in CoreImpl class checks if there is a change in a listener port and can accordingly unregister an existing listener socket from a selection service, create and register a new server socket corresponding to the new port on the selection service, and start accepting new connect requests. The old listener socket can then be closed. The transparency engine does not need to restart in this case.

Thread pool sizes: When the worker thread pool size is changed on the configuration file, the transparency engine internally resizes its internal thread pool using the specific APIs on the EngineThreadPool class. No restart of the TE is required. When the I/O framework thread pool size is changed, the same is propagated by the transparency engine to the Selection service framework.

Connection pool properties: When a pool property in the transparency engine is changed, the individual pools get affected without requiring restart of the transparency engine. The reload method TEPoolManager's API is called to read the pool specific configuration and add/remove or modify an existing pool as follows:

Pool-name: If the pool name on the XML file is changed, it is treated as a new pool. and using the pool properties a whole new pool is added to the transparency engine, and is started. If there is a pool already existing in the transparency engine but not in the current reloaded configuration, then the pool is stopped and destroyed if not actively used. If it is being used, the pool connections as and when returned will be removed from the pool. Once the pool is empty it can be destroyed.

Pool-size: If the pool size is changed on an existing pool configuration, then the pool size change is propagated to the corresponding connection pool by calling the API's on the connection pool, for example, setMinPoolSize( ), setMaxPoolSize( ) and setInitialPoolSize( ).

Connect-String/User/Credentials and Database Connection Properties: If the connect string is changed on an existing pool, the pool is recycled, which means that the existing idle connections are closed and recreated with the new set of properties. For busy connections, the same process is repeated after the connection is returned back to the pool. This is achieved by extracting the new properties from the configuration and placing it in the connection properties passed to the NS modules during new connection creation.

The Tectl script can launch the MBean Client that invokes the getTEState( ) API on the MBean object internally, and use it to display the status information. The command "tectl status" can be used to check if an transparency engine instance on a node is running or not. The output of this command can either be "The transparency engine is running on this node" or "The transparency engine is not running on this node", depending on the current status of the transparency engine.

The Tectl script can launch the MBean Client that invokes getTEStats( ) on the MBean object to get the current statistics of the transparency engine instance. The transparency engine can internally collect the statistics of its connection pools, and open cursors can create a formatted string representation when the getTEStats method is invoked. The command "tectl stats" can be used to check the statistics of a running transparency engine. The output of this command can summarize the number of application and database connections active in the transparency engine, and the number of database cursors per database user and service. When the transparency engine is not in a running state, executing this command can return an error message, for example, "Statistics cannot be displayed as there is no transparence engine instance running on this node."

In accordance with an embodiment, the transparency engine MBean client is a component that includes a transparency engine MBean client class and its associated classes. These classes could be used to allow an authenticated/valid external entity to access a published transparency engine MBean. The client class establishes a connection to the JMX server and the port specified in the te-management.properties and then looks up the MBean using the MBean name provided in the properties file. Using the MBean proxy, it invokes the MBean method on the transparency engine in order to administer/monitor the transparency engine. "tectl" script internally uses the MBean client to perform all the administration operations.

In accordance with an embodiment, the transparency engine can also be administered directly using a MBEAN interface which is defined in a class MBean.java. The operations defined on MBean can be used to start the transparency engine with the specified set of arguments; pauses the transparency engine and saves its state to disk; restart the transparency engine by restoring its last saved state in the disk; stop the engine either gracefully or forces a shutdown based on the flag supplied; return the transparency engine state defined as an enum Core.EngineState; and destroy the engine instance and perform the cleanup of any resources used.

Availability and Recovery

Figure 24:
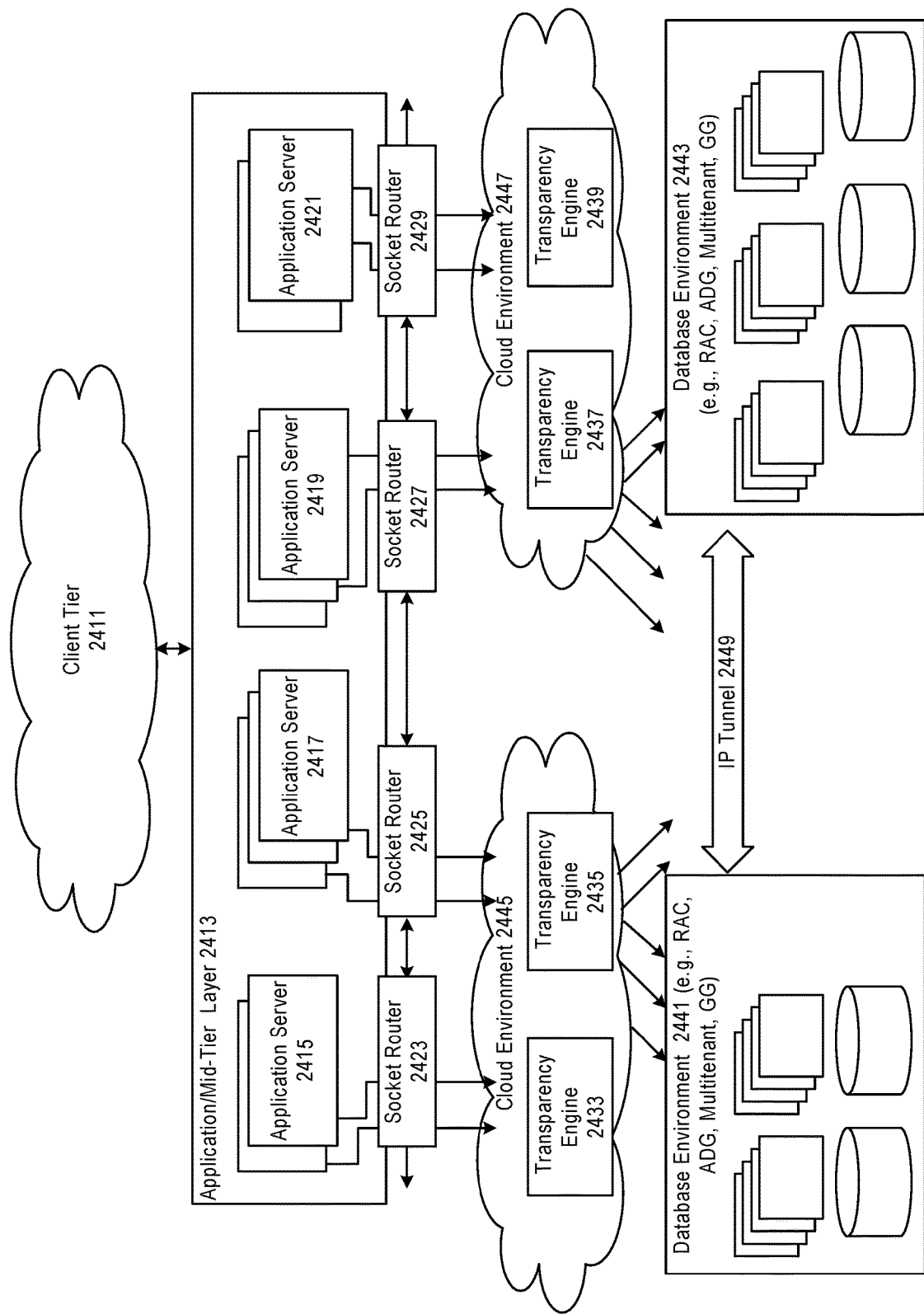
FIG. 24 illustrates an example availability and recovery solution for transparency machines, in accordance with an embodiment.

FIG. 24 illustrates an example availability and recovery solution for transparency machines, in accordance with an embodiment.

As shown in FIG. 24, a plurality of transparency engines 2423, 2425, 2437, and 2439, each including one or more transparency engine instances, can be deployed in a plurality of cloud environments 2445, 2447 on a plurality of transparency machines.

In accordance with an embodiment, a plurality of socket routers 2423, 2425, 2427, and 2429 can be provided on the application/mid-tier layer 2413 that includes a plurality of application servers 2415, 2417, 2419, and 2421. The socket routers can transparently reroute socket connections from a failed transparency engine instance to a buddy (recovering) transparency engine instance.

In accordance with an embodiment, a state recovery layer can maintain application sessions at that recovering transparency engine instance, which provides recovery and planned draining of the transparency engine without the knowledge of the application or mid-tier, and without service interruption. If a transparency engine needs to be taken out of service or is overloaded, with the socket router and state recovery in place, client sessions can be transparently relocated immediately, or on an as needed basis.

As further shown in FIG. 24, the application/mid-tier layer can receive requests from a client tier 2411 in a cloud environment, forwards the requests to a transparency machine. The plurality of transparency machines can include database connections to a plurality of database environments, for example, database environment 2441, and database environment 2443. The two database environment can be connected by an IP tunnel 2449. Each database environment can that support multitenancy, and include a RAC database, an Oracle Data Guard (ADG) and an Oracle GoldenGate (GG).

Unplanned Outage

In accordance with an embodiment, the transparency of an unplanned outage of a transparency engine can be achieved using a shared storage between transparency engine instances, and a mechanism to transparently reconnect a socket.

In one implementation, application session recovery can be achieved using Coherence. In this implementation, applications states (called application context) are stored in the Coherence, an in-memory data grid that is used as a shared storage between transparency engine instances. That way, when a transparency engine is removed, any of the other transparency engines instances can be used to resume the application context.

In some network topology, connection end points are fixed. Once a connection is established, there is a strict fixed relationship between a socket in a client process and a socket in a database process. Although Oracle multithreaded server (MTS) and data DRCP provide some flexibility in the relationship between a database socket and a database session, but only within a single node. UCP and other connection pools provide some flexibility in the relationship between an application visible connection and a socket, but only within a single application process.

In accordance with an embodiment, a socket router can be used to disconnect these end points, to allow any application visible connection to use any database session across the entire system, without limitations by process, node, instance, host, VM, JVM.

In accordance with an embodiment, in data dependent routing, a socket router can examine a query, and route the query to any of several databases, based on the information in the query and its parameters. A mid-tier application creates a connection to the socket router, and sends a query. The socket router determines that the query should be executed on database A, and thus creates a connection to database A and forwards the query and the subsequent result. The application then executes a second query on the same connection. The socket router determines that query should be executed on database B and forwards the query and the subsequent result. The mid-tier application has only one fixed socket that is connected to the socket router. Each database sees only one fixed connection from the socket router. Internally the socket router redirects the queries and results to the correct destination. The above describes dynamic routing within a socket router.

Requests can also be dynamically routed across multiple socket routers. Consider the following trivial system. The database and the two applications are all running on different machines.

Figure 25:
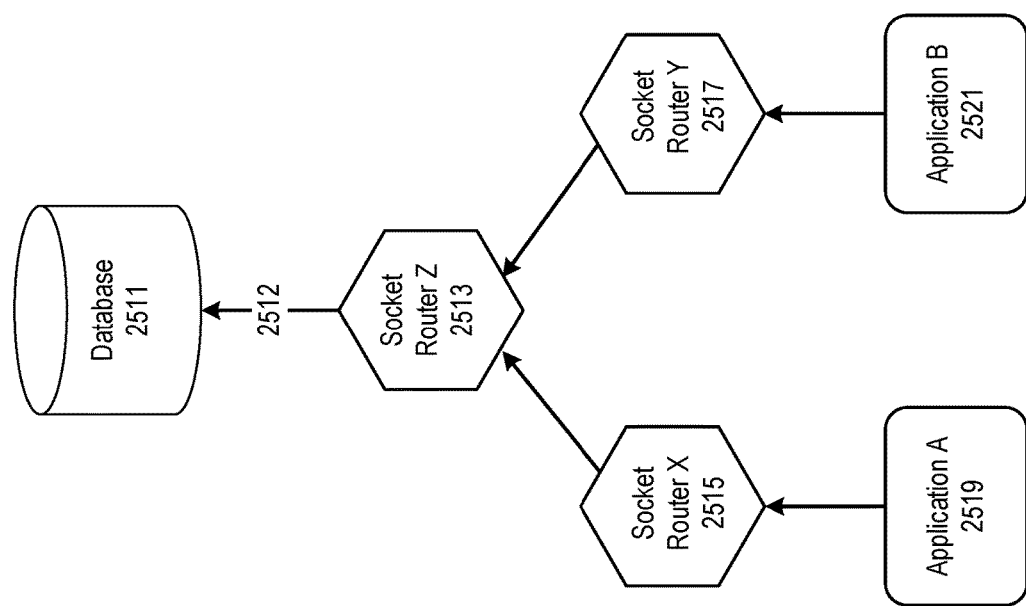
FIG. 25 illustrates an example of dynamic routing across multiple socket routers, in accordance with an embodiment.

FIG. 25 illustrates an example of dynamic routing across multiple socket routers, in accordance with an embodiment.

In FIG. 25, a database connection 2512 to a database 2511 can be shared between application A 2519 and application B 2521, with socket routers 2513, 2515, and 2517 in place.

For example, if application A 2519 is through using the connection, application B 2521 can send a query. Socket router Y 2517 can request the connection from socket router X. When socket router X releases the connection, socket router Y can use it to forward the query from application B. Socket router Z can demux the queries from socket router X and socket router Y onto the database connection, without requiring changes to the database or to the applications.

In accordance with an embodiment, a bootstrap socket router (BSR), which can be a small piece of code installed on each machine that hosts a socket router. A BSR can be written in Java, C or another programming language.

The BSR can be started with a minimal configuration, for example, with just security credentials. After it is started, the BSR can attempt to locate a running socket router either on a local host or in a local subnet. If the BSR can locate a running socket router and authenticate the located socket router, the BSR can download a configuration.

If it cannot locate a socket router, the BSR can look for a a database, connects to a well-known service, and get a configuration. If that is not successful, the BSR can look for a configuration file.

In accordance with an embodiment, a configuration can specify a Java classpath. The BSR checks the classpath to verify that all the expected JAR files are present. If a JAR file is missing, the BSR can download the JAR file from a configured Oracle database.

In accordance with an embodiment, a JAR file name can include a version number and a patch level. A classpath thus can specify the exact version and patch level of each JAR file. The BSR can validate the JAR files by checking their hash values with the expected values. Once the classpath is verified, the BSR can execute a configured JAVA runtime command line, to start one or more copies of the socket router.

In accordance with an embodiment, a configuration can also specify a BSR classpath. In that case the running BSR validates the BSR classpath by downloading any missing JARs. If any JAR has changed, the running BSR starts a new BSR with the new classpath and then terminates. If no JAR has changed, the running BSR continues as described above.

Socket Router

Once the BSR has verified that the configured number of socket routers are running, the BSR can go to sleep. The BSR can wake occasionally to verify that the configured number of socket routers are still running and that they are meeting QoS levels. If there is a problem with the socket routers, the BSR can work to kill any hung socket router and start a new one.

In accordance with an embodiment, the BSR can be started by an installed service in an operating system.

In accordance with an embodiment, a socket router can check whether the configuration has changed, for example, by using dynamic circuit network (DCN). DCN can transport network management traffic between network elements and their respective Operational Support Systems (OSS). If a change is detected, the socket router can reconfigure itself.

A socket router can start up running the appropriate version and patchrd. If there is an updated classpath, the socket router can download the updated software and start a new copy. All new connection requests can be forwarded to the new copy. The old copy can be terminated.

In accordance with an embodiment, socket routers on a host can check on each other, to make sure that the configured number of socket routers are running, and that each is meeting QoS levels. As needed, the socket routers can cooperate to start additional copies and to appropriately terminate hung copies. In addition, the socket routers on one host can check up on other "near by" hosts.

As such, a socket router network consists of many redundant parts which manage each other. Failure of any one part can impact only a fraction of the entire system, and can be quickly detected and remedied.

In accordance with an embodiment, socket routers can run on the same hardware as an application or database. Any failure that affects one would affect the other, so there is no additional point of failure. The connections between these local socket routers and the local application or database can be interprocess communications (IPCs) rather than network connections, so that the connections can be more reliable.

In accordance with an embodiment, a socket router is designed to be hot patched, so that each time a socket router is started, the socket router can have the most current patch level. When a socket router detects that a new patch level is available, the socket router can automatically begin transitioning work to a new updated socket router. If all connections to the socket router are from other socket routers, the socket router can migrate live connections to the new socket router.

In accordance with an embodiment, all configuration information including executable code can come from a database. Updating the configuration or patching the code can be database operations. This approach can provide a single point of configuration.

In accordance with an embodiment, since a connection from an application to a first socket router can be an IPC and the application and the first socket router can share the same hardware, the first socket router can be more reliable.

In accordance with an embodiment, connections from a first level socket router to subsequent socket routers can be dynamic and can be relocated on the fly, which can support better failover and hot patching of the subsequent socket routers, without requiring any change to the client driver.

In accordance with an embodiment, a substantial subset of Oracle database density and high-availability features can be implemented in a socket router with zero change to applications.

In accordance with an embodiment, the default behavior for WebSphere is to execute SELECT USER FROM DUAL to validate a connection. A socket router can detect this as a request boundary and use that information for application continuity and/or planned database maintenance.

Figure 26:
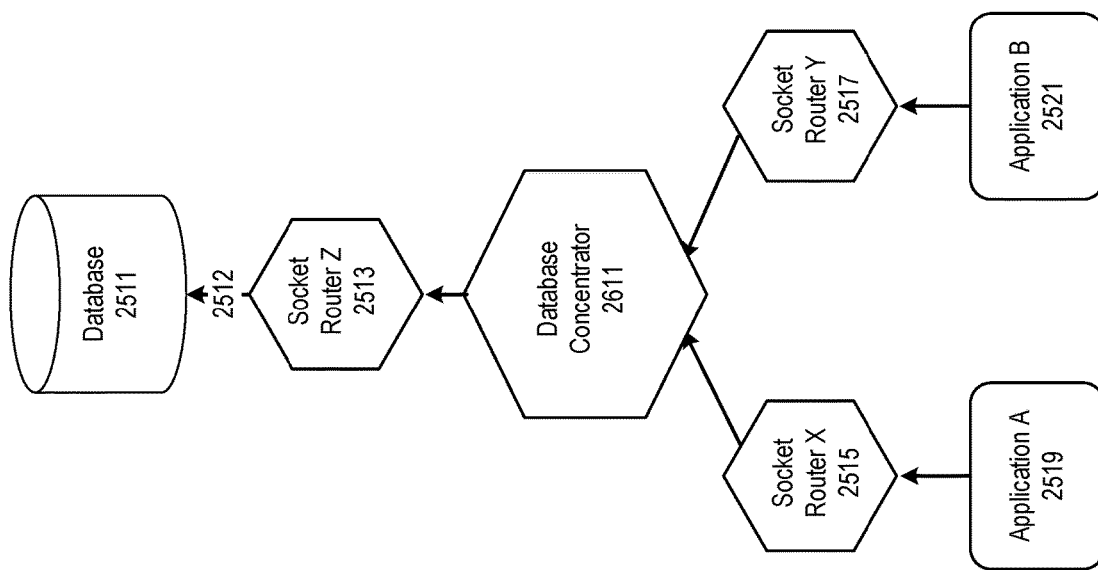
FIG. 26 illustrates an example use of a socket router as a database concentrator for connection concentration, in accordance with an embodiment.

FIG. 26 illustrates an example use of a socket router as a database concentrator for connection concentration, in accordance with an embodiment.

As shown in FIG. 26, a database concentrator 2611 can be implemented using a socket router.

In accordance with an embodiment, the capability of the socket router Z 2513 can be built directly into the database 2511, removing the hop between socket router Z and the database.

Similarly, in accordance with an embodiment, the capability of the socket router X 2615 and socket router Y 2517 can be added to the client drivers, removing the hop between the applications and the first level socket routers (i.e. socket router X, and socket router Y).

Configured as such, a network of socket routers can route SQL operations to the appropriate database and adapt transparently to changing circumstances. The network of socket routers is robust and easy to install and configure, and can provide a platform for delivering advanced Oracle Database density and high-availability features.

Hot Patching

Figure 27:
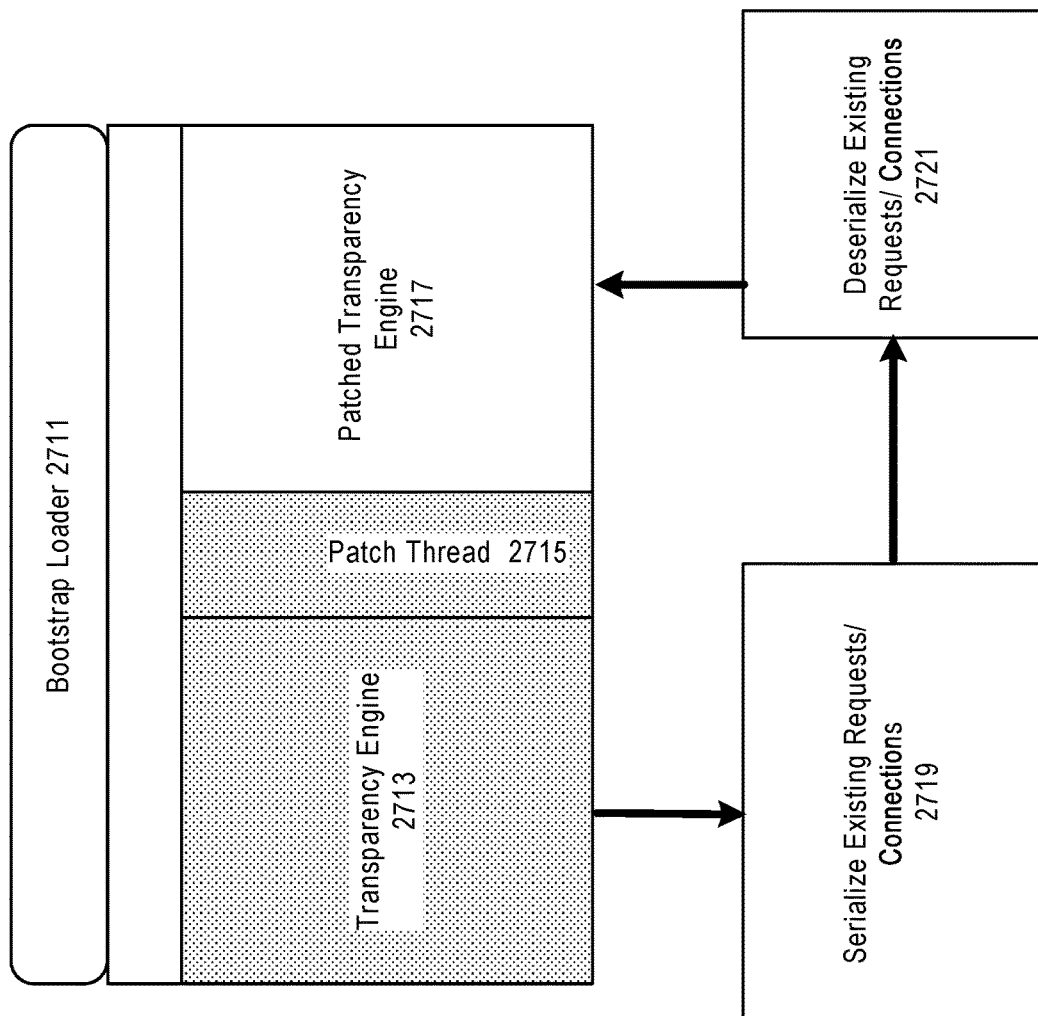
FIG. 27 illustrates a system for hot patching a transparency engine, in accordance with an embodiment.

FIG. 27 illustrates a system for hot patching a transparency engine, in accordance with an embodiment.

In accordance with an embodiment, a transparency engine 2713 can be written in JAVA, and therefore, the transparency engine can reside in a JAVA virtual machine (JVM), together with a bootstrap loader 2711, and a transparency launcher. The transparency engine can reside in $ORACLE_HOME/te directory as part of Install.

The transparency engine can be launched using a class loader and a TE.start( ) call. A patch thread 2715 can detect a patch JAR from a $ORACLE_HOME/te/patch directory, and copy the patch JAR from $ORACLE_HOME/te/patch to $ORACLE_HOME/te/lib. The patch JAR can be loaded from $ORACLE_HOME/te/lib directory, using a new class loader with the system class loader as the parent.

The patch JAR can be started from $ORACLE_HOME/te/lib directory, and divert new connections to a patched transparency engine 2717.

In accordance with an embodiment, existing requests from the transparency engine 2713 can be serialized 2719. The patched transparency engine can de-serialize 2721 the existing requests.

Figure 28:
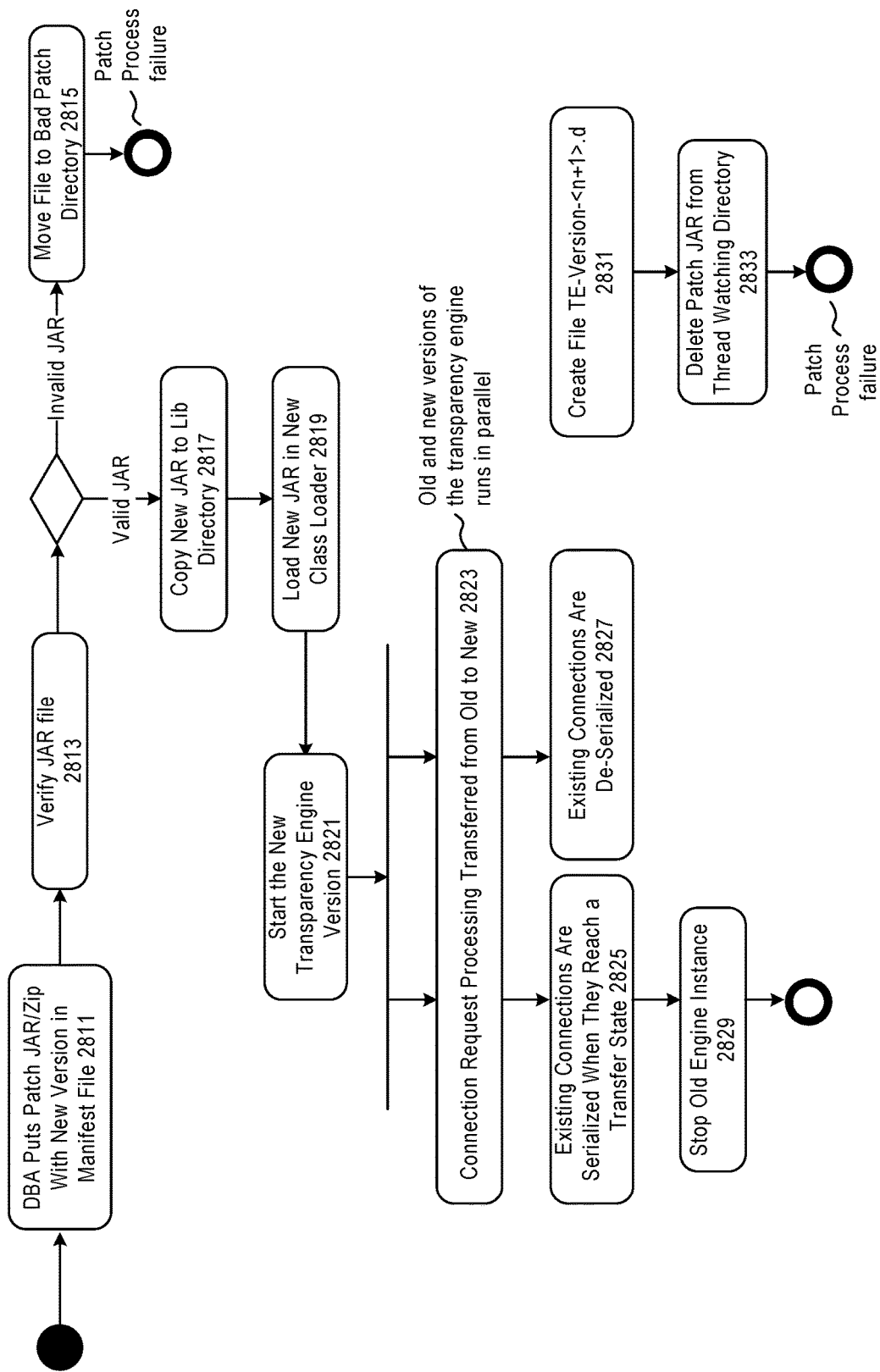
FIG. 28 illustrates a process for hot patching a transparency engine, in accordance with an embodiment.

FIG. 28 illustrates a process for hot patching a transparency engine, in accordance with an embodiment.

As shown in FIG. 28, a DBA can put a patch JAR/Zip file with a new version in a manifest file 2811 in a patch directory. The patch JAR/Zip file can be verified 2813 to determine whether the JAR/Zip file is signed with a valid certificate and whether certain classes/methods exist in the JAR/Zip.

If the JAR/Zip file is invalid, it can be moved to a bad patch directory 2815. Otherwise, the JAR/Zip file can be copied to a library directory 2817 and loaded using a new class loader 2819. Then, the patched transparency engine can be started from the library directory.

The connection request processing can be transferred 2823 from the old transparency engine to the new (patched) transparency engine. Existing connections are serialized 2825 by the old transparency engine instance when they reach a transfer state; and deserialized by the patched transparency engine instance 2827.

In accordance with an embodiment, the old transparency engine instance can be stopped 2829.

As further shown by FIG. 28, after a file "te-version-<n+1>.d can be created 2831, the JAR/Zip file can be deleted 2833 from the patch directory.

If for any reason, a system crash occurs during the patch process, the patch thread can look into any JAR/ZIP that exists in the patch directory and, if it exists, start the patch process again.

Non-Blocking Architecture

Figure 29:
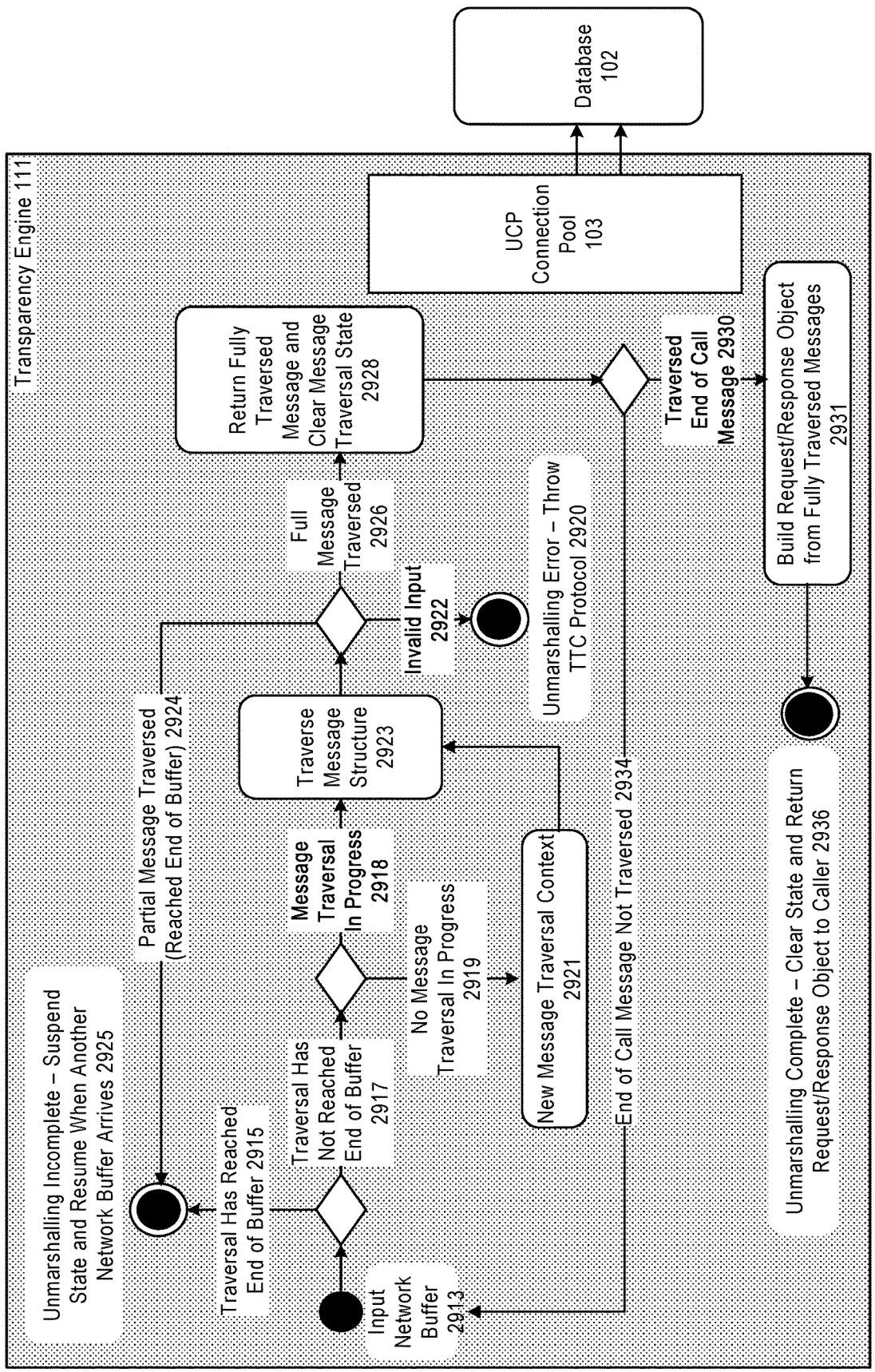
FIG. 29 illustrates a system for a non-blocking architecture, in accordance with an embodiment.

FIG. 29 illustrates a system for a non-blocking architecture, in accordance with an embodiment.

The architecture as shown in FIG. 29 can be used to process I/O operations. When processing the I/O operations, events and a selector are used, instead of having a thread blocked on a socket read/write. A single selector thread can manage a plurality of sockets, and can determine which socket is ready for read/write, and schedule a worker thread to read/write on the ready socket.

As illustrated, a worker thread can be scheduled to read part of a TTC structure/message, for example, the first field, at an input network buffer 2913. If the end of buffer has been reached 2915, a state machine can be suspended, waiting to be resumed when another network buffer arrives 2925.

If the end of buffer has not been reached 2917, the system will check if there is a message traversal in process. If not 2919, then a new message traversal context 2921 can be created to traverse the message structure 2923. If yes 2918, then the system can continue to traverse the message structure 2923.

If the message traversal is not complete 2924, then the system can suspend the state machine and resume it when another network buffer arrives; or throw out an unmarshalling error 2920.

The above loop can be continued until the message is fully traversed 2926, in which case the fully traversed message can return, and message traversal states can be cleared 2928.

The system can continue to check whether the end of call message has been traversed. The system can check the input network buffer 2913 to traverse the end of call message; otherwise 2930, a request/response object can be built from the fully traversed messages 2931, and returned 2936 to the caller.

As described above, given some portion of a TTC packet's bytes, the unmarshalling process can traverse over each byte of input and identify the records and scalar values which appear in a packet. If the input bytes do not form a complete packet, the process can store the state of its traversal and return to the caller of the process.

Once more bytes of the packet are given as input, the process can resume its traversal from the stored state. When the traversal has recognized the final byte of a TTC packet, the unmarshalling process is considered complete.

TTC Module Class Diagram

Figure 30:
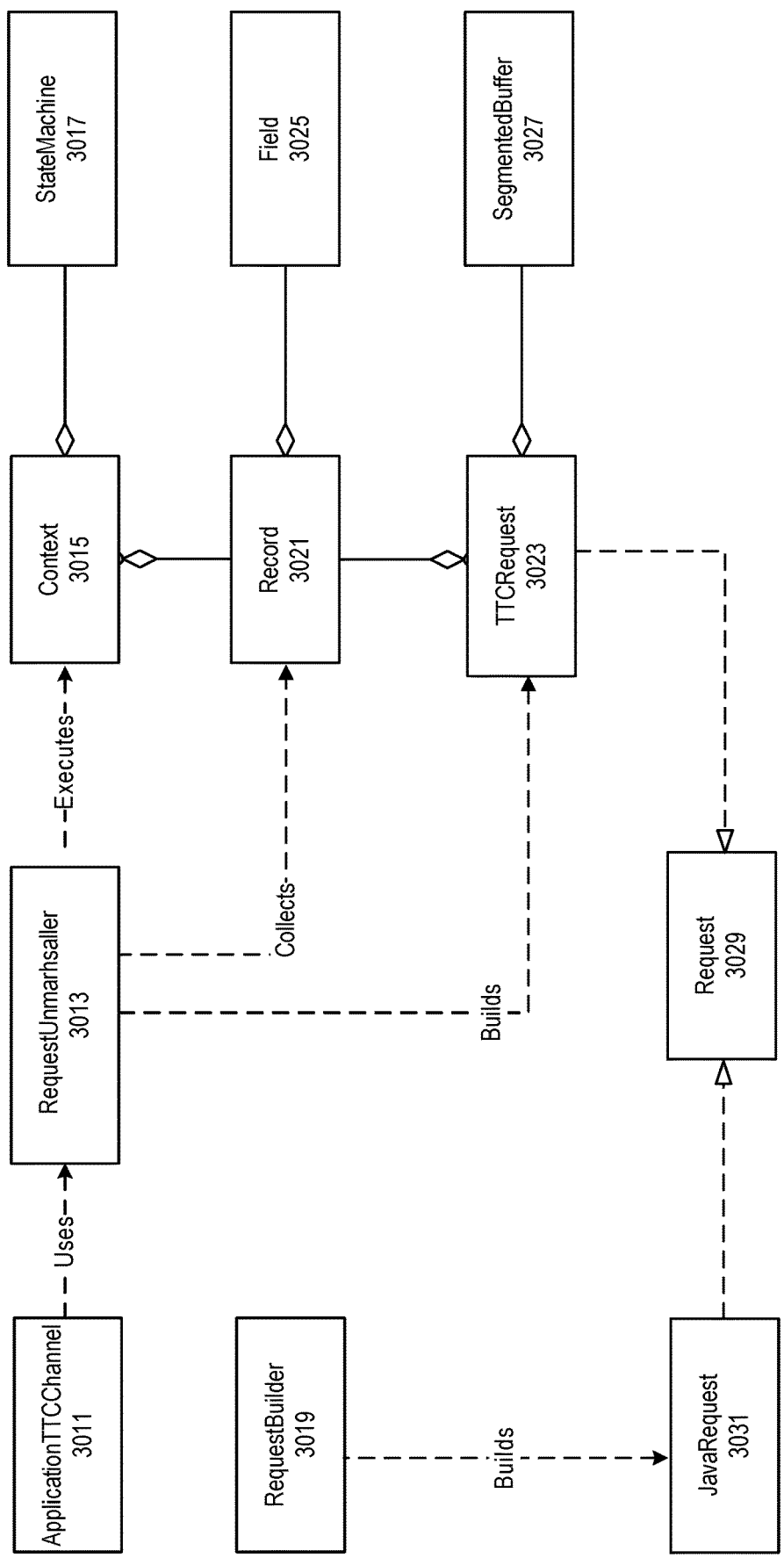
FIG. 30 illustrates a class diagram for a TTC module, in accordance with an embodiment.

FIG. 30 illustrated a class diagram for a TTC module, in accordance with an embodiment.

As shown in FIG. 30, the class diagram uses a simplified UML notation to depict classes which can be used to build a Request. The class diagram can include an ApplicationTTCChannel class 3011, a RequestUnmarshaller class 3012, a Context class 3015, a StateMachine class 3017, a RequestBuilder class 3019, a Record class 3021, a Field class 3025, a TTCRequest class 3023, a SegmentedBuffer 3027 class, a JavaRequest class 3031, and a Request class 3029.

The same diagram can depict the classes which can be used to build a Response by replacing the ApplicationTTCChannel class 3011 with a DatabaseTTCChannel class, and by substituting occurrences of the word "Request" with "Response".

In accordance with an embodiment, a StateMachine class can be used to traverses a Two-Task Interface (TTI) message structure, visiting each field in the order which they appear in the structure. The traversal process is controlled by a state transition table which is defined at compile time. The state transition table and the algorithm which interacts with it can be automatically generated by the Ragel tool. A subclass of the StateMachine exists for each TTC record which the transparency engine receives. Record specific subclasses traverse one particular type of record.

A Context class initiates and monitors the state machine traversal. The Context class implements callbacks which are invoked as the machine transitions to various states. There are two general forms of callbacks: Field Identification and State Transition Directives. For Field Identification, when the machine has located a field within the network buffer, it invokes a callback on the Context. Callbacks of this nature are parameterized with the id of the field, its buffer offset, and its length. For State Transition Directives, when the machine cannot make a state transition based on the current input byte, it requests the necessary information from the Context. Callbacks of this nature can supply a variety of information. A common case for this callback type is to have the context supply the number of elements in an array type field (Length prefixed arrays are not easily expressed by a regular language).

In accordance with an embodiment, the Context retains states when a state machine traversal reaches the end of the buffer before reaching a final state. When a state machine reaches the buffer limit, it calls on the Context to store an integer value which represents the current state. The Context can then instruct the state machine to resume traversal from the stored state.

A subclass of Context exists for each TTI record which the transparency engine can receive. Record specific subclasses build one particular type of Record. A Context builds a Record object by creating Field objects and assigning them to the Record when Field Identification callbacks occur. The API of Context allows a caller to provide the bytes of a TTI message as input and to receive a Record as output. The API informs the caller when a complete TTI message has been recognized in the input bytes.

In accordance with an embodiment, the Record class represents a record in the TTC protocol. For each field of the record, there is a "getter" API which returns the value of that field. Field values are returned as Java types. A subclass of Record exists for each TTC record which TE receives. Records are backed by a buffer containing the marshaled TTC bytes. That is, records do not store the value of fields as java types, the values are stored in the marshaled TTC buffer.

In accordance with an embodiment, the Field represents a field within a record of the TTC protocol. An instance of Field retains information about the offset of a field within a marshaled TTC buffer. A subclass of Field exists for each TTC data type which TE will receive. The Field API allows the caller to obtain the value of the field as a Java type (unmarshaled from the packet bytes).

In accordance with an embodiment, a SegmentedBuffer represents a complete network packet which may span across multiple buffers. The length of a single TTC packet may exceed the maximum size of the NS packet which encapsulates TTC. In this case, the TTC packet will be received over multiple NS packets and the NS module will provide each segment of the TTC packet in separate buffers. A SegmentedBuffer retains a collection of buffers and provides an API to unmarshal TTC data types from the segments. In cases where a single field may be segmented across multiple buffers, the SegmentedBuffer implements logic to unmarshal it.

In accordance with an embodiment, the RequestUnmarshaller and ResponseUnmarshaller process the bytes of a TTC request/response as they are received from the NS module. The process is complete when the Unmarshaller recognizes a complete Request/Response of the TTC protocol within the received bytes. The Unmarshallers call upon Context instances to traverse individual TTI messages which appear in the received bytes. Unmarshallers identify which TTI message to traverse by reading the TTI message code that appears as the first byte in every message. Certain TTI messages are classified as "End-Of-Call" messages; Messages of this type mark the end of a Request or Response in the TTC protocol. When an End-Of-Call message is traversed, the Unmarshaller builds a Request or Response object which is composed of the all messages received prior to, and including, the end of call message. If the Unmarshallers process an entire buffer without recognizing an End-Of-Call, they retain the current Context object and resume processing when the next buffer is provided.

In accordance with an embodiment, the Request and Response classes abstract a collection of TTI messages which compose a single request or response in the TTC protocol. Their APIs allow callers to identify the type of request or response by message type and function code. Function code is only applicable when the message type is Start of user function (TTIFUN). The API allows a caller to marshal the request or response into the TTI message bytes which the class abstracts. A subclass of Request and Response exists for each RPC supported by the transparency engine. Subclasses implement API's which return the values of fields that appear in the request or response.

In accordance with an embodiment, there can be two implementations of each Request and Response. The implementations differ in the backing store used to retain the values of fields: buffer-backed and Java-backed. The buffer-backed implementation retains one or more Record objects, and calls upon them to read the value of a record field. Since Records store the values in a marshaled TTC buffer, this implementation is backed by a buffer. Instances of this implementation are created by the RequestUnmarshaller and ResponseUnmarshaller. The Java-backed implementation retains the values of record fields as a java types. Instances of this implementation are created by RequestBuilder or ResponseBuilder.

The two implementations allow the transparency engine to avoid unnecessary conversions between TTC and Java type encodings. The record-backed implementation lazily unmarshals fields only when an API caller wants to read the value of the field. In most cases, the transparency engine only has to read a small subset of the total fields which appear in Request or Response. Additionally, the transparency engine can send the request or response with very few (if any) modifications. The record-backed implementation allows much of the original TTI messages to be reused when marshaling.

The Java type implementation is conducive to Builders, which receive field values as java types. The Java type implementation can dynamically marshal TTI messages based on the TTC variants that are declared by the message receiver. This "last-minute" approach to marshaling allows the engine module to build requests without knowing the variant properties of the pooled connection it borrows, since the engine wants to borrow the connection for the shortest amount of time possible.

In accordance with an embodiment, the RequestBuilder and ResponseBuilder enables the transparency engine to create instances of a Request or Response object. A subclass of RequestBuilder and ResponseBuilder exists for each TTC request supported by the transparency engine. Subclasses implement APIs which allow the caller to set the value of fields for a particular request or response.

In accordance with an embodiment, the ApplicationTTCChannel class receives requests and sends responses with an application that has connected to the transparency engine. The ApplicationTTCChannel retains an instance of an NSChannel, and exposes an event-driven API which a caller invokes upon receiving network read and write events:

onApplicationRead( ): The ApplicationTTCChannel handles read events by calling the NSChannel's onRead( ) API to obtain a buffer of TTI messages. The buffer is processed by a RequestUnmarshaller, which outputs a Request object if a complete request is recognized in the buffer. If a Request object is output, this object is returned to the caller of onApplicationRead( ). If a complete request is not recognized, the channel retains the RequestUnmarshaller instance and resumes its process on the next read event.

enqueueRespToApplication(Response): Prior to a write event, the caller can invoke this API to have the provided Response sent to the application. The ApplicationTTCChannel will call the marshal( ) method on the Response to obtain a buffer of its TTI messages. This buffer is then passed to the NSChannel by calling its enqueueDataToWrite (List<ByteBuffer>) API.

onApplicationWrite( ): The ApplicationTTCChannel handles a write event by calling the NSChannels's onWrite( ) API. Any TTI messages marshaled in a prior call to enqueueRespToApplication are sent to the application by the NSChannel.

In accordance with an embodiment, the DatabaseTTCChannel sends requests and receives responses with a database the transparency engine has connected to. The DatabaseTTCChannel retains an instance of an NSChannel, and exposes an event-driven API which a caller invokes upon receiving network read and write events:

enqueueReqToDatabase(List<Request>): Prior to a write event, the caller can invoke this API to have the provided Request sent to the database. The DatabaseTTCChannel will call the marshal( )method on the Request to obtain a buffer of its TTI messages. This buffer is then passed to the NSChannel by calling its enqueueDataToWrite (List<ByteBuffer>) API.

onDatabaseWrite( ): The DatabaseTTCChannel handles a write event by calling the NSChannels's onWrite( ) API. Any TTI messages marshaled in a prior call to enqueueReqToDatabase are sent to the database by the NSChannel.

onDatabaseRead( ): The DatabaseTTCChannel handles read events by calling the NSChannel's onRead( ) API to obtain a buffer of TTI messages. The buffer is processed by a ResponseUnmarshaller, which outputs a Response object if a complete response is recognized in the buffer. If a Response object is output, this object is returned to the caller of onDatabaseRead( ). If a complete request is not recognized, the channel retains the ResponseUnmarshaller and resumes its process on the next read event.

Figure 31:
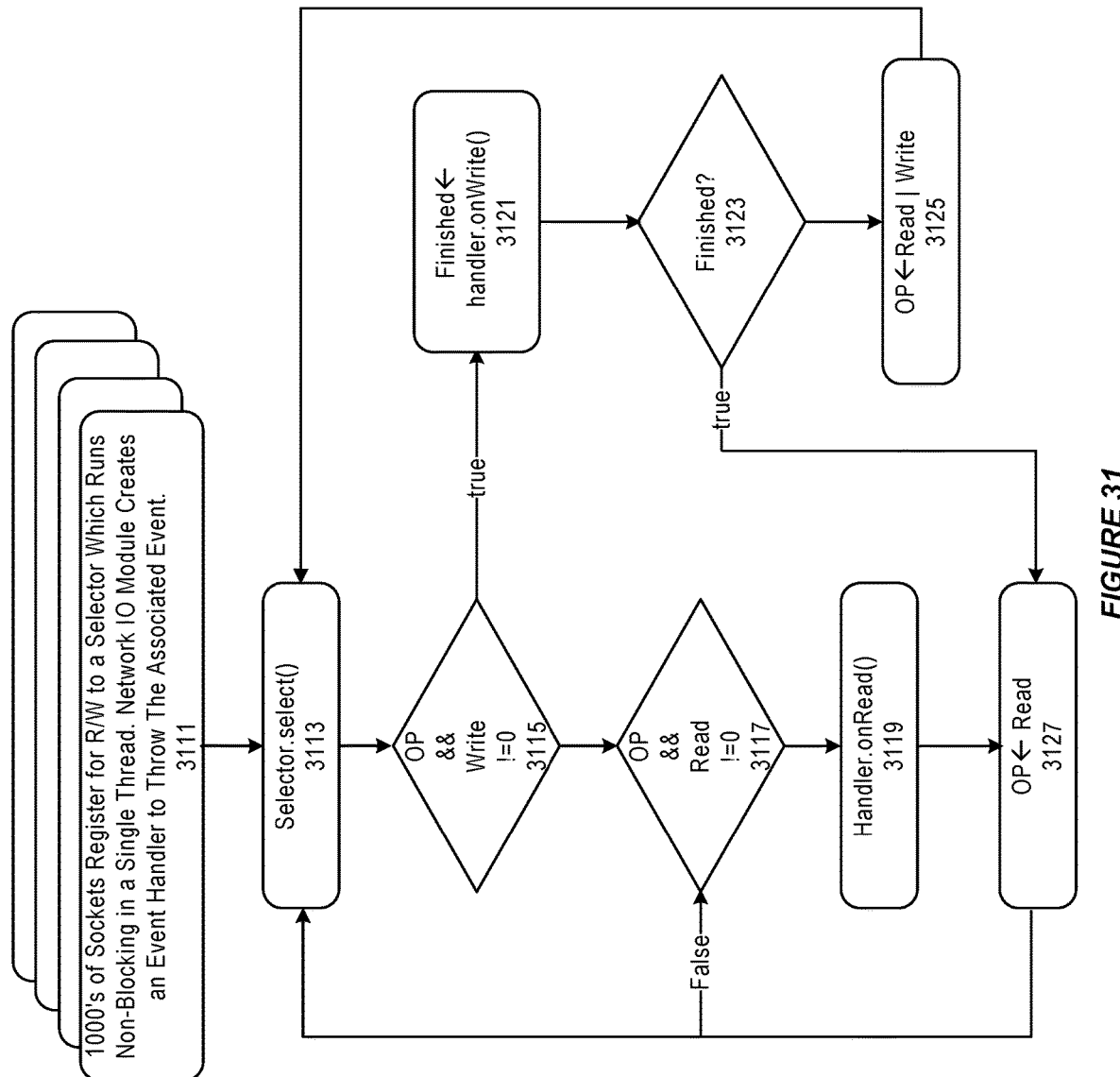
FIG. 31 illustrates an algorithm for use by Read/Write handlers to generate events, in accordance with an embodiment.

FIG. 31 illustrates an algorithm for use by Read/Write handlers to generate events, in accordance with an embodiment.

As shown in FIG. 31, at step 3111, a large number of sockets (e.g., 1000's of sockets) register for R/W to a selector 3113 which runs non-blocking in a single thread. Network IO module creates an Event Handler to throw the associated event.

As further shown, the algorithm can include steps 3115, 3121, 3123, and 3125, which indicates that the handlers are interested in Write only until the protocol libraries indicates that the Write operation is finished; otherwise the handlers would be executed each time the channel is ready for write, burning CPU time for no reason. As such, the handlers are not interest in Write at steps 3117, 3119 and 3127.

The transparency engine can create an instance of a class implementing the AcceptEventListener interface and register it in a ServerSocket using the StartServerChannel API. Incoming connections would connect to that Socket.

For each incoming connection that is received in the registered listener's onAccept callback, the listener can create an instance of an IOEvenListener to register to the incoming Socket using RegisterListener API. By this registration the IOEventListener gets access to read/write events by giving an implementation to onRead/onWrite events respectively. On the other hand, the transparency engine uses the CreateSocketChannel API and an IOEventListener to handle the events to the database layer.

Authentication

Figure 32:
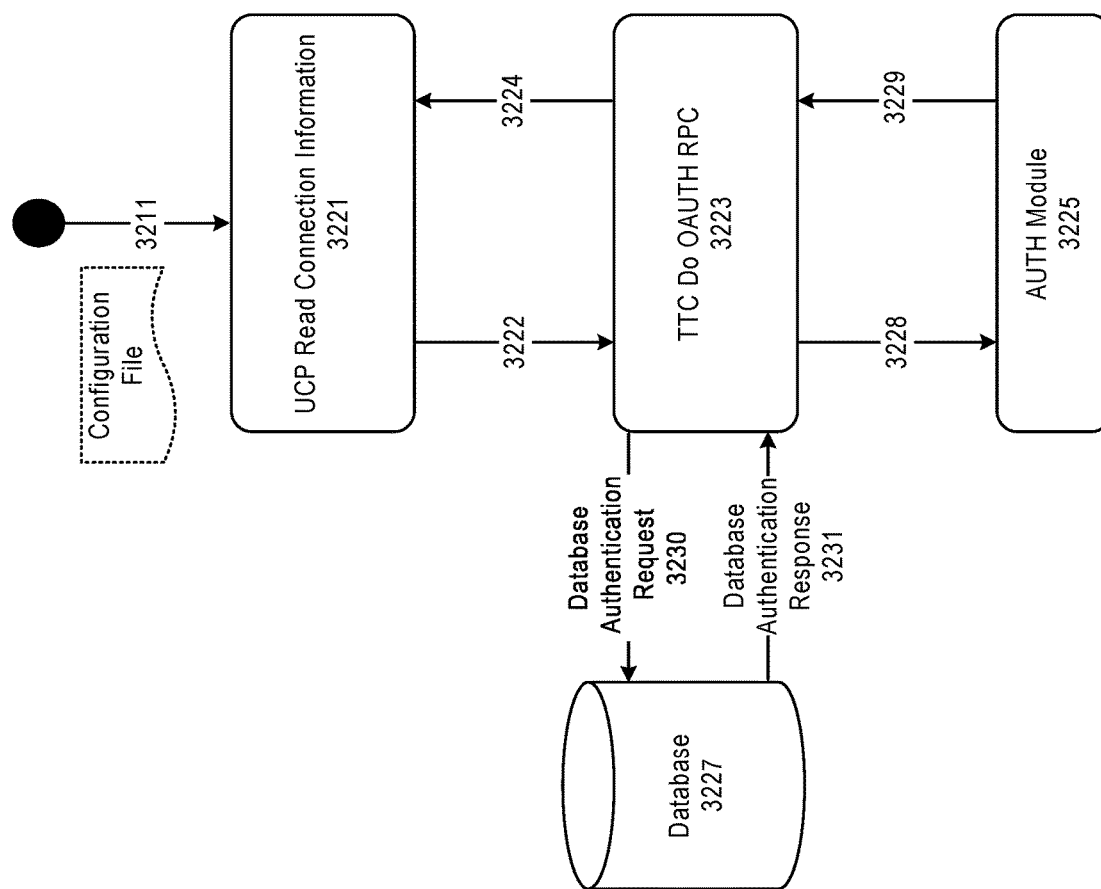
FIG. 32 illustrates an activity diagram of authentication from an transparency engine to a database, in accordance with an embodiment.

FIG. 32 illustrates an activity diagram of authentication from an transparency engine to a database, in accordance with an embodiment.

As shown in FIG. 32, a UCP connection pool 3221 reads 32121 connection information from the configuration file to create database connections. The configuration file contains all required information to create database connections, such as user name, password in text format, database name, and service name.

The UCP connection pool can send a request 3222 to a TTC module 3223 for authentication RPC. The TTC module can then send a database authentication request 3230 to a database 3227, and receive a database authentication response 3231 from the database.

The TTC module can provide 3228 a user name and password in a text format to an authentication module 3225, which stores the user name and password for authenticating application users. During this authentication, the authentication module stores a verifier type and a salt for each user, and interacts 3229 with the UCP/TTC module 3223 for providing O5Logon mechanism for authentication as part of actual database connection operation. Finally, the UCP connection pool can receive 3224 a response from the TTC module.

Figure 33:
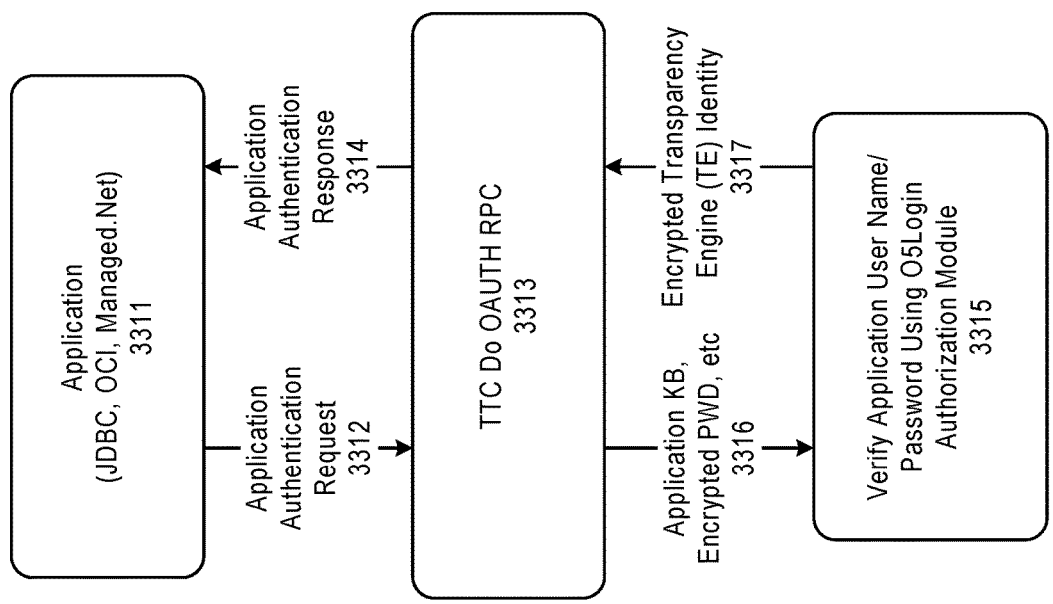
FIG. 33 illustrates an activity diagram of authentication from an application to a transparency engine, in accordance with an embodiment.

FIG. 33 illustrates an activity diagram of authentication from an application to a transparency engine, in accordance with an embodiment.

As shown in FIG. 33, when a logon request comes from an application 3311, a TTC module 3313 can send a request 3316 to an O5Logon authorization module 3315, which can validate an application user and its credentials received from the request. The TTC module can receive 3317 an encrypted identity for use in mapping the application user to a database user. The transparency engine can have the same application user name as the database user name.

As further shown in FIG. 33, the application can receive an authentication response 3314 from the TTC module.

Figure 34:
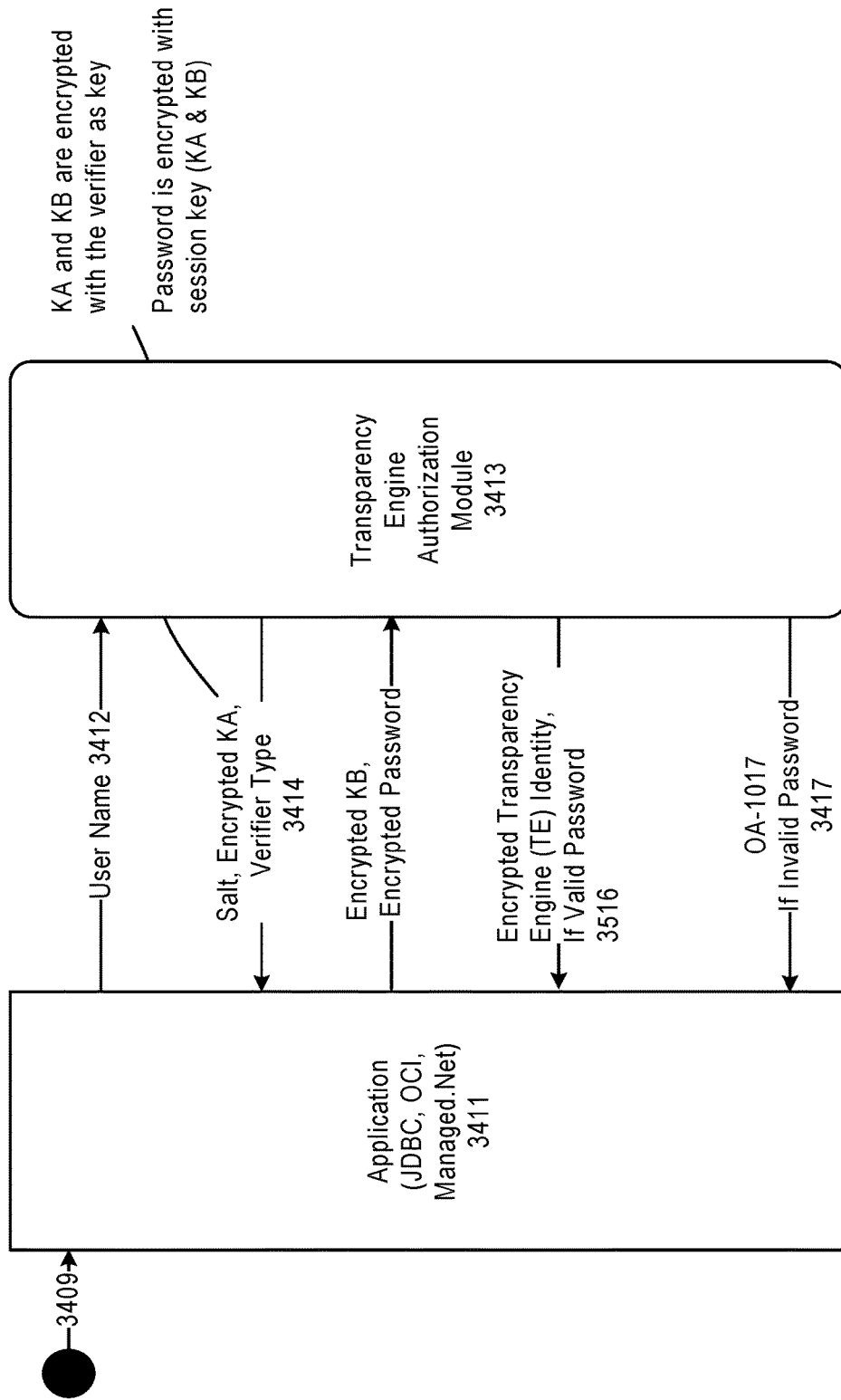
FIG. 34 further illustrates an authentication diagram, in accordance with an embodiment.

FIG. 34 further illustrates an authentication diagram, in accordance with an embodiment.

In accordance with an embodiment, the transparency engine supports the use of authentication services, and access information from those services to validate logon requests from applications. Advantages of transparency engine authentication includes off-loading a database server from application authentications, thereby protecting logon storms.

In accordance with an embodiment, when an application 3411 can receive a request 3409 from a client application, the application can send a user name 3412 to a transparency engine, which can call TTCConnect.applicationLogon( ) (app_user_name, database, properties) in a TTC module. The TTC module interacts with an authentication module 3413, which can generate encrypted Ka, salt, verify type and verify password.

In accordance with an embodiment, the following steps occur in the authentication module as and when needed to provide response to the TTC module.

1). The transparency engine generates Ka in conformance with O5Logon.
2). The transparency engine retrieves plain text password, salt and verifier type for the given application user and service name. This information can be stored in the authentication module when the transparency engine starts.
3). The transparency engine generates password verifier using plain text password, salt and verifier type.
4). The transparency engine encrypts KA using password verifier.

In accordance with an embodiment, the transparency engine can send 3414 the encrypted KA, salt and verifier type to the application, which can send an encrypted KB and an encrypted password 3415 to the transparency engine.

The transparency engine can compare the application password with the password in the transparency engine for that user/service name in a configuration file. The application password is valid if the two passwords match. If so, the transparency engine sends an encrypted transparency engine identity 3516 to the application. If the application password is determined to the invalid, the transparency engine can generate an authentication failure exception (e.g., OA-1017) and send the exception 3417 to the application.

Launch Process

Figure 35:
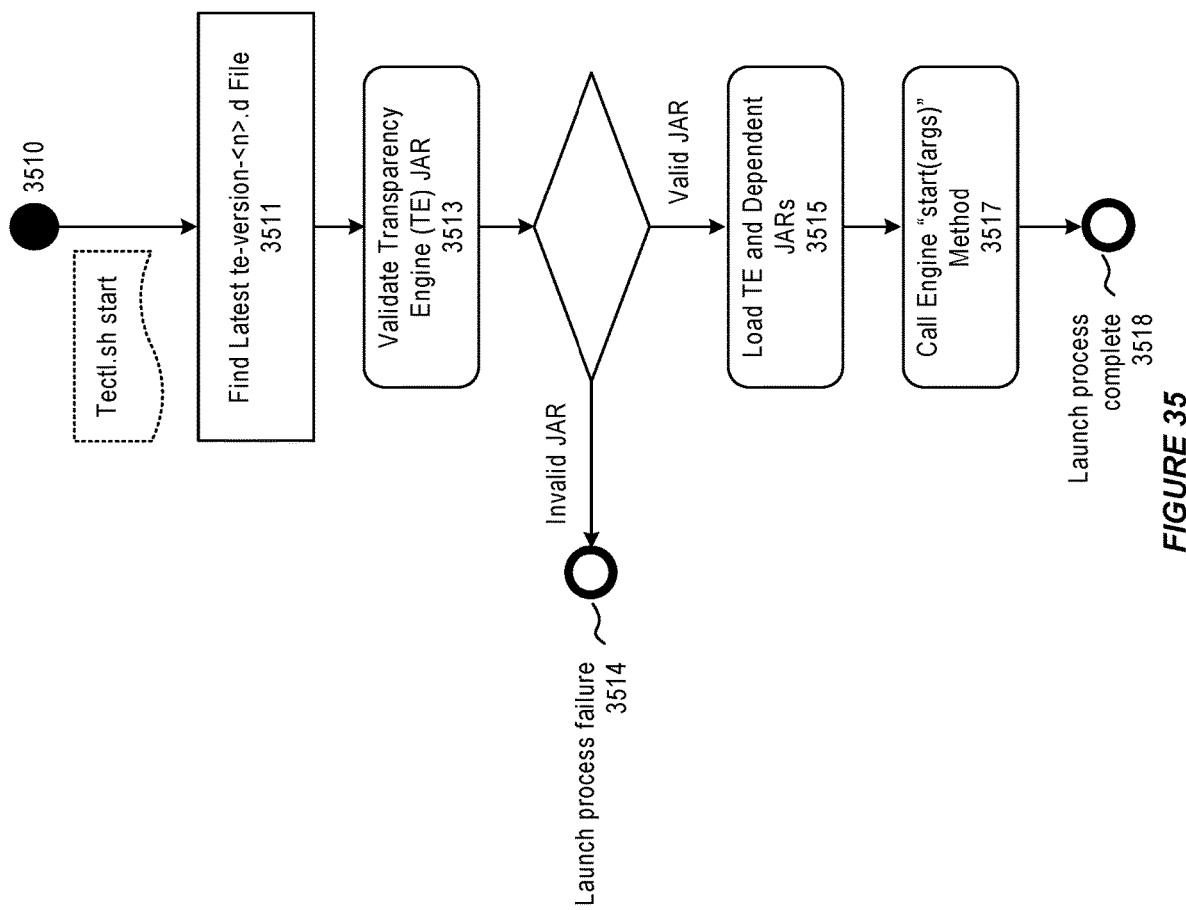
FIG. 35 illustrates a launch process for a transparency engine, in accordance with an embodiment.

FIG. 35 illustrates a launch process for a transparency engine, in accordance with an embodiment.

In accordance with an embodiment, first, a user needs to push one or more installation files in a directory and install the one or more installation files. The installation can cause a transparency engine (TE) launch.jar to be installed.

In accordance with an embodiment, the installation also sets an access control list (ACL) on the launch.jar, so that only TE-Admin group users can use the launch.jar. The TE installation can contain te-version-<n>.d file under $ORACLE_HOME/te directory. The te-version-<n>.d contains version information to launch the transparency engine. Here <n> represents a sequence number, e.g., te-version-22.*d*. Since there can be multiple such files after patching, a launcher.sh needs to find highest <n> and use that file to launch the transparency engine.

For example, content of te-version-<n>.d may have following type of information:

1). TE_VERSION=3.2.;
2). TE_PATCH=47;
3). TE_LAUNCHER_VERSION=3.1; and
4). TE_LAUNCHER_PATCH=2.

In this example, a tectl can expect te-3.2-47.jar as the engine jar name and telauncher-3.1-2.jar as the launcher jar name.

As shown in FIG. 35, at step 3510, a TE administration script, e.g., tectl.sh, can be started from $ORACLE_HOME/te/bin directory. The administration script can indirectly call a TE Launcher script (e.g., telauncher.sh), which can launch a TE launcher.

At step 3511, the TE Launcher finds latest te-version-<n>.d file for loading TE and its dependent jars.

At step 3513, the TE Launcher verifies a TE jar, including verifying the certificate of the jar and the keystore parameters provided in the telauncher.sh, checking whether the extension and format of the file, validating that certain classes exists in the jar, and validating that certain methods exists in the jar.

At step 3514, if the above verification described at step 3513 fails, the TE launcher can generate a "launch process failure" error.

Otherwise, as shown at step 3515, if the verification described at step 3513 is successful, the TE Launcher can load the TE using a class loader.

At step 3517, the TE launcher can call start( ) method of the transparency engine.

At step 3518, the launcher can generate a "launch process complete" message, and exit.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium. The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for high availability and load balancing in a database environment, comprising:
   one or more computers including one or more microprocessors;
   a software component, executing on the one or more computers, that operates as a transparency engine configured to connect a plurality of client applications to a database and execute queries to fetch rows of data from the database in response to requests from the client applications;
   wherein the transparency engine includes one or more row buffers that store rows returned from the database;
   wherein the transparency engine includes a connection pool, and is configured to determine request boundaries associated with requests that are received from the plurality of client applications and directed to the database; and
   wherein the transparency engine uses the connection pool and the request boundaries to enable the client applications to utilize high availability features of the database, including wherein:
      for a particular client application, one or more rows are stored in a row buffer against an application connection ID, and a cursor generated for a query execution; and
      wherein the particular application requests a particular data associated with the query, the transparency engine operates to retrieve the one or more rows from the row buffer using the connection ID and cursor, and sends the rows to the client application.

2. The system of claim 1, wherein the database is a real application cluster database, and wherein the connection pool is a universal connection pool.

3. The system of claim 1, wherein the plurality of client applications uses different types of drivers to connect to the database through the transparency engine.

4. The system of claim 1, wherein the software component is a Java application deployed to a cloud environment.

5. The system of claim 1, wherein the transparency engine operates to detect request boundaries associated with requests from the plurality of client applications that use different database drivers.

6. The system of claim 5, wherein the transparency engine uses the request boundaries as safe places to drain database connections in the event of a database outage.

7. The system of claim 1, wherein the transparency engine marks the request boundaries by detecting one or more of a start of a local transaction, a begin/end request, or a ping request to validate a database connection.

8. A method for high availability and load balancing in a database environment, comprising:
   providing, at one or more computers including one or more microprocessors, a software component configured to connect a plurality of client applications to a database and execute queries to fetch rows of data from the database in response to requests from the client applications;
   providing one or more row buffers that store rows returned from the database;
   determining request boundaries associated with requests that are received from the plurality of client applications and directed to the database; and
   maintaining a connection pool, wherein the connection pool and the request boundaries enable the client applications to utilize high availability features of the database, including wherein:
      for a particular client application, one or more rows are stored in a row buffer against an application connection ID, and a cursor generated for a query execution; and
      wherein the particular application requests a particular data associated with the query, the one or more rows are retrieved from the row buffer using the connection ID and cursor, and sent to the client application.

9. The method of claim 8, wherein the database is a real application cluster database, and wherein the connection pool is a universal connection pool.

10. The method of claim 8, wherein the software component operates as a transparency engine, and wherein the plurality of client applications uses different types of drivers to connect to the database through the transparency engine.

11. The method of claim 8, wherein the software component is a Java application deployed to a cloud environment.

12. The method of claim 8, wherein the software component operates as a transparency engine, and wherein the transparency engine operates to detect request boundaries associated with requests from the plurality of client applications that use different database drivers.

13. The method of claim 12, wherein the transparency engine uses the request boundaries as safe places to drain database connections in the event of a database outage.

14. The method of claim 8, wherein the request boundaries are marked by detecting one or more of a start of a local transaction, a begin/end request, or a ping request to validate a database connection.

15. A non-transitory computer readable storage medium, including instructions stored thereon which when read and executed by one or more computers cause the one or more computers to perform the method comprising:
providing, at the one or more computers, a software component configured to connect a plurality of client applications to a database and execute queries to fetch rows of data from the database in response to requests from the client applications;
providing one or more row buffers that store rows returned from the database;
determining request boundaries associated with requests that are received from the plurality of client applications and directed to the database; and
maintaining a connection pool, wherein the connection pool and the request boundaries enable the client applications to utilize high availability features of the database, including wherein:
for a particular client application, one or more rows are stored in a row buffer against an application connection ID, and a cursor generated for a query execution; and
wherein the particular application requests a particular data associated with the query, the one or more rows are retrieved from the row buffer using the connection ID and cursor, and sent to the client application.

16. The non-transitory computer readable storage medium of claim 15, wherein the request boundaries are marked by detecting one or more of a start of a local transaction, a begin/end request, or a ping request to validate a database connection.

17. The system of claim 1, wherein the transparency engine stores information related to an application's database session, and uses session states, the request boundaries, and cursors, to reuse database connections maintained by the connection pool across multiple applications.

18. The system of claim 1, wherein the transparency engine receives notifications from the database descriptive of database events, and sends the notifications to subscribing drivers, connection pools, and application containers.

19. The method of claim 8, further comprising storing information related to an application's database session, and using session states, the request boundaries, and cursors, to reuse database connections maintained by the connection pool across multiple applications.

20. The method of claim 8, further comprising receiving notifications from the database descriptive of database events, and sending the notifications to subscribing drivers, connection pools, and application containers.

* * * * *

UNITED STATES PATENT AND TRADEMARK OFFICE
CERTIFICATE OF CORRECTION

| | | |
|---|---|---|
| PATENT NO. | : 10,909,088 B2 | Page 1 of 4 |
| APPLICATION NO. | : 15/912861 | |
| DATED | : February 2, 2021 | |
| INVENTOR(S) | : Colrain et al. | |

It is certified that error appears in the above-identified patent and that said Letters Patent is hereby corrected as shown below:

On the Title Page

On page 2, Column 2, item (56) under Other Publications, Line 12, delete "Directiory" and insert -- Directory --, therefor.

On page 2, Column 2, item (56) under Other Publications, Line 23, delete "Knowledgecenter," and insert -- Knowledge center, --, therefor.

On page 2, Column 2, item (56) under Other Publications, Line 25, delete "12.1.01com.ibm" and insert -- 12.1.0/com.ibm --, therefor.

On page 2, Column 2, item (56) under Other Publications, Line 57, delete "Refrence"," and insert -- Reference", --, therefor.

On page 2, Column 2, item (56) under Other Publications, Line 64, delete "01dva7" and insert -- 01dca7 --, therefor.

On page 2, Column 2, item (56) under Other Publications, Line 64, delete "17er23." and insert -- 17ef23. --, therefor.

In the Drawings

On sheet 2 of 35, in FIGURE 2, under Reference Numeral 237, Line 1, delete "IO" and insert -- I/O --, therefor.

On sheet 2 of 35, in FIGURE 2, under Reference Numeral 221, Line 1, delete "HOTPATCHABLE" and insert -- HOT PATCHABLE --, therefor.

On sheet 4 of 35, in FIGURE 4, under Reference Numeral 421, Line 1, delete "IO" and insert -- I/O --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,909,088 B2

On sheet 4 of 35, in FIGURE 4, under Reference Numeral 419, Line 1, delete "IO" and insert -- I/O --, therefor.

On sheet 5 of 35, in FIGURE 5, under Reference Numeral 513, Line 1, delete "IO" and insert -- I/O --, therefor.

On sheet 6 of 35, in FIGURE 6, under Reference Numeral 613, Line 1, delete "IO" and insert -- I/O --, therefor.

On sheet 31 of 35, in FIGURE 31, under Reference Numeral 3111, Line 1, delete "IO" and insert -- I/O --, therefor.

In the Specification

In Column 2, Line 61, delete "IO" and insert -- I/O --, therefor.

In Column 2, Line 64, delete "IO" and insert -- I/O --, therefor.

In Column 6, Line 23, delete "the the" and insert -- the --, therefor.

In Column 6, Line 54, delete "non transactional" and insert -- non-transactional --, therefor.

In Column 8, Line 32, delete "IO" and insert -- I/O --, therefor.

In Column 10, Line 31, delete "IO" and insert -- I/O --, therefor.

In Column 10, Line 32, delete "IO" and insert -- I/O --, therefor.

In Column 10, Line 33, delete "10" and insert -- I/O --, therefor.

In Column 11, Line 6, delete "IO" and insert -- I/O --, therefor.

In Column 13, Line 44, delete "IO" and insert -- I/O --, therefor.

In Column 13, Line 48, delete "IO" and insert -- I/O --, therefor.

In Column 13, Line 51, delete "IO" and insert -- I/O --, therefor.

In Column 13, Line 56, delete "IO" and insert -- I/O --, therefor.

In Column 13, Line 60, delete "IO" and insert -- I/O --, therefor.

In Column 13, Line 62, delete "IO" and insert -- I/O --, therefor.

In Column 13, Line 66, delete "IO" and insert -- I/O --, therefor.

CERTIFICATE OF CORRECTION (continued)
U.S. Pat. No. 10,909,088 B2

In Column 14, Line 1, delete "IO" and insert -- I/O --, therefor.

In Column 14, Line 2, delete "IO" and insert -- I/O --, therefor.

In Column 14, Line 9, delete "NSChannelthat" and insert -- NSChannel that --, therefor.

In Column 14, Line 12, delete "IO" and insert -- I/O --, therefor.

In Column 14, Line 16, delete "IO" and insert -- I/O --, therefor.

In Column 14, Line 20, delete "IO" and insert -- I/O --, therefor.

In Column 14, Line 33, delete "IO" and insert -- I/O --, therefor.

In Column 14, Line 35, delete "IO" and insert -- I/O --, therefor.

In Column 14, Line 37, delete "IO" and insert -- I/O --, therefor.

In Column 14, Line 38, delete "IO" and insert -- I/O --, therefor.

In Column 14, Line 40, delete "IO" and insert -- I/O --, therefor.

In Column 14, Line 41, delete "IO" and insert -- I/O --, therefor.

In Column 14, Line 42, delete "IO" and insert -- I/O --, therefor.

In Column 14, Line 45, delete "IO" and insert -- I/O --, therefor.

In Column 14, Line 46, delete "IO" and insert -- I/O --, therefor.

In Column 14, Line 47, delete "IO" and insert -- I/O --, therefor.

In Column 14, Line 48, delete "IO" and insert -- I/O --, therefor.

In Column 14, Line 50, delete "IO" and insert -- I/O --, therefor.

In Column 14, Line 55, delete "IO" and insert -- I/O --, therefor.

In Column 14, Line 58, delete "IO" and insert -- I/O --, therefor.

In Column 14, Line 65, delete "IO" and insert -- I/O --, therefor.

In Column 15, Line 2, delete "IO" and insert -- I/O --, therefor.

In Column 15, Line 6, delete "IO" and insert -- I/O --, therefor.

CERTIFICATE OF CORRECTION (continued)
U.S. Pat. No. 10,909,088 B2

In Column 15, Line 9, delete "IO" and insert -- I/O --, therefor.

In Column 15, Line 16, delete "for IO" and insert -- for I/O --, therefor.

In Column 15, Line 16, delete "the IO" and insert -- the I/O --, therefor.

In Column 15, Line 36, delete "IO" and insert -- I/O --, therefor.

In Column 15, Line 62, delete "IO" and insert -- I/O --, therefor.

In Column 18, Line 2, delete "IO," and insert -- I/O, --, therefor.

In Column 20, Line 31, delete "DROP" and insert -- DRCP --, therefor.

In Column 20, Line 32, delete "DROP" and insert -- DRCP --, therefor.

In Column 22, Line 23, delete "application application," and insert -- application, --, therefor.

In Column 31, Line 10, delete "Read" and insert -- Red --, therefor.

In Column 31, Line 17, delete "(DROP)" and insert -- (DRCP) --, therefor.

In Column 32, Line 29, delete "be be" and insert -- be --, therefor.

In Column 33, Line 34, delete "the the" and insert -- the --, therefor.

In Column 33, Line 62, delete "The The" and insert -- The --, therefor.

In Column 33, Line 66, delete "(-force|" and insert -- (-force | --, therefor.

In Column 33, Line 31, delete "transparence" and insert -- transparency --, therefor.

In Column 37, Lines 32-33, delete "a a" and insert -- a --, therefor.

In Column 38, Line 5, delete "patchrd." and insert -- patched. --, therefor.

In Column 43, Line 57, delete "IO" and insert -- I/O --, therefor.

In Column 44, Line 5, delete "IOEvenListener" and insert -- IOEventListener --, therefor.